United States Patent
Kaczur et al.

(10) Patent No.: US 11,131,028 B2
(45) Date of Patent: *Sep. 28, 2021

(54) METHOD AND SYSTEM FOR ELECTROCHEMICAL REDUCTION OF CARBON DIOXIDE EMPLOYING A GAS DIFFUSION ELECTRODE

(71) Applicant: Avantium Knowledge Centre B.V., Amsterdam (NL)

(72) Inventors: Jerry J. Kaczur, North Miami Beach, FL (US); Prasad Lakkaraju, East Brunswick, NJ (US); Kyle Teamey, Washington, DC (US)

(73) Assignee: Avantium Knowledge Centre B.V., Amsterdam (NL)

( * ) Notice: Subject to any disclaimer, the term of this patent is extended or adjusted under 35 U.S.C. 154(b) by 27 days.

This patent is subject to a terminal disclaimer.

(21) Appl. No.: 16/400,565

(22) Filed: May 1, 2019

(65) Prior Publication Data
US 2019/0256990 A1    Aug. 22, 2019

Related U.S. Application Data

(60) Division of application No. 14/726,061, filed as application No. PCT/US2014/046555 on Jul. 14, (Continued)

(51) Int. Cl.
C25B 15/08    (2006.01)
C25B 9/19     (2021.01)
(Continued)

(52) U.S. Cl.
CPC .......... *C25B 3/25* (2021.01); *C25B 3/13* (2021.01); *C25B 3/26* (2021.01); *C25B 9/19* (2021.01);
(Continued)

(58) Field of Classification Search
None
See application file for complete search history.

(56) References Cited

U.S. PATENT DOCUMENTS

| 659,733 A | 10/1900 | Goldschmidt |
|---|---|---|
| 1,038,985 A | 9/1912 | Strauss |
| (Continued) | | |

FOREIGN PATENT DOCUMENTS

| CA | 1146120 A | 5/1983 |
|---|---|---|
| CA | 1272161 A | 7/1990 |
| (Continued) | | |

OTHER PUBLICATIONS

Hori et al., Electrocatalytic process of CO selectivity in electrochemical reduction of CO2 at metal electrodes in aqueous media, Electrochimica Acta, vol. 39, No. 11-12, Aug. 1, 1994, pp. 1833-1839.

(Continued)

*Primary Examiner* — Harry D Wilkins, III
(74) *Attorney, Agent, or Firm* — Suiter Swantz pc llo

(57) ABSTRACT

The present disclosure is a method and system for the reduction of carbon dioxide. The method may include receiving hydrogen gas at an anolyte region of an electrochemical cell including an anode, the anode including a gas diffusion electrode, receiving an anolyte feed at an anolyte region of the electrochemical cell, and receiving a catholyte feed including carbon dioxide and an alkali metal bicarbonate at a catholyte region of the electrochemical cell including a cathode. The method may include applying an electrical potential between the anode and cathode sufficient to reduce the carbon dioxide to at least one reduction product.

3 Claims, 23 Drawing Sheets

Related U.S. Application Data 2014, now Pat. No. 10,329,676, which is a continuation-in-part of application No. 13/934,500, filed on Jul. 3, 2013, now Pat. No. 9,085,827, and a continuation-in-part of application No. 13/724,339, filed on Dec. 21, 2012, now Pat. No. 9,175,407.

(60) Provisional application No. 62/004,544, filed on May 29, 2014, provisional application No. 62/108,407, filed on Jan. 27, 2015, provisional application No. 61/720,670, filed on Oct. 31, 2012, provisional application No. 61/715,060, filed on Oct. 17, 2012, provisional application No. 61/675,938, filed on Jul. 26, 2012, provisional application No. 61/703,158, filed on Sep. 19, 2012, provisional application No. 61/703,229, filed on Sep. 19, 2012, provisional application No. 61/703,175, filed on Sep. 19, 2012, provisional application No. 61/703,231, filed on Sep. 19, 2012, provisional application No. 61/703,232, filed on Sep. 19, 2012, provisional application No. 61/703,234, filed on Sep. 19, 2012, provisional application No. 61/703,238, filed on Sep. 19, 2012, provisional application No. 61/703,187, filed on Sep. 19, 2012.

(51) Int. Cl.
*C25B 3/26* (2021.01)
*C25B 3/25* (2021.01)
*C25B 3/13* (2021.01)
*C25B 11/031* (2021.01)

(52) U.S. Cl.
CPC ............ *C25B 11/031* (2021.01); *C25B 15/08* (2013.01); *Y02C 20/40* (2020.08)

(56) References Cited

U.S. PATENT DOCUMENTS

| | | |
|---|---|---|
| 1,280,622 A | 10/1918 | Andrews |
| 1,349,947 A | 8/1920 | Dupont et al. |
| 1,420,213 A | 6/1922 | Paulus |
| 1,445,163 A | 2/1923 | Paulus |
| 1,506,872 A | 9/1924 | Wallace |
| 1,602,802 A | 10/1926 | Wallace |
| 1,962,140 A | 6/1934 | Dreyfus |
| 2,060,880 A | 11/1936 | Lazier |
| 2,967,806 A | 1/1961 | Osborne et al. |
| 3,019,256 A | 1/1962 | Dunn |
| 3,088,990 A | 5/1963 | Rightmire et al. |
| 3,220,941 A | 11/1965 | Osborne |
| 3,236,879 A | 2/1966 | Chiusoli |
| 3,293,292 A | 12/1966 | Olivier et al. |
| 3,326,998 A | 6/1967 | Reusser et al. |
| 3,341,615 A | 9/1967 | Wulf et al. |
| 3,341,616 A | 9/1967 | Vives |
| 3,344,049 A | 9/1967 | Neikam |
| 3,347,758 A | 10/1967 | Koehl, Jr. |
| 3,352,935 A | 11/1967 | Mahan et al. |
| 3,361,653 A | 1/1968 | Miller |
| 3,401,100 A | 9/1968 | Macklin |
| 3,492,209 A | 1/1970 | Miller |
| 3,531,386 A | 9/1970 | Heredy |
| 3,560,354 A | 2/1971 | Young |
| 3,607,962 A | 9/1971 | Krekeler |
| 3,636,159 A | 1/1972 | Solomon |
| 3,720,591 A | 3/1973 | Skarlos |
| 3,745,180 A | 7/1973 | Rennie |
| 3,764,492 A | 10/1973 | Baizer |
| 3,779,875 A | 12/1973 | Michelet |
| 3,824,163 A | 7/1974 | Maget |
| 3,894,059 A | 7/1975 | Selvaratnam |
| 3,959,094 A | 5/1976 | Steinberg |
| 4,072,583 A | 2/1978 | Hallcher et al. |
| 4,087,470 A | 5/1978 | Suzuki |
| 4,088,682 A | 5/1978 | Jordan |
| 4,147,599 A | 4/1979 | O'Leary et al. |
| 4,162,948 A | 7/1979 | Yagii et al. |
| 4,219,392 A | 8/1980 | Halmann |
| 4,245,114 A | 1/1981 | Peltzman |
| 4,253,921 A | 3/1981 | Baldwin et al. |
| 4,256,550 A | 3/1981 | Niinobe et al. |
| 4,267,070 A | 5/1981 | Nefedov et al. |
| 4,299,981 A | 11/1981 | Leonard |
| 4,334,967 A | 6/1982 | Tedoradze et al. |
| 4,343,690 A | 8/1982 | de Nora |
| 4,381,978 A | 5/1983 | Gratzel et al. |
| 4,384,084 A | 5/1983 | Lohse et al. |
| 4,421,613 A | 12/1983 | Goodridge et al. |
| 4,450,055 A | 5/1984 | Stafford |
| 4,476,003 A | 10/1984 | Frank et al. |
| 4,510,214 A | 4/1985 | Crouse et al. |
| 4,523,981 A | 6/1985 | Ang et al. |
| 4,545,866 A | 10/1985 | Ohba et al. |
| 4,547,271 A | 10/1985 | Bharucha et al. |
| 4,560,451 A | 12/1985 | Nielsen |
| 4,563,254 A | 1/1986 | Morduchowitz et al. |
| 4,589,963 A | 5/1986 | Cipriano et al. |
| 4,595,465 A | 6/1986 | Ang et al. |
| 4,608,132 A | 8/1986 | Sammells |
| 4,608,133 A | 8/1986 | Morduchowitz et al. |
| 4,619,743 A | 10/1986 | Cook |
| 4,661,422 A | 4/1987 | Marianowski et al. |
| 4,673,473 A | 6/1987 | Ang et al. |
| 4,702,973 A | 10/1987 | Marianowski |
| 4,732,655 A | 3/1988 | Morduchowitz et al. |
| 4,756,807 A | 7/1988 | Meyer et al. |
| 4,810,596 A | 3/1989 | Ludwig |
| 4,845,252 A | 7/1989 | Schmidt et al. |
| 4,902,828 A | 2/1990 | Wickenhaeuser et al. |
| 4,949,178 A | 8/1990 | Hovens |
| 4,950,368 A | 8/1990 | Weinberg et al. |
| 4,968,393 A | 11/1990 | Mazur et al. |
| 5,074,974 A | 12/1991 | Toomey, Jr. |
| 5,084,148 A | 1/1992 | Kazcur et al. |
| 5,096,054 A | 3/1992 | Scherson |
| 5,106,465 A | 4/1992 | Kaczur et al. |
| 5,107,040 A | 4/1992 | Repman et al. |
| 5,155,256 A | 10/1992 | Chapman |
| 5,198,086 A | 3/1993 | Chlanda et al. |
| 5,198,311 A | 3/1993 | Nakazawa et al. |
| 5,234,768 A | 8/1993 | Furuya |
| 5,246,551 A | 9/1993 | Pletcher et al. |
| 5,290,404 A | 3/1994 | Toomey |
| 5,294,319 A | 3/1994 | Kaczur et al. |
| 5,300,369 A | 4/1994 | Dietrich et al. |
| 5,412,150 A | 5/1995 | Wessel |
| 5,443,804 A | 8/1995 | Parker et al. |
| 5,455,372 A | 10/1995 | Hirai et al. |
| 5,474,658 A | 12/1995 | Scharbert et al. |
| 5,514,492 A | 5/1996 | Marincic et al. |
| 5,536,856 A | 7/1996 | Harrison et al. |
| 5,565,073 A | 10/1996 | Fraser et al. |
| 5,584,976 A | 12/1996 | Nishiki et al. |
| 5,654,493 A | 8/1997 | Wessel |
| 5,804,045 A | 9/1998 | Orillon et al. |
| 5,879,521 A | 3/1999 | Shimamune et al. |
| 5,928,806 A * | 7/1999 | Olah ..................... C25B 3/04 429/418 |
| 5,961,813 A | 10/1999 | Gestermann et al. |
| 6,001,500 A | 12/1999 | Bass et al. |
| 6,024,935 A | 2/2000 | Mills et al. |
| 6,137,005 A | 10/2000 | Hjornevik |
| 6,171,551 B1 | 1/2001 | Malchesky et al. |
| 6,251,256 B1 | 6/2001 | Blay et al. |
| 6,312,655 B1 | 11/2001 | Hesse et al. |
| 6,348,613 B2 | 2/2002 | Miyamoto et al. |
| 6,380,446 B1 | 4/2002 | Drew et al. |
| 6,465,699 B1 | 10/2002 | Grosso |
| 6,492,047 B1 | 12/2002 | Peled et al. |
| 6,777,571 B2 | 8/2004 | Chaturvedi et al. |
| 6,881,320 B1 | 4/2005 | Krafton et al. |

(56) References Cited

U.S. PATENT DOCUMENTS

| | | |
|---|---|---|
| 7,138,201 B2 | 11/2006 | Inoue et al. |
| 7,462,752 B2 | 12/2008 | Fong et al. |
| 7,883,610 B2 | 2/2011 | Monzyk et al. |
| 8,227,127 B2 | 7/2012 | Little et al. |
| 8,277,631 B2 | 10/2012 | Eastman et al. |
| 8,313,634 B2 | 11/2012 | Bocarsly et al. |
| 8,444,844 B1 | 5/2013 | Teamey et al. |
| 8,562,811 B2 | 10/2013 | Sivasankar et al. |
| 8,641,885 B2 | 2/2014 | Sivasankar et al. |
| 8,663,447 B2 | 3/2014 | Bocarsly et al. |
| 8,721,866 B2 | 5/2014 | Sivasankar et al. |
| 8,821,709 B2 | 9/2014 | Teamey et al. |
| 8,845,875 B2 | 9/2014 | Teamey et al. |
| 8,845,876 B2 | 9/2014 | Teamey et al. |
| 8,858,777 B2 | 10/2014 | Kaczur et al. |
| 9,090,976 B2 | 7/2015 | Bocarsly et al. |
| 10,329,676 B2 * | 6/2019 | Kaczur ................... C25B 9/19 |
| 2001/0001798 A1 | 5/2001 | Sharpless et al. |
| 2001/0026884 A1 | 10/2001 | Appleby et al. |
| 2002/0013477 A1 | 1/2002 | Kim et al. |
| 2002/0022753 A1 | 2/2002 | Drew et al. |
| 2002/0122980 A1 | 9/2002 | Fleischer et al. |
| 2004/0006246 A1 | 1/2004 | Sherman et al. |
| 2004/0115489 A1 | 6/2004 | Goel |
| 2005/0139486 A1 | 6/2005 | Carson et al. |
| 2005/0183951 A1 | 8/2005 | Oldani et al. |
| 2005/0245784 A1 | 11/2005 | Carson et al. |
| 2006/0102468 A1 | 5/2006 | Monzyk et al. |
| 2006/0269813 A1 | 11/2006 | Seabaugh et al. |
| 2007/0004023 A1 | 1/2007 | Trachtenberg |
| 2007/0012577 A1 | 1/2007 | Bulan et al. |
| 2007/0054170 A1 | 3/2007 | Isenberg |
| 2007/0224479 A1 | 9/2007 | Tadokoro et al. |
| 2008/0223727 A1 | 9/2008 | Oloman et al. |
| 2008/0245660 A1 | 10/2008 | Little et al. |
| 2008/0248350 A1 | 10/2008 | Little et al. |
| 2008/0283411 A1 | 11/2008 | Eastman et al. |
| 2008/0286643 A1 | 11/2008 | Iwasaki et al. |
| 2008/0296146 A1 | 12/2008 | Toulhoat et al. |
| 2008/0314758 A1 | 12/2008 | Grosso et al. |
| 2009/0000956 A1 | 1/2009 | Weidner et al. |
| 2009/0014336 A1 | 1/2009 | Olah et al. |
| 2009/0030240 A1 | 1/2009 | Olah et al. |
| 2009/0057161 A1 | 2/2009 | Aulich et al. |
| 2009/0062110 A1 | 3/2009 | Koshino et al. |
| 2009/0156867 A1 | 6/2009 | Van Kruchten |
| 2009/0308759 A1 | 12/2009 | Waycuilis |
| 2010/0051859 A1 | 3/2010 | House et al. |
| 2010/0061922 A1 | 3/2010 | Rauser et al. |
| 2010/0069600 A1 | 3/2010 | Morelle et al. |
| 2010/0130768 A1 | 5/2010 | Sato et al. |
| 2010/0140103 A1 | 6/2010 | Gilliam et al. |
| 2010/0187123 A1 | 7/2010 | Bocarsly et al. |
| 2010/0187125 A1 | 7/2010 | Sandoval et al. |
| 2010/0191024 A1 | 7/2010 | Uenveren et al. |
| 2010/0196800 A1 | 8/2010 | Markoski et al. |
| 2010/0200419 A1 | 8/2010 | Gilliam et al. |
| 2010/0248042 A1 | 9/2010 | Nakagawa et al. |
| 2010/0270167 A1 | 10/2010 | McFarland |
| 2010/0282614 A1 | 11/2010 | Detournay et al. |
| 2010/0305629 A1 | 12/2010 | Lund et al. |
| 2010/0330435 A1 | 12/2010 | Nemeth et al. |
| 2011/0024288 A1 | 2/2011 | Bhavaraju et al. |
| 2011/0083968 A1 | 4/2011 | Gilliam et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143224 A1 | 6/2011 | Rittmann et al. |
| 2011/0143929 A1 | 6/2011 | Sato et al. |
| 2011/0177398 A1 | 7/2011 | Affinito et al. |
| 2011/0186441 A1 | 8/2011 | LaFrancois et al. |
| 2011/0217226 A1 | 9/2011 | Mosa et al. |
| 2011/0226632 A1 | 9/2011 | Cole et al. |
| 2011/0237830 A1 | 9/2011 | Masel |
| 2011/0303551 A1 | 12/2011 | Gilliam et al. |
| 2011/0318617 A1 | 12/2011 | Kirchev et al. |
| 2012/0004448 A1 | 1/2012 | Bhattacharyya et al. |
| 2012/0004449 A1 | 1/2012 | Bhattacharyya et al. |
| 2012/0004454 A1 | 1/2012 | Bhattacharyya et al. |
| 2012/0018311 A1 | 1/2012 | Yotsuhashi et al. |
| 2012/0043301 A1 | 2/2012 | Arvin et al. |
| 2012/0132537 A1 | 5/2012 | Sivasankar et al. |
| 2012/0132538 A1 | 5/2012 | Cole et al. |
| 2012/0199493 A1 | 8/2012 | Krafft et al. |
| 2012/0215034 A1 | 8/2012 | McFarland |
| 2012/0228147 A1 | 9/2012 | Sivasankar et al. |
| 2012/0277465 A1 | 11/2012 | Cole et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105304 A1 | 5/2013 | Kaczur et al. |
| 2013/0105330 A1 | 5/2013 | Teamey et al. |
| 2013/0118907 A1 | 5/2013 | Deguchi et al. |
| 2013/0118909 A1 | 5/2013 | Kaczur et al. |
| 2013/0118911 A1 | 5/2013 | Sivasankar et al. |
| 2013/0134048 A1 | 5/2013 | Teamey et al. |
| 2013/0134049 A1 | 5/2013 | Teamey et al. |
| 2013/0137898 A1 | 5/2013 | Teamey |
| 2013/0140187 A1 | 6/2013 | Teamey et al. |
| 2013/0175181 A1 | 7/2013 | Kaczur |
| 2013/0180863 A1 | 7/2013 | Kaczur et al. |
| 2013/0180865 A1 | 7/2013 | Cole et al. |
| 2013/0186771 A1 | 7/2013 | Zhai et al. |
| 2013/0199937 A1 | 8/2013 | Cole et al. |
| 2013/0228470 A1 | 9/2013 | Chen |
| 2013/0292257 A1 | 11/2013 | Kaczur |
| 2014/0205919 A1 | 7/2014 | Wilde et al. |
| 2016/0164120 A1 | 6/2016 | Swiegers et al. |

FOREIGN PATENT DOCUMENTS

| | | |
|---|---|---|
| CA | 2043256 A1 | 12/1991 |
| CA | 2391938 A1 | 5/2001 |
| CN | 85103377 A | 10/1986 |
| CN | 87102067 A | 4/1988 |
| CN | 1047381 C | 12/1999 |
| CN | 1244534 C | 3/2006 |
| CN | 1319927 C | 6/2007 |
| CN | 101743343 A | 6/2010 |
| CN | 101462943 B | 6/2011 |
| CN | 102190573 A | 9/2011 |
| CN | 101077855 B | 12/2011 |
| CN | 102391099 A | 3/2012 |
| CN | 1927805 B | 5/2012 |
| DE | 1047765 B | 12/1958 |
| DE | 2301032 A1 | 7/1974 |
| EP | 0028430 A1 | 5/1981 |
| EP | 2329875 A1 | 6/2011 |
| FR | 853643 A | 3/1940 |
| GB | 1096847 A | 12/1967 |
| GB | 1223452 A | 2/1971 |
| GB | 1285209 A | 8/1972 |
| GB | 2038335 A | 7/1980 |
| GB | 1584524 A | 2/1981 |
| GB | 2312218 A | 10/1997 |
| JP | 48029721 | 4/1973 |
| JP | 50052010 | 5/1975 |
| JP | 53101311 | 4/1978 |
| JP | 64015388 | 1/1989 |
| JP | 775784 | 10/1996 |
| JP | 7118886 | 10/1996 |
| JP | 2000104190 A | 4/2000 |
| JP | 2004533545 A | 11/2004 |
| JP | 2009540130 A | 11/2009 |
| JP | 2012516392 A | 7/2012 |
| JP | 2012118065 A1 | 7/2014 |
| WO | 9101947 A1 | 2/1991 |
| WO | 9724320 A1 | 7/1997 |
| WO | 9850974 A1 | 11/1998 |
| WO | 0015586 A1 | 3/2000 |

(56) References Cited

FOREIGN PATENT DOCUMENTS

| WO | 0138275 | A1 | 5/2001 |
|---|---|---|---|
| WO | 03004727 | A2 | 1/2003 |
| WO | 2004067673 | A1 | 8/2004 |
| WO | 2006074335 | A2 | 7/2006 |
| WO | 2007041872 | A1 | 4/2007 |
| WO | 2007091616 | A1 | 8/2007 |
| WO | 2007145586 | A1 | 12/2007 |
| WO | 2009012154 | A2 | 1/2009 |
| WO | 2009108327 | A1 | 9/2009 |
| WO | 2011069008 | A1 | 6/2011 |
| WO | 2011116236 | A2 | 9/2011 |
| WO | 2011160577 | A1 | 12/2011 |
| WO | 2012015921 | A1 | 2/2012 |
| WO | 2012046362 | A1 | 4/2012 |
| WO | 2012166997 | A2 | 12/2012 |

OTHER PUBLICATIONS

S. Kapusta, The Electroreduction of Carbon Dioxide and Formic Acid on Tin and Indium Electrodes, Journal of the Electrochemical Society, vol. 130, No. 3, Jan. 1, 1983, pp. 607-613.
Z. Detweiler et al., Anodized Indium Metal Electrodes for Enhanced Carbon Dioixde Reduction in Aqueous Electrolyte, Langmuir, 2014, pp. 7593-7599.
Tanno et al., "Electrolysis of Iodine Solution in a New sodium Bicarbonate-Iodine Hybrid Cycle", International Journal of Hydrogen Energy (1984), vol. 9, No. 10, pp. 841-848.
Tinnemans et al., "Tetraaza-marocyclic cobalt(II) and nickel(II) complexes as electron-transfer agents in the photo (electro)chemical and electrochemical reduction of carbon dioxide", Recl. Trav. Chim. Pays-Bas, Oct. 1984, 103:288-295.
Vojinovic, "Bromine oxidation and bromine reduction in propylene carbonate", Journal of electroanalytical Chemistry, 547 (2003), pp. 109-113.
Wenying Wei et al., "The research progress of CO2 electrocatalysis in water soluble medium", Progress in Chemistry, col. 26, Issue 2, Dec. 2008, 4 pages.
Williamson et al., "Rate of Absorption and Equilibrium of Carbon Dixode in Alkaline Solutions", Industrial and Engineering Chemistry, vol. 16, No. 11, Nov. 1924, pp. 1157-1161.
Wu et al., "Electrochemical Reduction of Carbon Dioxide I. Effects of the Electrolyte on the Selectivity and Activity with Sn Electrode", Journal of the Electrochemical Society (2012), vol. 159, No. 7, pp. F353-F359.
Yingchu Tao et al., "Research Progress of Electrochemical Reduction of Carbon Dioxide chemistry", Issue 5, pp. 272-277, Dec. 31, 2001, http://chemistrymag.org.
Yoshida et al., Journal of Electroanalytical Chemistry, 385, 1995, pp. 209-225.
Yuan et al., "Electrochemical Activation of Carbon Dioxide for Synthesis of Dimethyl Carbonate in an Ionic Liquid", Electrochimica Acta (2009), vol. 54, pp. 2912-2915.
Zaragoza Dorwald, "Side Reactions in Organic Synthesis", 2005, Wiley-VCH Verlag GmbH & Co. KGaA, Weinheim, Preface, p. IX.
Zhao et al., "Electrochemical reduction of supercritical carbon dioxide in ionic liquid 1-n-butyl-3-methylimidazolium hexafluorophosphate", Journal of supercritical Fluids, PRA Press, US, vol. 32, No. 1-3, Dec. 1, 2004, pp. 287-291.
Zhou et al., "Anodic passivation processes of indium in alkaline solution [J]", Journal of Chinese Society for Corrosion and Protection 1 (2005): 005, Feb. 2005.
PCT International Search Report dated Oct. 8, 2015 for PCT/US2015/033378.
A. Sepul Veda-Escribano et al., "Platinum catalysts supported on carbon blacks with different surface chemical properties", Applied Catalysis A: General, 173, 1998, pp. 247-257.
Afroza Begum, "Electrochemical CO2 Reduction", Thesis, 2011, University of Newfoundland, http://collections.mun.ca/cdm4/document.php?CISOROOT=/theses5&CISOPTR=14718&REC=7.

B. Eneau-Innocent et al., "Electroreduction of carbon dioxide at a lead electrode in propylene carbonate: A spectroscopic study", Applied Catalysis B: Environmental 98 (2010) 65-71.
Babic et al., Electrochimica Acta, 51, 2006, 3820-3826.
Bocarsly et al., "Photoelectrochemical conversion of carbon dioxide to methanol and higher alcohols, a chemical carbon sequestration strategy", Preprints of Symposia—American Chemical Society, Division of Fuel Chemistry, vol. 53, Issue 1, pp. 240-241.
Cao et al., Electrocatalytic Reduction of Carbon Dioxide Using Cobalt Tetrakis(4-Trimethylammoniophenyl)porphyrin Iodide Under High Pressure, Huazue Xuebao, vol. 44, No. 3, 1986, pp. 220-224, Abstract Only.
Chaplin et al., "Effects of Process Conditions and Electrode Material on Reaction Pathways for Carbon Dioxide Electroreduction with Particular Reference to Formate Formation", Journal of Applied Electrochemistry, 2003, vol. 33, pp. 1107-1123.
Chen et al., "Tin oxide dependence of the CO2 reduction efficiency on tin electrodes and enhanced activity for tin/tin oxide thin-film catalysts", Journal of the American Chemical Society 134, No. 4 (2012), 1986-1989, Jan. 9, 2012, retrieved on-line.
Cole, Eb et al., "Using a One-Electron Shuttle for the Multielectron Reduction of CO2 to Methanol: Kinetic, Mechanistic, and Structural Insights", Journal of the American Chemical Society, Jul. 28, 2010, vol. 132, pp. 11539-11551.
Cuihong Yan et al., "The Latest Research Progress of Electrocatalytic Reduction Product of CO2", Chemical Engineer, Issue 7, pp. 42-45, Jul. 25, 2010.
Czerwinski et al., "Adsorption Study of CO2 on Reticulated Vitreous Carbon (RVC) Covered with Platinum", Analytical Letters, vol. 18, Issue 14 (1985), pp. 1717-1722.
Eggins et al., "Carbon Dioxide Fixation by Electrochemical Reduction in Water to Oxalate and Glyoxylate", Tetrahedron Letters, vol. 29, No. 8, pp. 945-948, 1988, Pergamon Journals Ltd., Printed in Great Britain.
F. M. Al Kharafi et al., "Electrochemical Oxidation of Sulfide Ions on Platinum Electrodes", Modern Applied Science, vol. 4, No. 3, Mar. 2010, pp. 2-11.
Fisher, "Liquid Fuels from Water Gas", Industrial and Engineering Chemistry, vol. 17, No. 6, Jun. 1925, pp. 574-576.
Fisher et al., "Electrocatalytic reduction of carbon dioxide by using macrocycles of nickel and cobalt", Journal of the American Chemical Society, vol. 102, No. 24, Sep. 1, 1980, pp. 7361-7363.
Fisher, J. et al., "The production of oxalic acid from CO2 and H2O", Journal of Applied Electrochemistry, 1981, vol. 11, pp. 743-750.
Fukaya et al., "Electrochemical Reduction of Carbon Dioxide to Formate Catalyzed by Rh(bpy)3C13", Kagaku Gijutsu Kenkyusho Hokoku (1986) vol. 81, No. 5, pp. 255-258, Abstract Only.
Gennaro et al., "Homogeneous Electron Transfer Catalysis of the Electrochemical Reduction of Carbon Dioxide. Do Aromatic Anion Radicals React in an Outer-Sphere Manner?", J. Am. Chem. Soc. (1996), vol. 118, pp. 7190-7196.
Goodridge, F. et al., "The electrolytic reduction of carbon dioxide and monoxide for the production of carboxylic acids", Journal of Applied Electrochemistry, 1984, vol. 14, pp. 791-796.
Green et al., "Vapor-Liquid Equilibria of Formaldehyde-Methanol-Water", Industrial and Engineering Chemistry, Jan. 1955, vol. 47, No. 1, pp. 103-109.
Hammouche et al., "Chemical Catalysis of Electrochemical Reactions. Homogeneous Catalysis of the Electrochemical Reduction of Carbon Dioxide by Iron ("0") Porphyrins. Role of the Addition of Magnesium Cations", J. Am. Chem. Soc. 1991, 113, 8455-8466.
Heldebrant et al., "Reversible Zwitterionic Liquids. The Reaction of Alkanol Guanidines, Alkanol Amidines, and Diamines with CO2", Green Chem. 2010, vol. 12, pp. 713-721.
Hori, "Electrochemical CO2 Reduction on Metal Electrodes", Mdoern Aspects of Electrochemistry, No. 42, 2008, pp. 89-189.
Hori et al., "Enhanced formation of Ethylene and Alcohols at Ambient Temperature and Pressure in Electrochemical Reduction of Carbon Dioxide at a Copper Electrode", J. Chem. Soc. Chem. Commun (1988), pp. 17-19.

(56) References Cited

OTHER PUBLICATIONS

Hossain et al., "Palladium and Cobalt complexes of Substituted Quinoline, Bipyridine and Phenanthroline as Catalysts for Electrochemical Reduction of Carbon Dioxide", Electrochimica Acta (1997), vol. 42, No. 16, pp. 2577-2785.
Ishida et al., Selective Formation of HC00- In the Electrochemical CO2 Reduction Catalyzed by URU(BPY)2(CO)2 3/4 2+ (BPY= 2,2'-Bypyridine), Journal of the Chemical Society, Chemical Communications, Chemical Society, Letchworth, GB, Jan. 1, 1987, pp. 131-132.
Jaaskelainen et al., The use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).
Jaime-Ferrer et al., "Three-Compartment Bipolar Membrane Electrodialysis for Splitting of Sodium Formate into Formic Acid and Sodium Hydroxide: Role of Diffusion of Molecular Acid", Journal of Membrane Science (2008), vol. 325, pp. 528-536.
James Grimshaw, "Electrochemical Reactions and Mechanisms in Organic Chemistry", 2000, ISBN 978-0-444-72007-8, [retrieved on Jan. 3, 2014]. Retrieved from the internet <URL: http://f3.tiera.ru/ShiZ/Great%20Science%20TextBooks/Great%Science%20Textbooks%20DVD%20Library%202007%20-%20Supplement%20Five/Chemistry/Organic%20Chemistry/Electrochemical%20Reactions%20and%20Mechanisms%20in%20Organic%20Chemistry%20-%20J.%20Grimshaw%20%28Elsevier, %202000%29%WW.pdf>.
Kaneco et al., "Electrochemical Reduction of Carbon Dioxide to Ethylene with High Faradaic Efficiency at a Cu Electrode in CsOH/Methanol", Electrochemica Acta (1999), vol. 44, pp. 4701-4706.
Kaneco et al., Electrochemical Conversion of Carbon Dioxide to Formic Acid on Pb in KOH/Methanol Electrolyte at Ambient Temperature an Pressure, Energy (1998), vol. 23, No. 12, pp. 1107-1112.
Keith Scott, "A Preliminary Investigation of the Simultaneous Anodic and Cathodic Production of Glyoxylic Acid", Electrochimica Acta, vol. 36, No. 9, pp. 1447-1452, 1991, Printed in Great Britain.
Kiyoshi Kudo et al., "Synthesis of oxalate from carbon monoxide and carbon dioxide in the presence of caesium carbonate", J. Chem. Soc., Perkin Trans. 2, 1997, pp. 679-682.
Koeleli et al., "Electrochemical Reduction of CO2 at Pb- and Sn-Electrodes in a Fixed-Bed Reactor in Aqueous K2CO3 and KHCO3 Media", Journal of Applied Electrochemistry, vol. 33 No. 5, 2003, pp. 447-450, Abstract Only.
Kotaro Ogura et al., "Selective Conversion of CO2 to Ethylene by the Electrolysis at a Three-Phase (gas/liquid/Solid) Interface in an Acidic Solution Containing Cupric Ions", Fuel Chemistry Division Prerprints 2003, 48(1), 264.
K. S. Udupa et al., "The electrolytic reduction of carbon dioxide to formic acid", Electrochimica Acta, 1971, vol. 16, pp. 1593-1598, Pergamon Press, Printed in Northern Ireland.
Liansheng et al., Journal of South Central University Technology, "Electrode Selection of Electrolysis with Membrane for Sodium tungstate Solution", 1999, 6(2), pp. 107-110.
Mahmood et al., "Use of Gas-Diffusion Electrodes for High-Rate Electrochemical Reduction of Carbon Dioxide. II. Reduction of Metal Phthalocyanine-Impregnated Electrodes", J. of Appl. Electrochem. (1987), vol. 17, pp. 1223-1227.
M. C. Boswell et al., "The Action of Sodium Hydroxide on Carbon Monoxide, Sodium formate and Sodium Oxalate", J. American Chem. Soc., vol. 80, 1918, pp. 1779-1786.
Nefedov et al., "the Effect of Pyridine Bases and Transition-Metal Oxides on the Activity of PdCl2 in the Carbonylation of Aromatic Mononitro Compounds by Carbon Monoxide", 28 bulletin of the Acad. of Sciences of the USSR3, pp. 540-543 (1979).
Perez et al., "Activation of Carbon Dioxide by Bicyclic Amidines", J. Org. Chem. (2004), vol. 69, pp. 8005-8011.
P. W. T. Lu et al., "Recentdevelopments in the technology of sulphur dioxide depolarized electrolysis", Journal of Applied Electrochemistry, vol. 11, No. 3, May 1981, pp. 347-355.
S. Gambino et al., "On the electrochemical reduction of carbon dioxide and ethylene", Tetrahydron Letters, No. 32, pp. 3025-3028, 1973, Pergamon Press, Printed in Great Britain.
Satoshi Kaneco et al., "Electrochemical reduction of carbon dioxide to ethylene with high Faradaic efficiency at a Cu electrode in CsOH/Methanol", Electrochimica Acta 44 (1999), pp. 4701-4706.
Scibioh et al., "Electrochemical Reduction of Carbon Dioxide: A Status report", Proc. Indian Natn. Sci. Acad. (May, 2004), vol. 70, A, No. 3, pp. 407-462.
Seshadri et al., "A new homogeneous catalyst for the reduction of carbon dioxide to methanol at low overpotential", Journal of Electroanalytical Chemistry, 372 (1994), pp. 145-150.
Seshadri, "Part I Electrocatalysis at modified semiconductor and metal electrodes; Part II Electrochemistry of nickel and cadmium hexacyanoferrates", Diss. Abstr. Int. B 1944, 54 (12, Pt. 1), 6198, pp. 52-85.
Shibata et al., "Electrochemical Synthesis of Urea at Gas-Diffusion Electrodes Part VI. Simultaneous Reduction of Carbon Dioxide and Nitrite Ions with Various Metallophthalocyanine Catalysis", J. of Electroanalytical Chemistry (2001), vol. 507, pp. 177-184.
T. Meisel et al., "The thermal decomposition of alkali metal formates", Journal of Thermal Analysis, vol. 7, No. 1, Feb. 1, 1975, pp. 73-80.

* cited by examiner

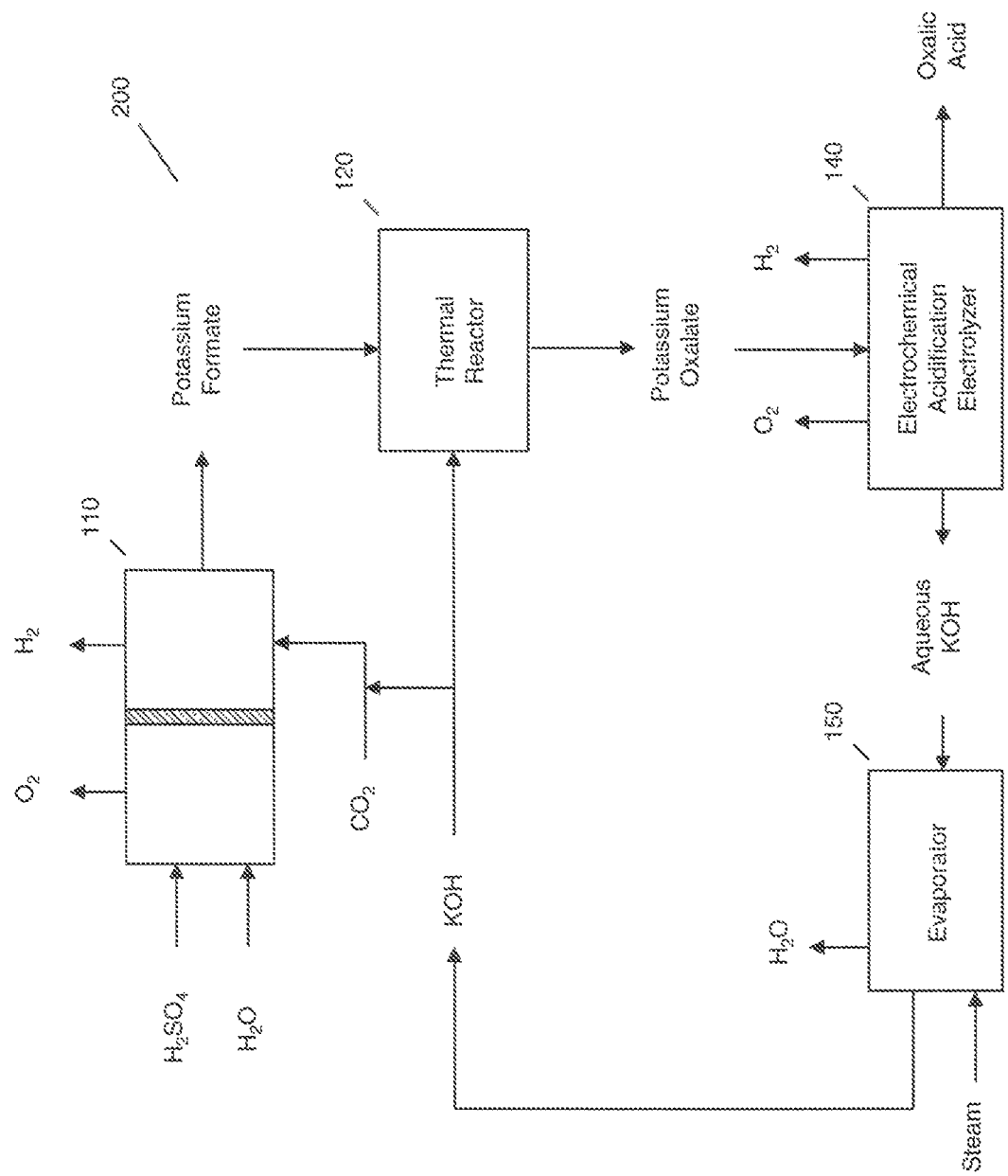

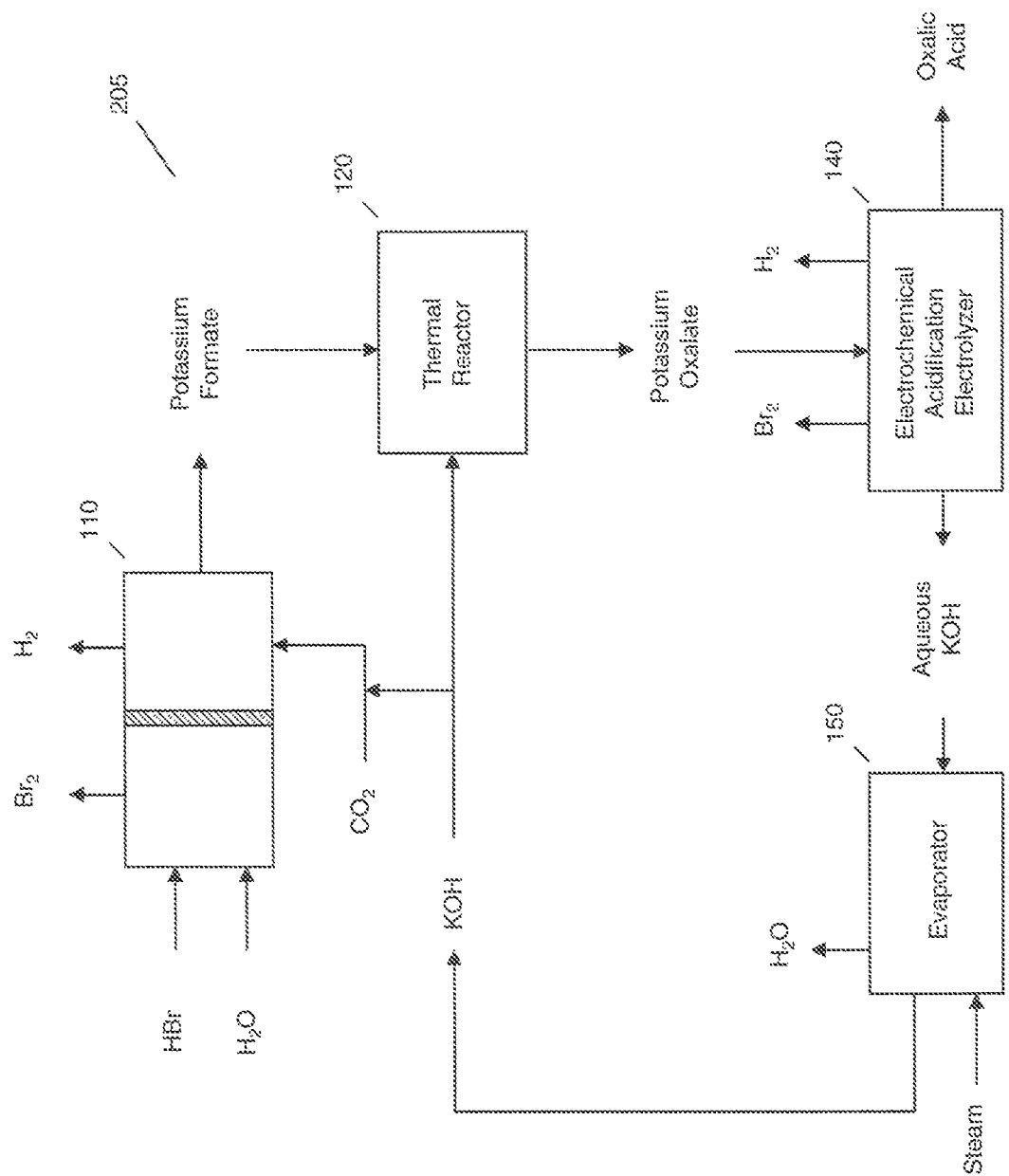

METHOD AND SYSTEM FOR ELECTROCHEMICAL REDUCTION OF CARBON DIOXIDE EMPLOYING A GAS DIFFUSION ELECTRODE

CROSS REFERENCE TO RELATED APPLICATIONS

The present application claims the benefit under 35 U.S.C. § 120 of U.S. patent application Ser. No. 14/726,061.

U.S. patent application Ser. No. 14/726,061 claims the benefit under 35 U.S.C. § 119 of U.S. Provisional Patent Application Ser. No. 62/004,544 filed May 29, 2014, U.S. Provisional Patent Application Ser. No. 62/014,465 filed Jun. 19, 2014 and U.S. Provisional Patent Application 62/108,407 filed Jan. 27, 2015.

U.S. patent application Ser. No. 14/726,061 claims the benefit under 35 U.S.C. § 120 of U.S. application Ser. No. 13/934,500 filed Jul. 3, 2013, which in turn claims the benefit under 35 U.S.C. § 120 of Ser. No. 13/724,339 filed Dec. 21, 2012, which in turn claims the benefit under 35 U.S.C. § 119(e) of U.S. Provisional Application Ser. No. 61/720,670 filed Oct. 31, 2012, U.S. Provisional Application Ser. No. 61/715,060 filed Oct. 17, 2012, U.S. Provisional Application Ser. No. 61/675,938 filed Jul. 26, 2012, U.S. Provisional Application Ser. No. 61/703,158 filed Sep. 19, 2012, U.S. Provisional Application Ser. No. 61/703,229 filed Sep. 19, 2012, U.S. Provisional Application Ser. No. 61/703,175 filed Sep. 19, 2012, U.S. Provisional Application Ser. No. 61/703,231 filed Sep. 19, 2012, U.S. Provisional Application Ser. No. 61/703,232, filed Sep. 19, 2012, U.S. Provisional Application Ser. No. 61/703,234, filed Sep. 19, 2012, U.S. Provisional Application Ser. No. 61/703,238 filed Sep. 19, 2012 and U.S. Provisional Application Ser. No. 61/703,187 filed Sep. 19, 2012, and which incorporates by reference U.S. application Ser. No. 13/724,878 filed Dec. 21, 2012, U.S. application Ser. No. 13/724,647 filed Dec. 21, 2012, U.S. application Ser. No. 13/724,231 filed Dec. 21, 2012, U.S. application Ser. No. 13/724,807 filed Dec. 21, 2012, U.S. application Ser. No. 13/724,996 filed Dec. 21, 2012, U.S. application Ser. No. 13/724,719 filed Dec. 21, 2012, U.S. application Ser. No. 13/724,082 filed Dec. 21, 2012, and U.S. application Ser. No. 13/724,768 filed Dec. 21, 2012.

U.S. patent application Ser. No. 14/726,061 claims the benefit under 35 U.S.C. § 120 of PCT Application Serial Number PCT/US2014/046555 filed Jul. 14, 2014.

All subject matter of the previously mentioned U.S. provisional applications, U.S. patent applications and PCT applications are hereby incorporated herein by reference in their entireties.

TECHNICAL FIELD

The present disclosure generally relates to the field of electrochemical reactions, and more particularly to a method and system for reducing carbon dioxide to a reduction product.

BACKGROUND

The combustion of fossil fuels in activities such as electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean, and other potentially damaging effects. Countries around the world, including the United States, may be seeking ways to mitigate emissions of carbon dioxide.

One implementation may be to convert carbon dioxide into economically valuable materials such as fuels and industrial chemicals. If the carbon dioxide may be converted using energy from renewable sources, it will be possible to both mitigate carbon dioxide emissions and to convert renewable energy into a chemical form that may be stored for later use. Electrochemical and photochemical pathways may be likely mechanisms for carbon dioxide conversion.

SUMMARY OF THE PREFERRED EMBODIMENTS

The present disclosure is a method and system for the reduction of carbon dioxide. The method may include receiving hydrogen gas at an anolyte region of an electrochemical cell including an anode, the anode including a gas diffusion electrode, receiving an anolyte feed at an anolyte region of the electrochemical cell, and receiving a catholyte feed including carbon dioxide and an alkali metal bicarbonate at a catholyte region of the electrochemical cell including a cathode. The method may include applying an electrical potential between the anode and cathode sufficient to reduce the carbon dioxide to at least one reduction product.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the present disclosure may be better understood by those skilled in the art by reference to the accompanying figures in which:

FIG. 2A shows a system for production of oxalic acid starting with the electrochemical generation of formate using carbon dioxide in accordance with an embodiment of the present disclosure;

FIG. 2B shows a system for production of oxalic acid via electrochemical generation of formate using carbon dioxide and utilizing a halogen halide in the anolyte to co-produce a halogen in accordance with an embodiment of the present disclosure;

DETAILED DESCRIPTION

Figure 1A:
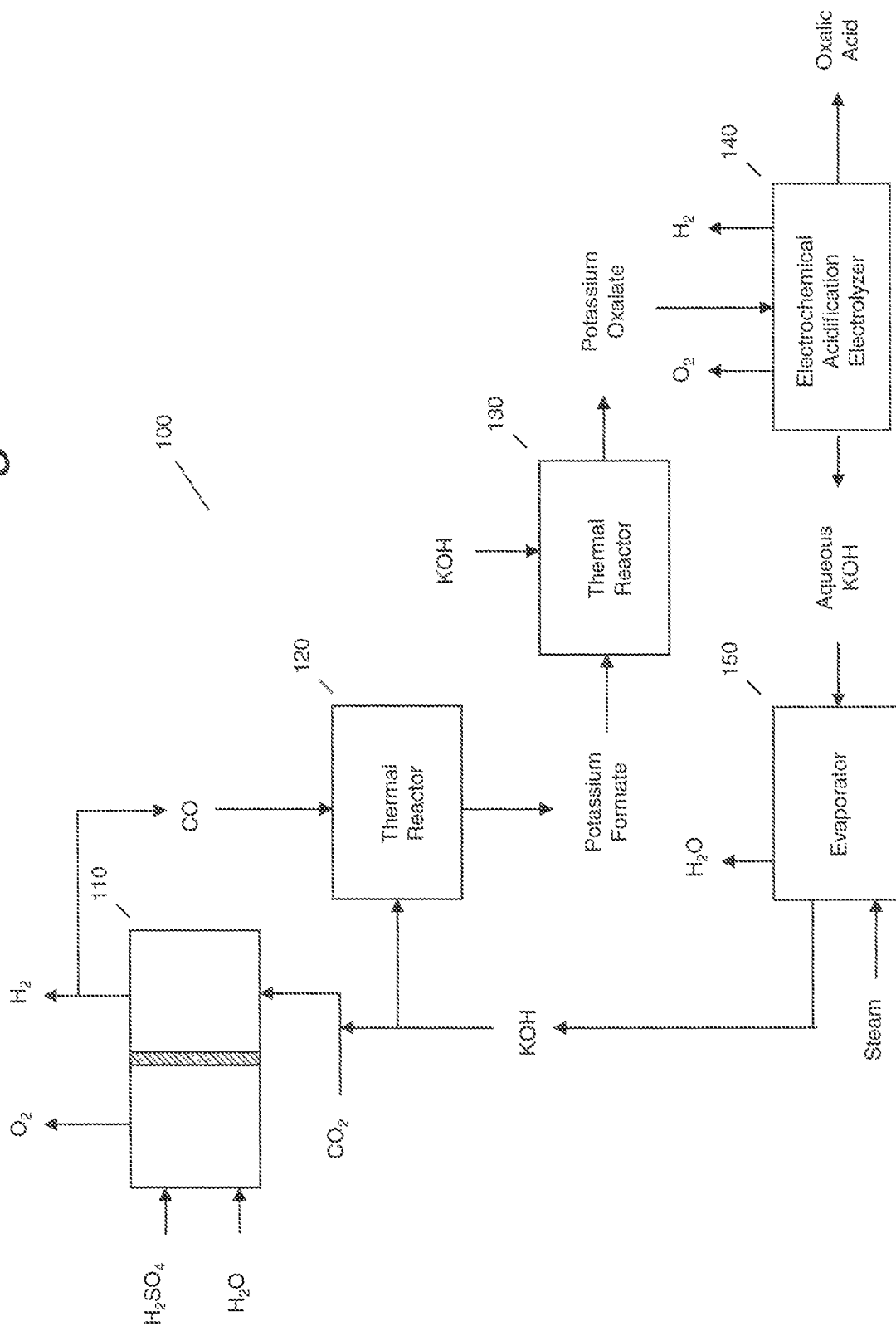
FIG. 1A shows a system for production of oxalic acid starting with the electrochemical generation of carbon monoxide from carbon dioxide in accordance with an embodiment of the present disclosure.

Reference will now be made in detail to the subject matter disclosed, which is illustrated in the accompanying drawings.

The present disclosure describes a method and system for the reduction of carbon dioxide. The method may include receiving hydrogen gas at an anolyte region of an electrochemical cell including an anode, the anode including a gas diffusion electrode, receiving an anolyte feed at an anolyte region of the electrochemical cell, and receiving a catholyte feed including carbon dioxide and an alkali metal bicarbonate at a catholyte region of the electrochemical cell including a cathode. The method may include applying an electrical potential between the anode and cathode sufficient to reduce the carbon dioxide to at least one reduction product.

Additionally, the present disclosure describes a method and system for production of carboxylic based chemicals, including carboxylic acids and salts. The method may employ an electrochemical cell, cathode reduction reaction to produce carbon monoxide (CO) or alkali metal formate from a carbon dioxide feedstock. A thermal reaction with the addition of a small amount of an alkali metal hydroxide catalyst may be used to combine, for example, two alkali metal formate molecules, into an alkali metal oxalate product.

The alkali metal oxalate may be then converted to oxalic acid by a membrane based electrochemical acidification process, where protons ($H^+$ ions) formed at the anode may be used to replace the alkali metal ions, and the alkali metal ions ($M^+$) may be captured as alkali metal hydroxide (MOH) at the cathode, and may be recycled to be used as the alkali metal hydroxide used in a thermal intermolecular condensation process unit operation.

Alternatively, the alkali metal oxalate may be converted to oxalic acid through treatment with mineral acid, such as HCl, HBr, HI, $H_2SO_4$, $H_3PO_4$, and the like. For example, sodium oxalate may be treated with aqueous HCl may produce an oxalic acid solution including NaCl. The oxalic acid may be extracted from the solution via extraction with an organic solvent such as alcohol, ether, halo-organic, ketone, amide, or ester. Useful solvents include, but are not limited to, methanol, ethanol, propanol, diethyl ether, methyl ethyl ether, methyl tert-butyl ether, tetrahydrofuran, dioxane, methylene chloride, chloroform, carbon tetrachloride, chlorobenzene, di-chlorobenzene, methyl acetate, ethyl acetate, methyl propionate, ethyl propionate, acetone, butanone, dimethylformamide, N-methyl pyrrolidone, and the like. The oxalic acid may also be recovered from the solution through crystallization from the aqueous solution. Crystallization may require concentrating the solution by evaporation and/or by cooling the solution.

After removal of oxalic acid, the aqueous solution including salt (NaCl for example) may be recycled by sending it to an anolyte compartment of an electrochemical cell. Halide ions (for example chloride) may be oxidized to form halogen (for example chlorine). The halogen may be isolated from an anolyte stream after exiting an anolyte compartment of an electrochemical cell. The halogen may be reacted with hydrogen, for example hydrogen produced during a thermal alkali metal formate to alkali metal oxalate calcination reaction. Hydrogen may also be obtained from another source. The mineral acid (HCl for example) formed by the reaction of hydrogen with halogen may be used to acidify alkali metal oxalate, completing the cycle. The energy produced (heat or electrical energy) by reacting halogen with hydrogen may be captured and used in other processes (in the thermal calcination reaction for example) or may be used elsewhere.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Referring to FIG. 1A, a system 100 for production of a dicarboxylic acid, such as oxalic acid, starting with the electrochemical generation of formate from the electrochemical reduction of carbon dioxide in accordance with an embodiment of the present disclosure is shown. System 100 may include an electrochemical cell 110. Electrochemical cell 110 (also referred as a container, electrolyzer, or cell) may be implemented as a divided cell. The divided cell may be a divided electrochemical cell and/or a divided photoelectrochemical cell. Electrochemical cell 110 may include an anolyte region and a catholyte region. Anolyte region and catholyte region may refer to a compartment, section, or generally enclosed space, and the like without departing from the scope and intent of the present disclosure.

Catholyte region may include a cathode. Anolyte region may include an anode. An energy source (not shown) may generate an electrical potential between the anode and the cathode of electrochemical cell 110. The electrical potential may be a DC voltage. Energy source may be configured to supply a variable voltage or constant current to electrochemical cell 110. A separator may selectively control a flow of ions between the anolyte region and the catholyte region. Separator may include an ion conducting polymer based membrane, an ion conducting inorganic material, a combination polymer/inorganic based membrane, or a diaphragm material such as expanded PTFE (polytetrafluoroethylene) and the like.

Electrochemical cell 110 may operate to perform an electrochemical reduction of carbon dioxide in an electrochemical cell producing carbon monoxide (CO) and hydrogen as cathode products and oxygen as an anode product when using an anolyte including sulfuric acid ($H_2SO_4$).

The CO generated from electrochemical cell 110 may be separated from the hydrogen and then passed to a thermal reactor 120. Thermal reactor 120 may react the carbon monoxide with an alkali metal hydroxide, such as KOH via a thermal intermolecular condensation reaction to form alkali metal formate. Thermal reactor 120 may operate to perform a thermal decomposition reaction or a carbonylation reaction, which may be reactions which incorporate CO into organic and inorganic chemical structures.

Alkali metal formate formed from thermal reactor 120 may be passed to another thermal reactor 130. Thermal reactor 130 may perform a second thermal intermolecular condensation reaction employing an alkali metal hydroxide (e.g. KOH) that may promote the reaction to produce alkali metal oxalate. While system 100 of FIG. 1 depicts a thermal reactor 120 and thermal reactor 130, it is contemplated that a single thermal reactor may be employed with system 100 without departing from the scope and intent of the present disclosure.

Alkali metal oxalate from thermal reactor 130 may be dissolved in water and may be passed to an electrochemical acidification electrolyzer 140. Electrochemical acidification electrolyzer 140 may produce a dicarboxylic acid, such as oxalic acid, and KOH along with oxygen and hydrogen byproducts. Electrochemical acidification electrolyzer 140 may be a membrane based unit including of at least three regions, including an anode region, one or more central ion exchange regions, and a cathode region. It is contemplated that an energy source (not shown) may generate an electrical potential between the anode and the cathode of electrochemical acidification electrolyzer 140 sufficient to produce oxalic acid. Alkali metal oxalate may be passed through the central ion exchange region where alkali metal ions may be replaced with protons, and the displaced alkali metal ions pass through the adjoining membrane into the cathode region to form alkali metal hydroxide (e.g. KOH). The anode reaction may utilize an acid, such as sulfuric acid, producing oxygen and hydrogen ions.

The hydrogen byproduct resulting from electrochemical acidification electrolyzer 140, as an alternative embodiment, may be used as a fuel to produce steam or used in another chemical process that may utilize hydrogen, such as a hydrogenation process.

The dicarboxylic acid, such as an oxalic acid product may be purified to produce a final purified product, or may be further processed as a chemical intermediate to produce another product, such as monoethylene glycol, using a reduction process such as an electrochemical reduction or a catalytic hydrogenation process.

Aqueous KOH from electrochemical acidification electrolyzer 140 may be passed to an evaporator 150. Evaporator 150 may evaporate the water from aqueous KOH product using steam or another heat source, converting it into a concentrated aqueous solution and/or solid with 5% or less water content as needed in electrochemical cell 110 and thermal reactor 120.

Figure 1B:
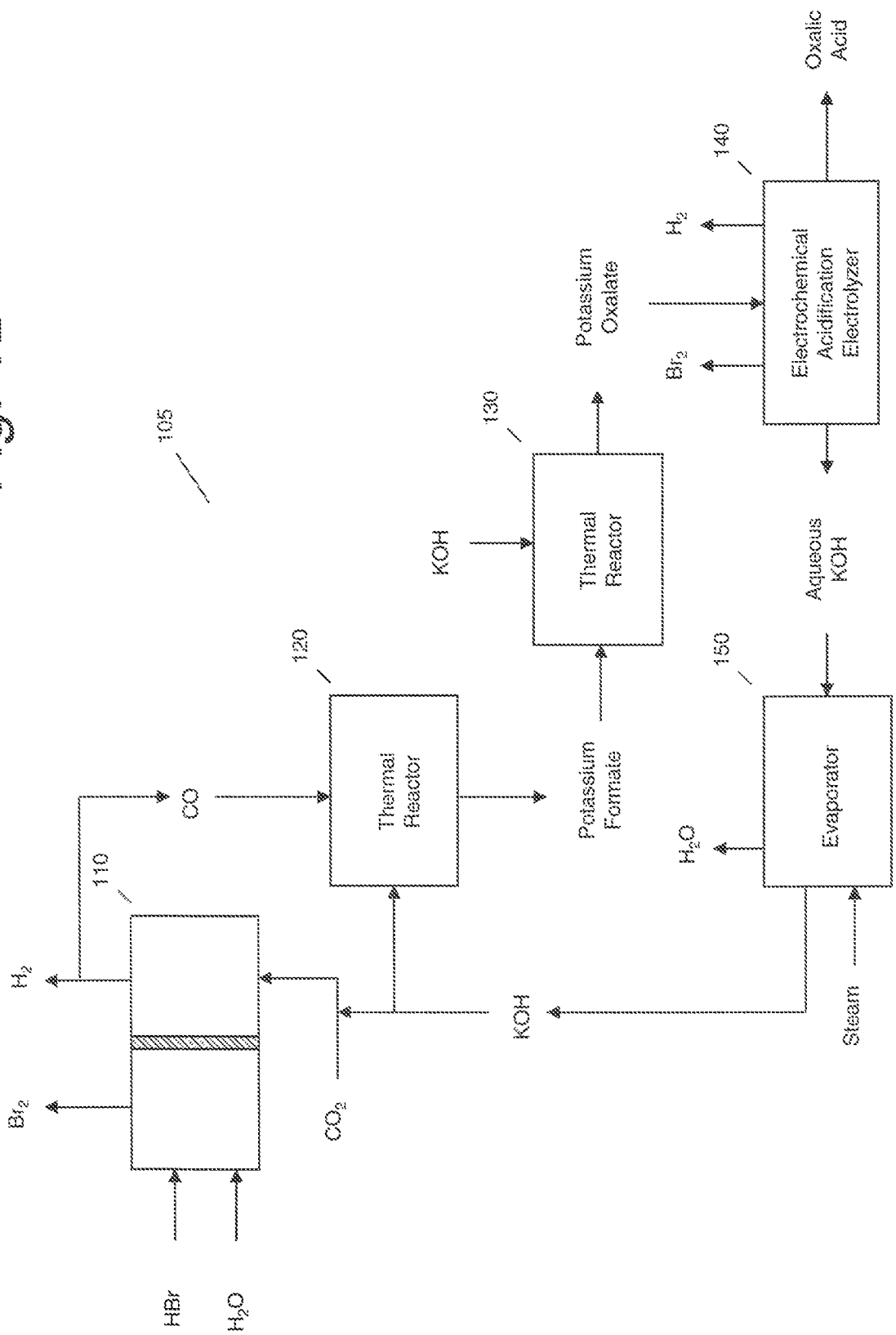
FIG. 1B shows a system for the production of oxalic acid utilizing a hydrogen halide in the anolyte to co-produce a halogen in accordance with an embodiment of the present disclosure.

Referring to FIG. 1B, a system 105 for production of dicarboxylic acid, such as oxalic acid, utilizing a hydrogen halide, such as HBr, in anolyte to co-produce bromine in accordance with an embodiment of the present disclosure is shown. System 105 may operate with a less energy intensive electrochemical process, using HBr as the anolyte in the anode region of electrochemical cell 110 and electrochemical acidification electrolyzer 140, producing bromine and hydrogen ions at a significantly lower anode potential. The bromine may then be used, for example, in reactions to produce brominated chemical products, such as brominated organic compounds, for example bromoethane, which may then be converted into alcohols such as ethanol, or converted to monoethylene glycol in a series of thermochemical reactions. It is contemplated that system 105 shown with thermal reactor 120 and thermal reactor 130 could be implemented with a single thermal reactor without departing from the scope and intent of the present disclosure.

Referring to FIG. 2A, a system 200 for production of dicarboxylic acid, such as oxalic acid, starting with the electrochemical generation of formate using carbon dioxide in accordance with an embodiment of the present disclosure is shown. System 200 may provide an alternative system for production of oxalic acid as produced by systems 100 of FIG. 1A and 105 FIG. 1B respectively.

System 200 may include an electrochemical cell 110. Electrochemical cell 110 may operate to perform an electrochemical reduction of carbon dioxide with an alkali metal carbonate and/or alkali metal bicarbonate cathode feed, which may be formed from the reaction of $CO_2$ with alkali metal hydroxide, to produce alkali metal formate along with oxygen as an anode product when using an anolyte including sulfuric acid ($H_2SO_4$). The alkali metal formate product solution concentration from the catholyte compartment of electrochemical cell 110 may range from 1 wt % to 30 wt % or more based on the formate ion, and preferably range from 5 wt % to 20 wt % as formate. The corresponding % weight as the alkali metal formate, for example alkali metal formate may be based on the molecular weight of the alkali metal compound.

Alkali metal formate may be passed to a thermal reactor 120. Thermal reactor 120 may perform a thermal intermolecular condensation reaction with the addition of a small amount of catalyst, such as an alkali metal hydroxide (e.g. KOH) which may increase the conversion yield to produce alkali metal oxalate.

Alkali metal oxalate from thermal reactor 120 may be dissolved in water and may be passed to an electrochemical acidification electrolyzer 140. Electrochemical acidification electrolyzer 140 may produce dicarboxylic acid, such as oxalic acid, and KOH along with oxygen and hydrogen byproducts. Electrochemical acidification electrolyzer 140 may be a membrane based unit including of at least three regions, including an anode region, one or more central ion exchange regions, and a cathode region. Alkali metal oxalate may be passed through the central ion exchange region where alkali metal ions may be replaced with protons, and the displaced alkali metal ions pass through the adjoining membrane into the cathode region to form an alkali metal hydroxide, such as KOH. The anode reaction may utilize an acid, such as sulfuric acid, producing oxygen and hydrogen ions.

The hydrogen byproduct resulting from electrochemical acidification electrolyzer 140, as an alternative embodiment, may be used as a fuel to produce steam or used in a side process that may utilize hydrogen, such as in a chemical hydrogenation process.

The dicarboxylic acid, such as oxalic acid product may be purified to produce a final purified product, or may be further processed as a chemical intermediate to produce another product, such as monoethylene glycol, using an electrochemical reduction or thermochemical process.

Aqueous KOH from electrochemical acidification electrolyzer 140 may be passed to an evaporator 150. Evaporator 150 may evaporate the water from aqueous KOH product using steam or another heat source, converting it into a concentrated aqueous solution and/or solid with 5% or less water content as needed in the electrochemical cell 110 or thermal reactor 120.

Referring to FIG. 2B, a system 205 for production of dicarboxylic acid, such as oxalic acid, via electrochemical generation of formate using carbon dioxide and utilizing a halogen halide in the anolyte to co-produce a halogen, such as bromine, in accordance with an embodiment of the present disclosure is shown. System 205 may be similar to system 200, where system 205 may use a hydrogen halide, such as HBr as the anolyte in the anode regions of electrochemical cell 110 and electrochemical acidification electrolyzer 140. Electrochemical cell 110 may produce bromine and hydrogen ions at a significantly lower anode potential. Bromine may then be used, for example, in reactions to produce brominated chemical products, such as bromoethane, which may then be converted into alcohols such as ethanol, or converted to monoethylene glycol in a series of thermochemical reactions.

Figure 3:
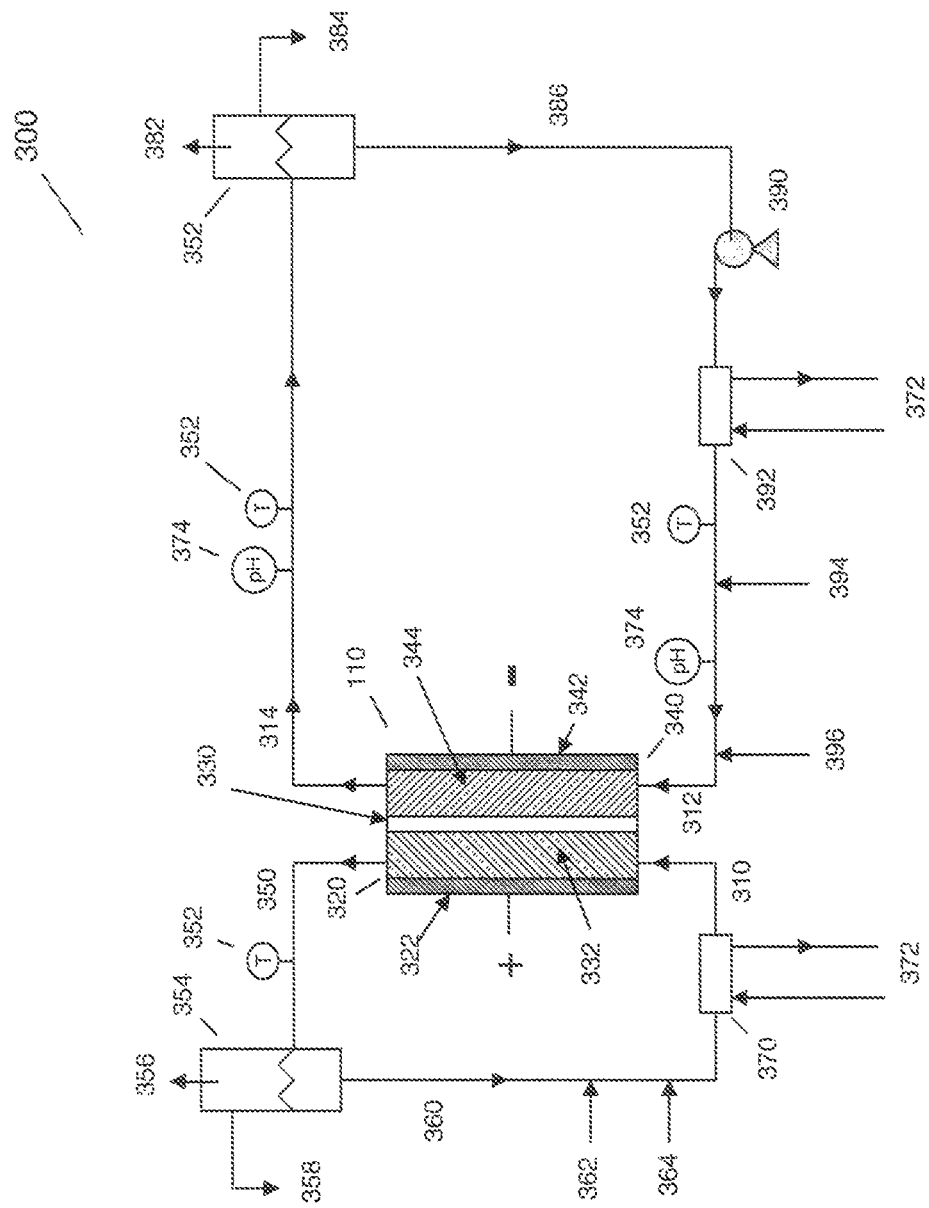
FIG. 3 shows a system for production of alkali metal formate using carbon dioxide in accordance with an embodiment of the present disclosure.

Referring to FIG. 3, a system 300 for production of a formate, such as alkali metal formate, using carbon dioxide in accordance with an embodiment of the present disclosure is shown. FIG. 3 illustrates the electrochemical reduction of carbon dioxide in the production of an alkali metal formate as shown in electrochemical cell 110 of FIG. 2A and FIG. 2B. Electrochemical cell 110 may include an anolyte input feed 310 and a catholyte input feed 312 to produce a product 314. Product 314 may be a solution of alkali metal formate with excess alkali metal bicarbonate ($KHCO_3$). Anolyte region 320 may have a titanium anode 322 having an anode electrode catalyst coating facing cation exchange membrane 330. Anode mesh screen 332 may be a folded expanded titanium screen with an anode electrocatalyst coating and provides spacing and contact pressure between anode 322 and cation exchange membrane 332. Cation exchange membrane 330 may selectively control a flow of ions between anolyte region 320 from catholyte region 340.

Catholyte region 340 may have a mounted cathode 342, which may be a metal electrode with an active electrocatalyst layer on the front side facing membrane 330. High surface area cathode structure 344 may be mounted with direct contact pressure between the face of cathode 342 and cation membrane 330.

As shown in FIG. 1A and FIG. 2A, feeding anolyte region 320 may be stream 310 which may include anolyte, the anolyte including an aqueous sulfuric acid electrolyte solution. Stream 310 may enter the anolyte region 320 and flow by the face of anode 322 through folded anode screen 332. Anode reactions may include splitting of water into oxygen ($O_2$) and hydrogen ions ($H^+$) or protons. The gases and liquid mixture from anolyte region 320 may leave as stream 350, which flows by temperature sensor 352 monitoring a solution temperature in the stream, and into anolyte gas/liquid disengager 354. In disengager 354, the gas may be vented as stream 356, and excess anolyte overflow leaves as stream 358. Stream 360 may be a gas-depleted exit stream from the anolyte disengager 354, with a deionized water feed stream 362 and a sulfuric acid make-up feed stream 364 added to the recirculation stream to maintain anolyte acid strength and volume. Stream 360 with added streams 362 and 364 may then pass through an optional heat exchanger 370 with a cooling water supply 372, and then becomes stream 310 feeding into the anolyte region 320.

Electrochemical cell 110 may include a catholyte region 340 which includes cathode 342 having an electrocatalyst surface facing membrane 330. High surface area cathode structure 344 may be mounted between membrane 330 and cathode 342, relying on contact pressure with cathode 342 for conducting electrical current into the structure. The interface between high surface area structure 344 and membrane 330 may utilize a thin expanded plastic mesh insulator screen (not shown) to minimize direct contact of the high surface area cathode material with the membrane 330.

Feed stream 312 may feed into catholyte region 340, flowing through the high surface area structure 344 and across the face of cathode 342 where cathode reduction reactions between carbon dioxide, electrolyte, and cathode material at the applied current and voltage potential produce exit stream 314, the exit stream including a formate.

Stream 314 may be the exit solution and gas mixture product from the cathode reaction which flows by pH monitoring sensor 374 and temperature sensor 352 and then into catholyte gas/liquid disengager 380 where the gas exits as stream 382 and formate/electrolyte overflow exits as stream 384, and the gas-depleted stream leaves the disengager as stream 386. Stream 386 may then enter an input of catholyte recirculation pump 390, which then passes through heat exchanger 392 which uses cooling water 372, then passes by temperature sensor 352. A fresh catholyte electrolyte feed 394 may be metered into stream 386 which may be used to adjust the catholyte flow stream pH into the catholyte region 340 and control a product overflow rate and sets the formate product concentration, with the pH monitored by pH sensor 374. Carbon dioxide flow stream 396 may be metered into the flow stream which enters the catholyte region 340 as stream 312.

In an alternative embodiment, as shown in FIGS. 1B and 2B, the anolyte including sulfuric acid shown in FIGS. 1A and 2A may be replaced with an anolyte including hydrogen halide (e.g. HBr), producing a halide (e.g. bromine) and hydrogen ions at a lower voltage potential than required for the generation of oxygen at the anode. The halide may then be used, for example, in reactions to produce halide chemical products, such as bromoethane in the reaction with an alkane, such as ethane, which may then be converted into alcohols (e.g. ethanol) or converted to monoethylene glycol in a series of thermochemical reactions.

Figure 4:
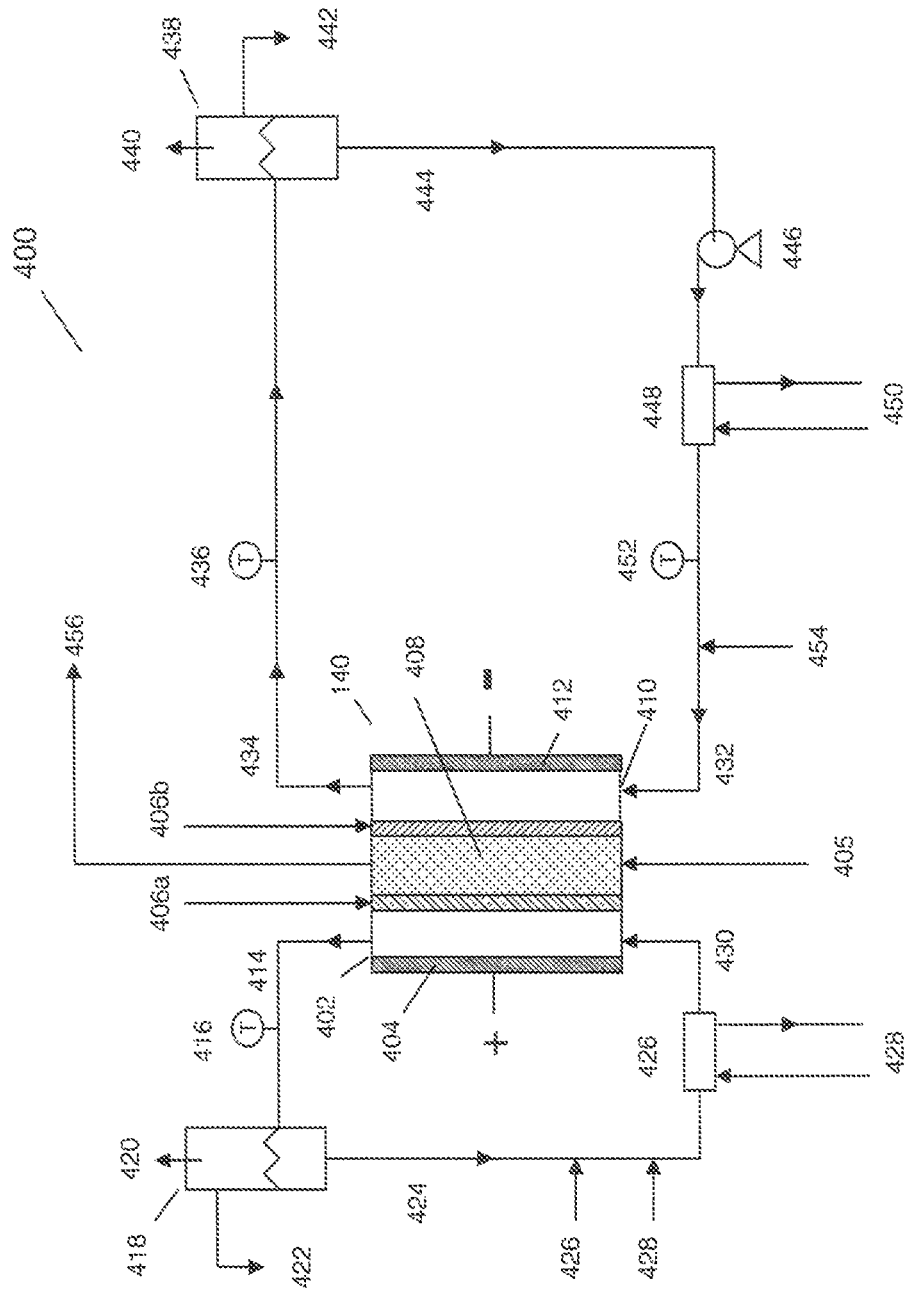
FIG. 4 shows a system for electrochemical acidification of alkali metal oxalate in accordance with an embodiment of the present disclosure.

Referring to FIG. 4, system 400 for electrochemical acidification of alkali metal oxalate in accordance with an embodiment of the present disclosure is shown. Electrochemical acidification electrolyzer 140 may include an anolyte region 402, a central ion exchange region 408 bounded by cation ion exchange membranes 406a and 406b on each side, and a catholyte region 410 where an alkali metal hydroxide (e.g. KOH) may be formed. Hydrogen ions ($H^+$) or protons may be generated in the anolyte region 402, which then may pass through the adjoining membrane 406a into the central ion exchange region 408 when a potential and current may be applied to the cell. An alkali metal oxalate (e.g. alkali metal oxalate) product solution 405, such as generated in thermal reactor 120 of FIG. 1A and 130 of FIG. 2B respectively, may pass through the central ion exchange region 408, where protons displace the alkali metal ions in the solution stream, thus acidifying the solution and forming a dicarboxylic acid, such as oxalic acid. Stream 456, and the displaced alkali metal ions may pass through the adjoining cation exchange membrane 406b into the catholyte region 410, where they combine with hydroxide ions ($OH^-$) formed from water reduction reaction at the cathode to form an alkali metal hydroxide (e.g. KOH) stream 434.

Electrochemical acidification electrolyzer 140 may include input feeds 430 and 432 and may produce a solution of dicarboxylic acid (e.g. oxalic acid) 456, oxygen 420 from the anolyte region 402, and KOH 442 from the catholyte region 410. Anode region 402 may include a titanium anode 404 with an anode electrode catalyst coating facing cation exchange membrane 406a. The central ion exchange region 408 may contain a plastic mesh spacer to maintain the space in the central ion exchange region between cation exchange membranes 406a and 406b. Optionally, one alternate material used within the central ion exchange region may be the use of a cation ion exchange material, so that there may be increased electrolyte conductivity in the ion exchange region solution and which may also help capture and exchange cations, such as potassium, to improve the efficiency of the proton exchange with the cations. Catholyte region 410 may include a cathode 412.

Anolyte region 402 may have feed stream input 430 including sulfuric acid, which may flow through the anolyte region 402 and exit as stream 414 including a gas and liquid, passing by temperature sensor 416 into anolyte disengager 418, where the gas exits as stream 420 and liquid overflow as stream 422. Gas-depleted stream 424 may exit the anolyte disengager 418 and deionized water stream 426 may be metered into the stream 424 as well as sulfuric acid make-up stream 428 to maintain acid electrolyte strength in the anolyte region 402. Stream 424 may pass through optional heat exchanger 426 which may have cooling water supply 428 to cool or maintain the stream 424 temperature, and the stream 424 enters the anolyte region 402 as stream 430.

Catholyte region 410 may include feed stream 432 which may be the recirculating alkali metal hydroxide (e.g. KOH) in the catholyte loop, which enters catholyte region 410 and flows by cathode 412, which may generate hydrogen gas and hydroxide ($OH^-$) ions, and forms a alkali metal hydroxide from the combination of alkali metal ions crossing the membrane 406b with the hydroxide ions formed at the cathode 412 from the reduction of water. Exit stream 434 from the cathode region 410 may contain alkali metal hydroxide and hydrogen gas from the cathode reactions, and passes by temperature sensor 436 and then into catholyte disengager 438, where hydrogen gas 440 may be separated from the catholyte solution, which exits catholyte disengager 438 as recycle stream 444 and alkali metal hydroxide product overflow stream 442. Recycle stream 444 may pass through optional recirculation pump 446 and then through optional heat exchanger 448, which uses cooling water supply 450. The stream then passes by temperature sensor 452, and then may have a deionized water addition stream 454 added to the stream to control the alkali metal hydroxide concentration in the catholyte recirculation loop, and then re-enters the catholyte region 410 as stream 432.

In an alternative embodiment, the anolyte including sulfuric acid may be replaced with an anolyte including a hydrogen halide, such as HBr, producing bromine and hydrogen ions at a much lower voltage potential than required for the generation of oxygen at the anode.

Figure 5:
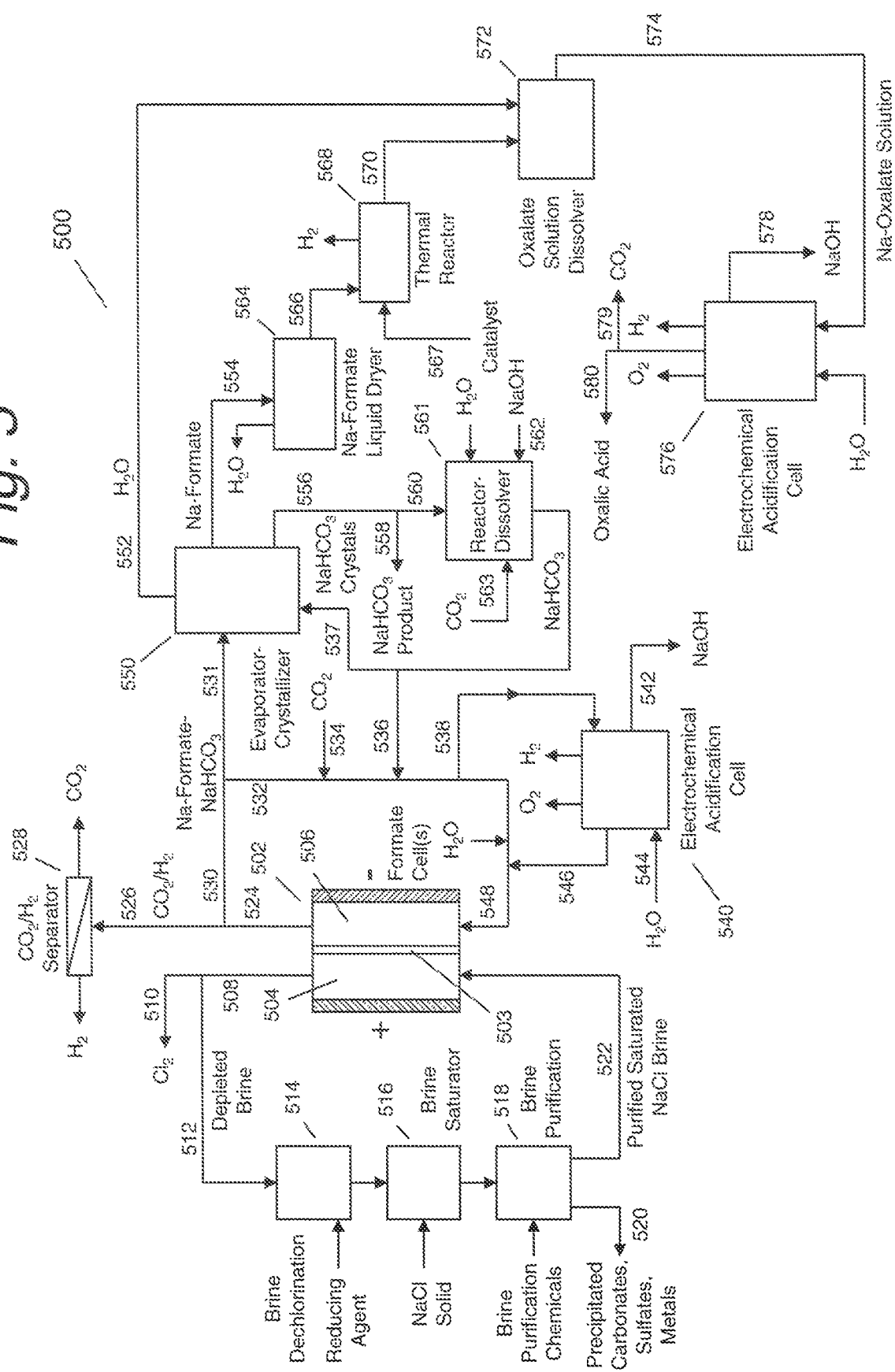
FIG. 5 shows a system for production of alkali metal formate using carbon dioxide and utilizing a alkali metal chloride brine in the anolyte to co-produce chlorine and alkali metal bicarbonate in accordance with an embodiment of the present disclosure.

FIG. 5 shows schematic drawing of system 500, an alternative embodiment in operating a system utilizing a sodium-based compound that may generate, for example, sodium formate from the electrochemical reduction of carbon dioxide followed by the conversion of the sodium formate to sodium oxalate, which may then be converted to oxalic acid. The system produces oxalic acid in addition to two additional co-products, which may be sodium bicarbonate and sodium hydroxide.

Electrochemical cell 502 may be similarly configured to the electrochemical cell as shown and described in FIG. 3 except for modifications to the feed solutions used in the anolyte and catholyte. Electrochemical cell 502 may include catholyte compartment 506 and anolyte compartment 504, and ion permeable separator 503, preferably being a cation ion exchange type membrane. A feed stream 522 of saturated NaCl brine may be introduced into catholyte compartment 504 of electrochemical cell 502, where the chloride ion of the NaCl salt solution may be oxidized to chlorine gas at the anode in anode compartment 504. As the chloride ion of the NaCl salt may be oxidized at the anode, sodium ions migrate in the potential field, and pass through separator 503 into cathode compartment 506.

The anolyte product stream 508 from catholyte compartment 504 includes a mixture of chlorine gas and NaCl depleted brine solution. The chlorine gas may then be separated or disengaged as stream 510 from stream 508 as a co-product, and the separated depleted brine solution stream 512 may then be processed in a series of steps typically used in chlor alkali processes including dechlorination of the depleted brine, resaturation of the brine solution with NaCl using a bed of solid NaCl salt, followed by a brine purification step to remove impurities, such as metals and hardness (such as $Ca^+$, $Mg^+$, and $Ba^+$), from the brine solution to impurity levels typically used to achieve long life operation of separator 503, to produce a purified saturated NaCl brine solution stream 522 which is electrolyzed in the anolyte compartment 504 of formate cell 502.

Chlorine gas 510 may then be processed in various ways, such as removal of water from the gas by condensation, and then the chlorine gas may then be used for producing various useful co-products from the system, for example, the generation of sodium hypochlorite by a reaction with NaOH, the generation of HCl through a reaction with hydrogen, as well as reactions with organics, such as to produce EDC (ethylene dichloride) by reaction with an external supply of ethylene. Many other reaction co-products made with the chlorine gas 510 may be envisioned.

Brine dechlorination unit 514 may be used to remove residual chlorine from depleted brine solution 512 using a selected reducing agent, which may include sodium sulfite, sodium hydrosulfite, activated carbon, and hydrogen peroxide among others. The dechlorinated brine then may be passed to brine saturator unit 516, where the depleted brine NaCl concentration may be increased from a typical 150-240 gm/L as NaCl to a concentration of 300-320 gm/L as NaCl using a brine saturator, which may include a bed of solid salt crystals in an apparatus typically called a briner. The saturated brine may then be passed through brine purification system 518, which may include chemical precipitation steps for the removal of most of the hardness in the solution, typically by the addition of NaOH and sodium carbonate under alkaline conditions, followed by filtration to remove the precipitated hardness containing solids, then followed by an ion exchange purification step utilizing chelating ion exchange resin beds to reduce the hardness levels in the brine to typically 20-50 ppb or less. The sulfate component in the brine may be reduced by the chemical precipitation, or by the use of commercial system that utilizes nanofiltration to preferentially remove sulfate from brine, for example the SRS system—sold by Aker Chemetics. The purification chemicals also may include HCl and NaOH used for regenerating the chelating ion exchange columns. Stream 520 may be an effluent stream containing the precipitated carbonates, sulfates, and metals effluent from the purification of the saturated brine solution, which may be processed and recycled back to the process with a minimum amount of material requiring disposal. Purified brine solution 522 may then pass into anolyte compartment 504 of electrochemical cell 502. The recirculation of the anolyte loop is not shown, but the brine flow rate may be metered so as to maintain the desired brine concentration in the electrochemical cell anolyte loop and overflow stream 508, with the brine concentration typically in the range of 150-240 gm/L as NaCl. In an embodiment, the anolyte brine concentration may be operated lower NaCl concentrations, to as low as about 100-140 gm/L, which may result in a decrease in chlorine efficiency and the generation of more byproduct oxygen in the chlorine gas stream, but which may be useful in reducing the brine flow rate through the brine purification system with a reduction in brine processing costs.

Solution feed stream 548, which may be an aqueous mixture of sodium formate, sodium bicarbonate, and dissolved carbon dioxide which may include a gaseous carbon dioxide component which may be in the form of gaseous micro-bubbles, may be passed into catholyte compartment of electrochemical cell 502. In catholyte compartment 506, which preferably incorporates a high surface area cathode structure, carbon dioxide may be electrochemically reduced to formate, and the formate may combine with the sodium ions ($Na^+$) passing through the adjacent separator 503 to form sodium formate. In addition, any cathode inefficiency side reactions forming hydrogen ($H_2$) at the cathode may produce hydroxide ions ($OH^-$), and these hydroxide ions may react with carbon dioxide to form sodium carbonate in the catholyte solution. The sodium carbonate may then further react with excess carbon dioxide to form sodium bicarbonate. In addition, it is believed that the other sodium ions may combine with carbonic acid and the other potential carbon dioxide equilibrium species at the operating catholyte pH to further form additional sodium carbonate and sodium bicarbonate.

The reduction reaction products may exit as stream 524, where they may be separated or disengaged into gas stream 526 and solution stream 530. Gas stream 526 may be passed into separator 528, which may separate carbon dioxide from any byproduct hydrogen so that they may be reused or recycled in the other system 500 unit operations. Gas separator 528 may be any suitable membrane-based or molecular sieve pressure swing gas separation unit that may be capable of the separation of carbon dioxide and hydrogen. The separated gases may then be further purified and compressed as needed for recycle or reuse to the process.

Solution stream 530 including mainly sodium formate and sodium bicarbonate may then be split into recycle stream 532, which may be recycled back to electrochemical cell 502 catholyte compartment, and product stream 531 which may go to evaporator-crystallizer 550. Recycle stream 532 may have several input streams, including the introduction-of-carbon-dioxide stream 534, optionally a sodium bicarbonate stream 536 from reactor-dissolver unit 560, a side stream 538 leaving stream 532 which may go into an optional electrochemical acidification cell 540 and may have an acidified product stream 546 back into stream 532, and may have the addition of water to the stream as needed to prevent precipitation in stream 532 and catholyte compartment 506, and having all of the inputs/outputs into stream 532 ending up as solution stream 548 which may be sent into catholyte compartment 506.

Electrochemical acidification cell 540 may be used to acidify a small portion taken from catholyte loop stream 532, and which may then reenter anolyte recycle stream 532 as stream 546.

Electrochemical acidification cell 540 may be a similar design as the acidification cell as shown in FIG. 4. The cell anolyte solution may utilize sulfuric acid such that the anode reaction produces oxygen and produces hydrogen ions, which may be used to acidify formate stream 538 as it passes through the ion exchange compartment in the cell. The cathode reaction in this cell may be the reduction of water, which produces hydrogen gas and hydroxide ions ($OH^-$). The sodium ions that may be displaced by the hydrogen ions passing into the ion exchange compartment may pass into the catholyte compartment to combine with the hydroxide ions to produce a sodium hydroxide co-product. The hydrogen gas may also be captured for use in the process. Deionized water may be used in acidification cell 540 as needed to replace electrolyzed water and in controlling the concentration of the NaOH in the catholyte compartment.

Catholyte product stream 531, which may contain high concentrations of alkali metal formate and alkali metal bicarbonate, may be passed to evaporator-crystallizer unit 550, which may evaporate sufficient water from the solution and continuously precipitate a alkali metal bicarbonate crystal product as stream 556, a liquid concentrated alkali metal formate stream 554, and a water product stream 552 which may be condensed and used elsewhere as needed in the process, such as in oxalate solution dissolver 572. Evaporator-crystallizer 550 may utilize steam for providing the energy requirements for evaporating the water from the stream 531 input stream to the unit. Evaporator-crystallizer 550 may be a multiple evaporator effect unit, including multiple units to efficiently utilize the energy of the input steam, or any other suitable types of units may be utilized. In addition, evaporator-crystallizer 550 may use steam as well as mechanical operation for producing a vacuum to further reduce the energy requirements for the evaporation of the water from the solution. Any suitable evaporator-crystallizer unit or system may include suitable metallurgy for the operating conditions of the system. Alkali metal formate may have solubility in water that may be about 8 to 10 times more than that of alkali metal bicarbonate, so the solubility difference may allow the easy separation of alkali metal formate from alkali metal bicarbonate using solution temperature differences to enhance the separation. Other methods for the separation of alkali metal formate from alkali metal bicarbonate may be employed including fractional crystallization, cooling crystallization, falling film crystallization, and the like. A continuous process for the separation may be employed, although batch processing may also be used.

In an additional embodiment, if the amount or ratio of alkali metal bicarbonate is small in relation to the alkali metal formate, on the order of 1:10 to 1:20 or lower, the alkali metal bicarbonate may be allowed to be thermally decomposed to $CO_2$ in the Na-Formate liquid dryer 564 and not recovered for recycle. This method may reduce the added process costs in conducting the separating and recycling the alkali metal bicarbonate from the alkali metal formate.

The alkali metal bicarbonate crystal stream 556 from unit 550 may be in the form of an aqueous slurry, which may then be separated, washed, and dried by any suitable mechanism to produce a dried alkali metal bicarbonate product 558. Equipment such as centrifuges and vacuum belt filters may be used for the separation of the alkali metal bicarbonate crystals from the 556 stream slurry, and the mother liquor from any water rinses may be recycled back to unit 550. The alkali metal bicarbonate product 558 may also be recrystallized or further purified by any suitable mechanism to obtain a final product with purity suitable for specialty uses, such as food grade quality product. A portion of the stream 556 slurry or stream 558 alkali metal bicarbonate product as stream 560 may be utilized in reactor-dissolver 561, which may be used to convert alkali metal carbonate to alkali metal bicarbonate using an additional carbon dioxide gas stream 563. Reactor-dissolver 561 may also have a NaOH input stream 562, which may then be converted to alkali metal bicarbonate. The NaOH may be supplied from one or both of the electrochemical acidification units 540 and 576 if required.

Alkali metal formate stream 554 may be a concentrated alkali metal formate solution that contains 50 wt % or less water, and preferably 40 wt % or less water, and more preferably 30 wt % or less water. The formate solution stream 554 may be viscous and may contain from 0.1 wt % to 30 wt % as alkali metal bicarbonate depending on the water solubility of alkali metal bicarbonate in the alkali metal formate solution. The solution concentrations of the alkali metal formate and residual alkali metal carbonate may be varied as needed to achieve the desired final residual alkali metal bicarbonate concentration in the alkali metal formate solution. Alkali metal formate stream 554 may then passed to alkali metal formate liquid dryer where the residual water may be removed by any suitable means such as by vacuum evaporation and the like. The alkali metal formate may be an alkali metal formate melt, including a small percentage of water, in the range of 0.01 wt % to 5 wt % as water, and may have between 0.1 wt % to 20 wt % alkali metal bicarbonate. The alkali metal formate melt stream 566 may then be passed into alkali metal formate thermal reactor 568 for high temperature thermal conversion of the alkali metal formate to alkali metal oxalate (calcination). A suitable catalyst 567, such as NaOH, sodium hydride, sodium borohydride, sodium ethoxide, sodium methoxide, KOH, potassium hydride (KH), potassium ethoxide (KOEt), potassium methoxide (KOMe), potassium tert-butoxide (KOtBu) and the like may be added into the sodium formate before it enters thermal reactor 568. The introduction of catalyst 567 may help to reduce the calcination temperature and improve the conversion yield of alkali metal formate to alkali metal oxalate to a range of 50% to 99% or more, and preferably 70% to 99% or more. The reaction may also provide suitable yields without the need for the addition of catalyst 567. Hydrogen may be a major byproduct reaction from thermal reactor 568 and may be recovered for use in the process. Thermal reactor 568 may be operated in different configurations, such as under a partial vacuum, under an inert atmosphere such as nitrogen, or with the use of any suitable gas that may improve the efficiency of the chemical conversion of the formate to oxalate. The addition of other chemicals to thermal reactor 568 may also be useful, so as to obtain a clean flowing purified product. Thermal reactor 568 may be any suitable type equipment that can heat the alkali metal formate to suitable temperatures and control the thermal or calcination atmosphere. Thermal reactor 568 may include tunnel furnaces, rotary kilns, high temperature spray dryers, high temperature rotating drum/flaker units, fluid bed reactors, and other commercial calcining equipment and designs that may be commercially available.

The alkali metal oxalate product stream 570 leaving thermal reactor 568 may be cooled, and passed to oxalate solution dissolver 572, where alkali metal oxalate solids are dissolved in water, and may be filtered by various available methods to remove any insoluble materials and obtain a clear, filtered product solution, free of suspended solids. The alkali metal oxalate product may contain alkali metal carbonate and/or alkali metal bicarbonate as byproduct(s) of the calcination. The solution may be concentrated sufficiently so that the alkali metal oxalate—alkali metal bicarbonate solution may not require a larger amount of energy or steam for water evaporation in evaporator-crystallizer 576.

Alkali metal oxalate solution stream 574 may then be passed to electrochemical acidification cell 576, where the alkali metal oxalate solution passes through the ion exchange compartment of the cell and may be converted to oxalic acid stream 580 and carbon dioxide stream 579 which may produced from the acidification of any alkali metal carbonate present in alkali metal oxalate stream 574. Electrochemical acidification cell 576 may utilize the same chemistry and configuration as electrochemical acidification cell 540, producing oxygen and hydrogen a co-products, as well as NaOH as stream 578.

Figure 6:
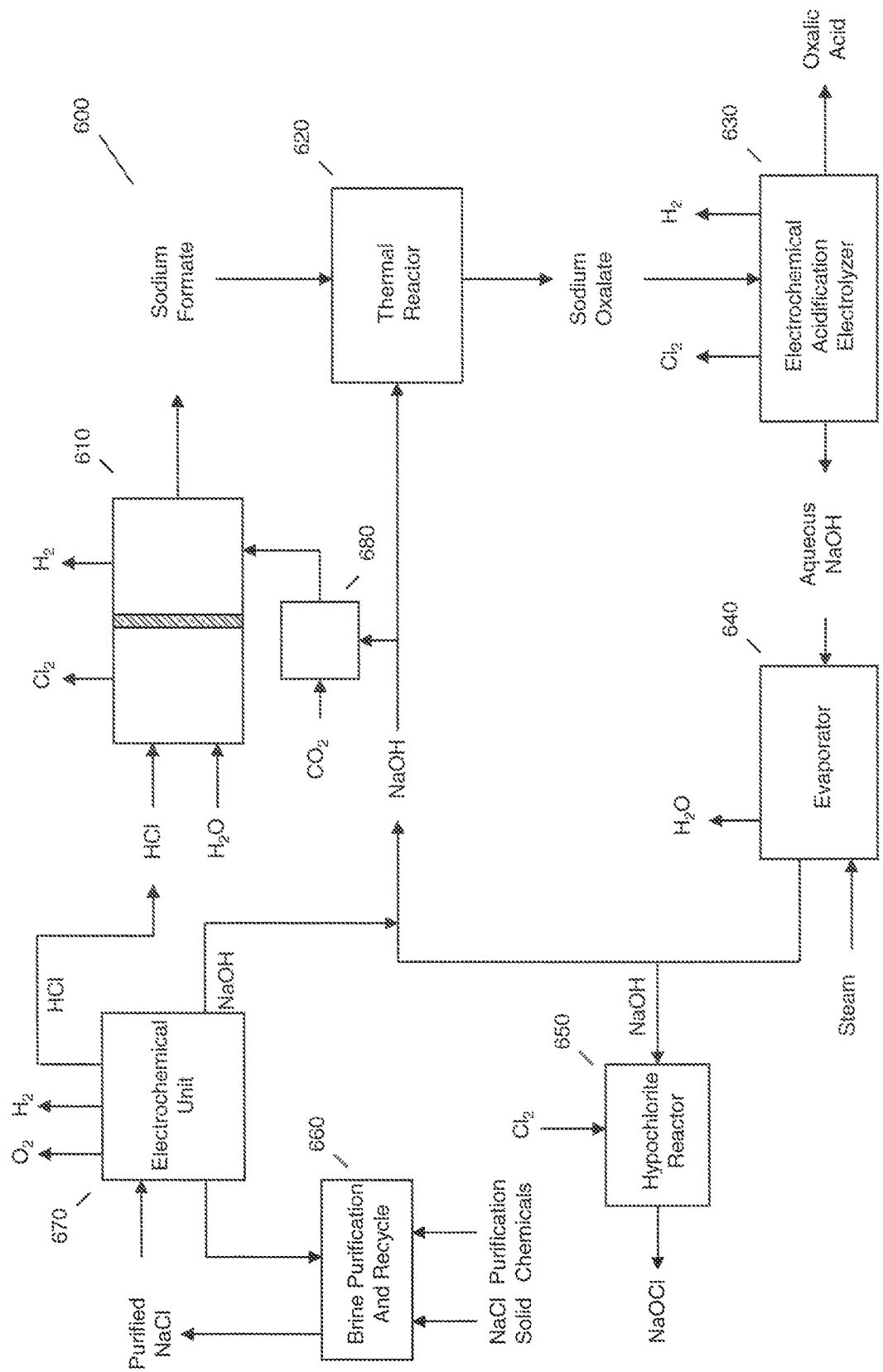
FIG. 6 shows a system for production of alkali metal formate using carbon dioxide and co-generating chlorine, alkali metal hypochlorite (MOCl) and oxalic acid in accordance with an embodiment of the present disclosure.

Referring to FIG. 6, in another embodiment, a system 600 for production of dicarboxylic acid, such as oxalic acid, starting with the electrochemical generation of formate using carbon dioxide in accordance with an embodiment of the present disclosure is shown. System 600 may provide an alternative system for production of oxalic acid as produced by systems 100, 105 of FIG. 1A and FIG. 1B in addition to the production of alternative co-products.

System 600 may include an electrochemical cell 610. Electrochemical cell 610 may operate to perform an electrochemical reduction of carbon dioxide with a alkali metal carbonate cathode feed, which may be formed from the reaction of $CO_2$ with NaOH, producing alkali metal formate along with chlorine gas as an anode product when utilizing hydrochloric acid (HCl) as an anolyte, which may produced in electrochemical unit 670 which may use a purified NaCl solution input feed stock.

Alkali metal formate may be passed to a thermal reactor 620. Alkali metal formate may be separated from bicarbonate present in the catholyte by various means as described in FIG. 5 to provide a suitable feed to thermal reactor 620. Thermal reactor 620 may perform a thermal intermolecular condensation reaction, or C—C (carbon to carbon bond) coupling reaction, with an alkali metal hydroxide (e.g. KOH, NaOH) or use other catalysts to produce alkali metal oxalate.

Alkali metal oxalate from thermal reactor 620 may then be dissolved in water and may then be passed to an electrochemical acidification electrolyzer 630. Electrochemical acidification electrolyzer 630 may produce a dicarboxylic acid, such as oxalic acid, and NaOH along with oxygen and hydrogen byproducts. Electrochemical acidification electrolyzer 630 may be a membrane based unit including of at least three regions, an anode region, one or more central ion exchange regions, and a cathode region. Alkali metal oxalate may be passed through the central ion exchange region, where alkali metal ions may be replaced with protons, and displaced alkali metal ions pass through the adjoining membrane into the cathode region to form NaOH. The anode reaction may produce chlorine gas when utilizing an HCl feed from electrochemical unit 670. Alternative, the anode reaction may utilize a different acid, such as sulfuric acid, producing oxygen and hydrogen ions. Alternatively, electrochemical acidification electrolyzer 630 may be an electrochemical electrodialysis unit, utilizing bipolar membranes, producing oxalic acid as well as smaller amounts of hydrogen and NaOH.

The hydrogen byproduct resulting from electrochemical acidification electrolyzer 630, as an alternative embodiment, may be used as a fuel to produce steam or used in a side process that may utilize hydrogen, such as in a chemical hydrogenation process. The chemical hydrogenation process may be, for example, the hydrogenation of an oxalic acid solution or the hydrogenation of an ester of oxalic acid, such as dimethyl oxalate (DMO) and diethyl oxalate (DEO), that may form high purity monoethylene glycol (MEG).

Aqueous NaOH from electrochemical acidification electrolyzer 630 may be passed to an evaporator 640. Evaporator 640 may evaporate the water from aqueous NaOH product using steam or another heat source, converting it into a concentrated aqueous solution and/or a solid with 5% or less water content. The NaOH may be reacted in reactor 680 with $CO_2$ to form an alkali metal bicarbonate solution with carbon dioxide, which may be passed to the catholyte compartment in electrochemical cell 610. NaOH may also be converted to a solid for use as a catalyst in thermal reactor 620.

Electrochemical unit 670 may be an electrochemical acidification electrolyzer, a type such as electrochemical acidification electrolyzer 630, where a purified NaCl brine solution is passed into the ion exchange compartment and may be acidified, producing an HCl product stream as well as co-producing NaOH and hydrogen in the cathode compartment. The anolyte may utilize sulfuric acid and generate oxygen from the oxidation of water. The purified brine may be produced by brine purification and recycle unit 660, utilizing an NaCl solid feed and using various purification chemicals as needed to produce the purified brine, suitable for use in electrochemical unit 670. Electrochemical unit 670 may include other types of electrochemical units, such as electrodialysis units which may utilize bipolar membranes, as well as any other suitable type of electrolyzer that may produce HCl.

System 600 in another embodiment, may also produce alkali metal hypochlorite (for example NaOCl), as a co-product from the system, utilizing chlorine and NaOH produced from electrochemical unit 670 and electrochemical acidification electrolyzer 630. Alternatively, chlorine may be reacted with organics to produce various chlorinated chemical products, such as ethylene dichloride (EDC). MOH may be a separate product of the process, or may be converted to alkali metal carbonate or alkali metal bicarbonate, thus converting additional carbon dioxide to useful chemicals.

In another embodiment, the alkali metal formate, produced in electrolyzer 610 may be passed directly to electrochemical acidification electrolyzer 630, bypassing thermal reactor 620, directly producing a formic acid product. The formic acid be a final product or may be converted to other suitable chemicals, such as methyl formate, or reacted with various salts to produce alkali metal formates, such as calcium formate. Methyl formate may also be converted to produce amides such as formamide or dimethylformamide via reactions with amines.

In another embodiment, electrochemical unit 670 may include a two compartment cell having an anode compartment and a cathode compartment separated by a separator or membrane. In this embodiment, NaCl may be fed to the anolyte compartment producing chlorine, and sodium hydroxide and hydrogen would be produced in the cathode compartment.

Figure 7:
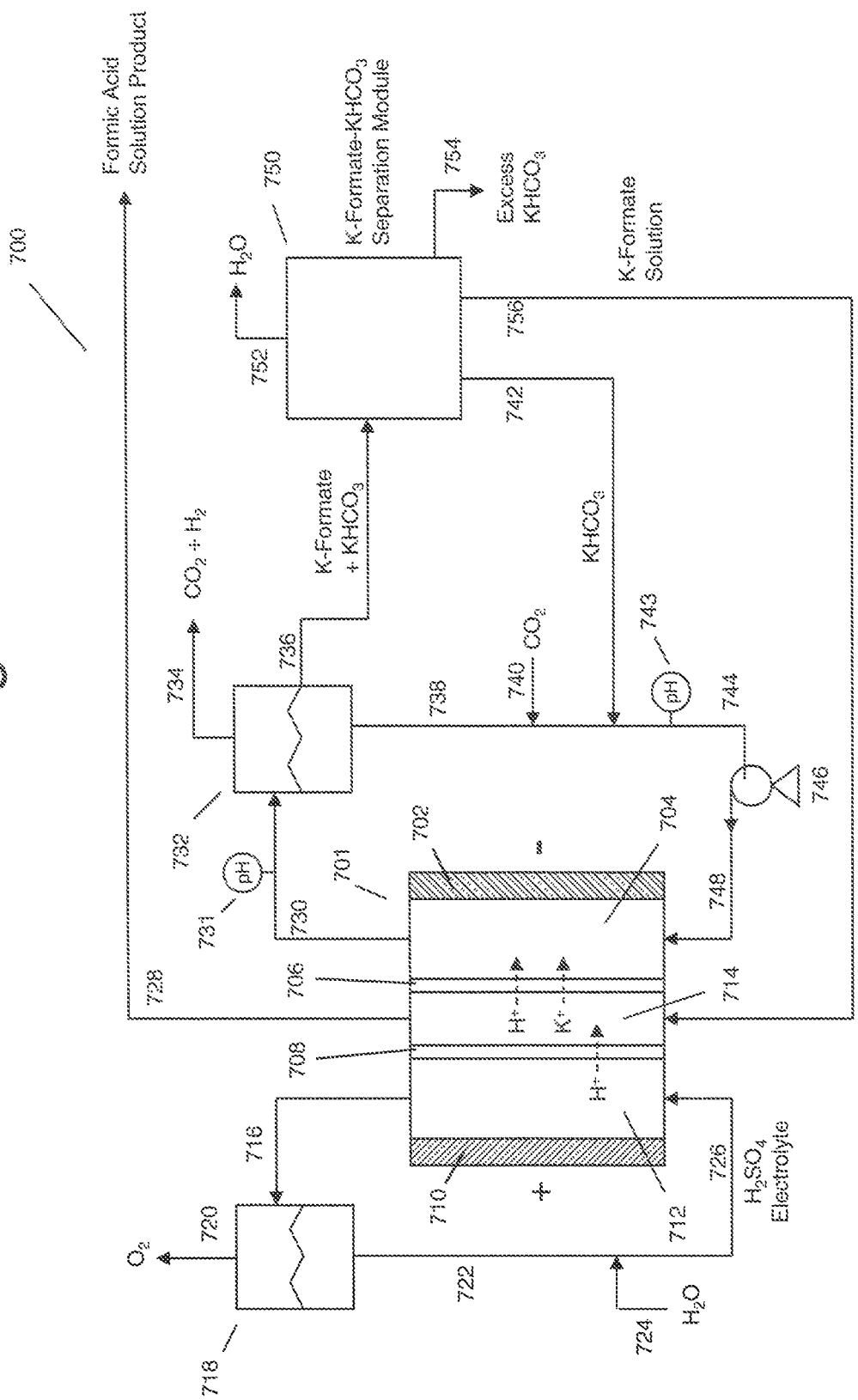
FIG. 7 shows a system for the production of a formic acid solution and oxygen co-product using carbon dioxide and a three compartment electrochemical cell configuration in accordance with an embodiment of the present disclosure.

Referring to FIG. 7, in another embodiment, a system 700 for production of a carboxylic acid, such as formic acid, starting with the electrochemical generation of formate using carbon dioxide in accordance with an embodiment of the present disclosure is shown. The system utilizes a three compartment electrochemical cell including an anode compartment, a central ion exchange compartment, and a catholyte compartment.

Electrochemical cell 701 may include catholyte region or cathode compartment 704 and anolyte region or anode compartment 712, and two ion permeable separators 706 and 708, preferably being cation ion exchange type membranes, forming central ion exchange compartment 714. An anolyte feed stream 726 including a sulfuric acid electrolyte may be introduced into anolyte compartment 712 of electrochemical cell 701, where water may be oxidized to oxygen and H$^+$ ions at anode 710 in anolyte compartment 712. Anolyte stream 716 exits anolyte compartment 712 and enters anolyte disengager 718, where oxygen gas 720 may exit as an electrochemical cell anolyte co-product. Gas separated solution stream 722 may exit disengager 718, and water stream 724 may be added to solution stream 722 to maintain water levels in the anolyte system loop. Water loss in the anolyte system loop may be due to water consumed from the anode oxidation reaction and bound water associated with the H+ ions that may transport into ion exchange compartment 714 through cation ion exchange membrane 708 by an electrochemical transport process called electro-osmotic drag. Anode 710 may include any suitable stable electrode material suitable for water oxidation in a sulfuric acid electrolyte that may be stable with a long operating life. The anode may include a metal or non-metal having an electrocatalyst coating for the efficient oxidation of water. The anode may also optionally include a gas diffusion electrode (GDE), which may operate in another electrochemical anode reaction where it is not producing oxygen, but may be forming water and H$^+$ ions, such as from the introduction of excess hydrogen to an anode GDE, and which may contain suitable catalysts for conducting the hydrogen oxidation reaction at the anode. The GDE anode reaction with water operates at a much lower anode potential, which may be on the order of about 0.100 volts, much lower than the half cell potential for water oxidation, which is 1.23 volts, and resulting in a much lower overall total cell operating potential, corresponding to much lower operating costs for the electrochemical cell 701. Anolyte circulation loop 726 may include a pump (not shown) and a heat exchanger (not shown) for cooling stream 726 before entering anolyte compartment 712 to control the temperature of the electrolyte in anolyte compartment 712.

Electrochemical cell 701 may have catholyte region or compartment 704 having a mounted cathode 702, which may be a metal or non-metal electrode with an active carbon dioxide electrocatalyst layer on the front side facing membrane 706. Cathode 702 may include a high surface area cathode structure as shown and described in FIG. 3 such that it may be efficient in the electrochemical reduction of carbon dioxide to formate. Electrolyte flow stream 748 containing a pH controlled electrolyte at a suitable flowrate including, for example, potassium bicarbonate and dissolved $CO_2$ and optionally $CO_2$ micro-bubbles may enter catholyte compartment 704, where the electrochemical reduction reaction at suitable potentials may efficiently produce formate at cathode 702. H$^+$ ions entering into catholyte compartment 704 through adjoining cation ion exchange membrane 706 may acidify the bicarbonate electrolyte, modifying the pH of the catholyte stream in catholyte compartment 704, in addition to producing $CO_2$ and water as given in reaction 17. Any other electrode competing reactions at the cathode, such as the formation of hydrogen from water reduction reaction 4, may be formed and may be present in the catholyte electrolyte. The co-transport of K$^+$ ions, as shown in FIG. 7, leaving ion exchange compartment 714 through cation ion exchange membrane 706, may supply potassium cations in the catholyte reactions. The ratio of H+ and K+ ions may determine the pH of the electrolyte solution flowing through catholyte compartment 704. Controlling the H$^+$/K$^+$ ratio may be implemented by controlling a rate of flow of the sodium formate solution 714 into ion exchange compartment 714.

Catholyte compartment stream 730 may then pass by pH monitoring sensor 731 (and temperature sensor—not shown), which may be used to monitor and control the catholyte stream pH value, and then enter catholyte disengager 732, where the various gases may be separated from the solution stream as stream 734, including mainly excess $CO_2$ and hydrogen, in addition to any other cathode reduction side reaction gas products, such as ethylene, CO, methane, and the like. These gases may be separated, collected, and recycled to the process as needed.

Catholyte disengager stream 738 may then be recycled back to catholyte compartment 704. Introduced into recycle stream 738 is $CO_2$ as stream 740 in addition to a metered $KHCO_3$ solution stream 742, with the resulting stream then passing by pH monitoring sensor 743, which measures and controls the pH of the stream mixture 744. Stream 744 then enters the input of circulation pump 746 and exits as solution flow stream 748 entering catholyte compartment 704. The injected $CO_2$ stream flow is such that it provides sufficient and preferably excess $CO_2$ for the cathode 702 reduction reaction in catholyte compartment 704. The $CO_2$ may be injected so as to form $CO_2$ micro-bubbles in the electrolyte solution stream entering catholyte compartment 704 as well as dissolved $CO_2$ in the electrolyte. $KHCO_3$ metered stream 742 introduced into the catholyte stream 738 is supplied in a sufficient rate or flow into flow stream 738 to help maintain solution stream 744 in a desired pH range before entering catholyte compartment 704 as stream 748. The pH range may range from about 2 to 12, and more preferably in a range of about 3 to 11, and even more preferably in a range of about 4 to 10. The operating pH range may depend on the electrochemistry of the chosen cathode electrocatalyst materials and the electrolyte composition used in the catholyte stream. In addition, a heat exchanger (not shown) may be used after circulation pump 746 to cool the catholyte solution to a operating range of about −5° C. to 80° C., more preferably a range of about 0° C. to 70° C., and more preferably in a range of about 5° C. to 60° C. The catholyte temperature and electrolyte composition may affect the solubility of the $CO_2$ in the catholyte electrolyte solution.

Catholyte disengager 732 may have a potassium formate product stream 736 including potassium formate (K-Formate) with a potassium bicarbonate ($KHCO_3$) residual that may be passed to a K-Formate-Bicarbonate Separation Unit 750, which may be used to separate $KHCO_3$ from the potassium formate. The separation unit may be an evaporator-crystallizer, falling film evaporator, or any suitable commercial equipment using steam or other energy heating source as well as vacuum that may evaporate the water from the solution to efficiently conduct the separation using the relative solubilities of the chemical components in aqueous solution.

Separation unit 750 may produce an exit $KHCO_3$ solution product stream 742 that may be metered into catholyte recycle solution steam 738 for pH control. The solution stream concentration may range from about 5 wt % to 60 wt %, or more preferably in a range of 10 wt % to 55 wt % in order to control water input into catholyte electrolyte recycle stream 748. Separation Unit 750 may have a water vapor output stream 752 from the evaporation and optionally excess $KHCO_3$ stream 754, if needed, for water or potassium compound balance in the system that can be added to the system as needed.

Separation unit 750 may also have K-Formate product stream 756 which includes a potassium formate solution that may contain levels of $KHCO_3$ in the range of about 0.1 wt % to 10 wt %, and preferably in a range of about 0.1 wt % to 5 wt %, and more preferably in a range of about 0.1 wt % to 1 wt %. The K-Formate product stream 756 may have a concentration of about 5 wt % to 80 wt % as potassium formate, more preferably in a range of 10 wt % to 60 wt %, and most preferably in the range of 10 wt % to 50 wt %.

K-Formate product stream 756 may be metered into ion exchange compartment 714 in electrochemical cell 701, where it is acidified to produce formic acid solution product stream 728. The flowrate of solution stream 756 and the applied operating current of electrochemical cell 701, which may be proportional to the H+ ions passing into ion exchange compartment 714 through cation ion exchange membrane 708, determine the amount of potassium removal from the potassium formate in the solution in producing formic acid product 728. Formic acid product 728 may be then further processed and purified as needed to a final formic acid product, converted to other formate products as salts, or used as an intermediate in chemical processes.

Figure 11:
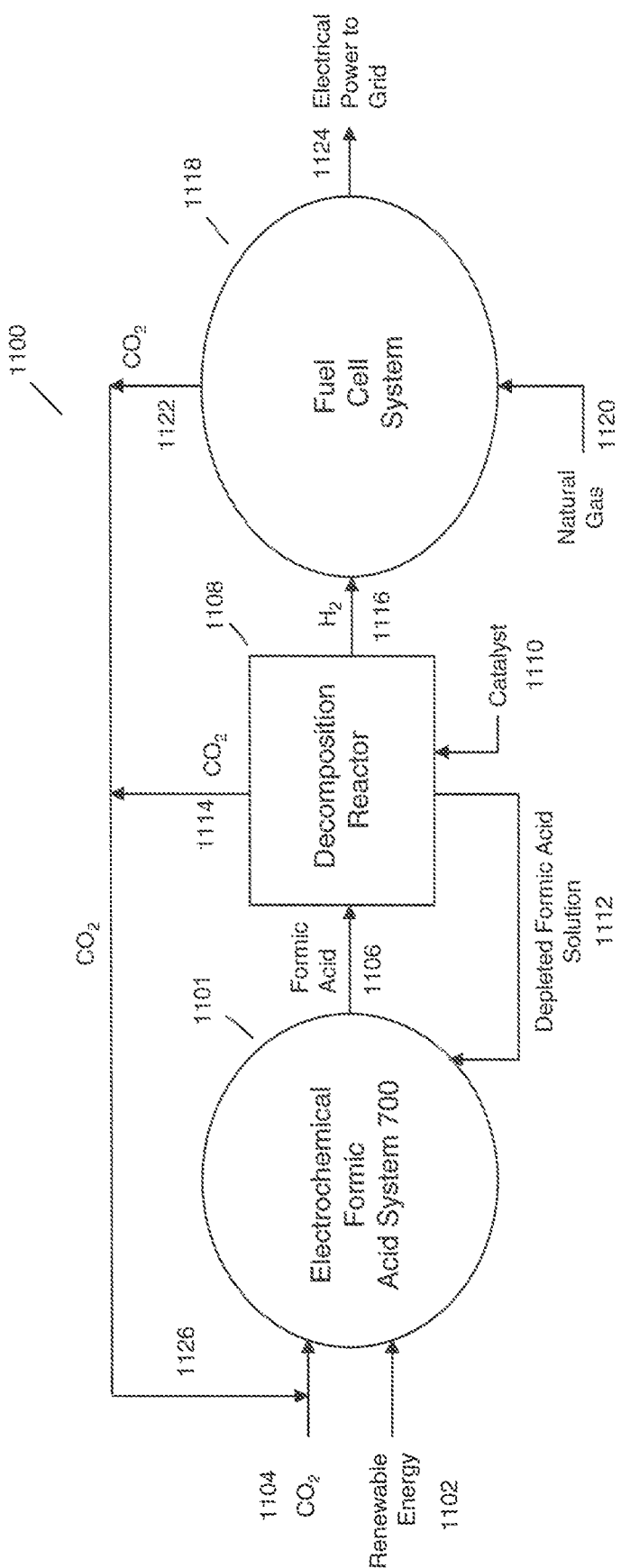
FIG. 11 shows a system in utilizing a formic acid produced in the electrochemical system for use in an off peak power energy storage system in accordance with an embodiment of the present disclosure.

In another embodiment, as shown in FIG. 11, formic acid product stream 728 may be used as a hydrogen storage source in an energy storage system for use in supplying power to an electrical grid during off peak periods.

Figure 8:
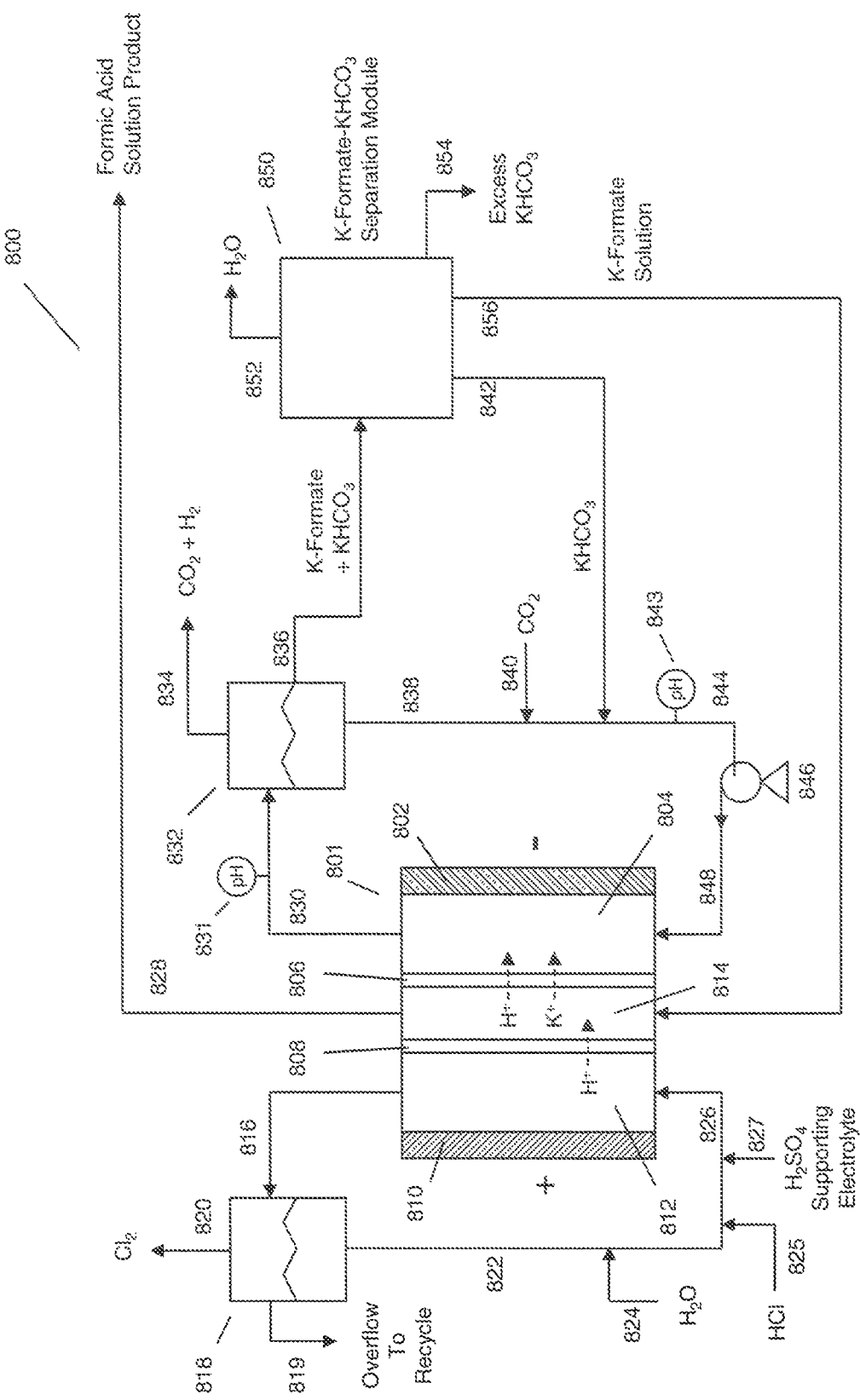
FIG. 8 shows a system for the production of a formic acid solution and a chlorine co-product using carbon dioxide and HCl and a three compartment electrochemical cell configuration in accordance with an embodiment of the present disclosure.

Referring to FIG. 8, a system 800 for production of a carboxylic acid, such as formic acid, starting with the electrochemical generation of formate using carbon dioxide in accordance with an embodiment of the present disclosure is shown. System 800 may be similar as system 700 but where the anolyte compartment may produce a halogen, such as chlorine, when utilizing a hydrogen halide feed, such as HCl, as an anolyte feed. In system 800, anolyte feed stream 826 contains HCL, which may be fed into anolyte compartment 812, which includes anode 810 which may be suitable for oxidizing the HCl into chlorine. Anolyte compartment exit stream 816 may then enter anolyte disengager 818, where chlorine is separated from the anolyte solution stream. Overflow stream 819 may be used, if needed, if the anolyte water volume is not balanced and may later be recycled to the system. Recycle flow stream 822 from anolyte disengager 818 may have an input water stream 824 added to supply water to the anolyte stream as needed and a metered HCl feed stream 825 to supply the chloride ions to be oxidized to chlorine in the anolyte compartment at anode 810. The combined feed stream 826 may then enter anolyte compartment 812.

Anolyte feed stream 826 may also contain a portion of the electrolyte as sulfuric acid, added as stream 827, which may act as a supporting electrolyte. The amount of sulfuric acid may range from about 0.5 wt % to 20 wt % in anolyte solution stream 826. In addition to being a supporting electrolyte, the sulfuric acid may allow for variability in the production volume or rate of chlorine from anolyte compartment 812, with the production of both chlorine and oxygen proportional to the HCl metered into anolyte compartment 812. Thus, the mass or molar ratio of chlorine to formic acid from system 800 may be varied as needed to meet the requirements of the process employed. The molar ratio of formic acid product to chlorine co-product may be varied from about 100:1 to 1:1, or more preferably in a range of 90:1 to 1:0.9.

HCl feed 825 may be aqueous, and may range from about 5 wt % to 36 wt % as HCL, and more preferably in a range of about 10 wt % to 30 wt % as HCL, and most preferably in a range of about 10 wt % to 20 wt % as HCl. The operating temperature of the anolyte may be in the range of 5° C. to 80° C., and more preferably in the 10° C. to 60° C. range. The optimum operating temperature may be chosen according to the material construction of anode 810, where the use of some metals as substrates, such as titanium grades containing Pd, such as ASTM Grades 7, 11, and 17, have a good resistance to HCL, but may have an upper operating temperature limit.

In another embodiment, if bromine may be required as a co-product from electrochemical formate system 800, then HBr would be metered into anolyte stream 826 entering anolyte compartment 812. The supporting sulfuric acid electrolyte may be used to ensure that bromine is generated efficiently with low concentrations of tribromide in the anolyte solution. The molar ratio of formic acid product to bromine co-product may be varied from about 100:1 to 1:1, or more preferably in a range of 90:1 to 1:0.9.

Figure 9:
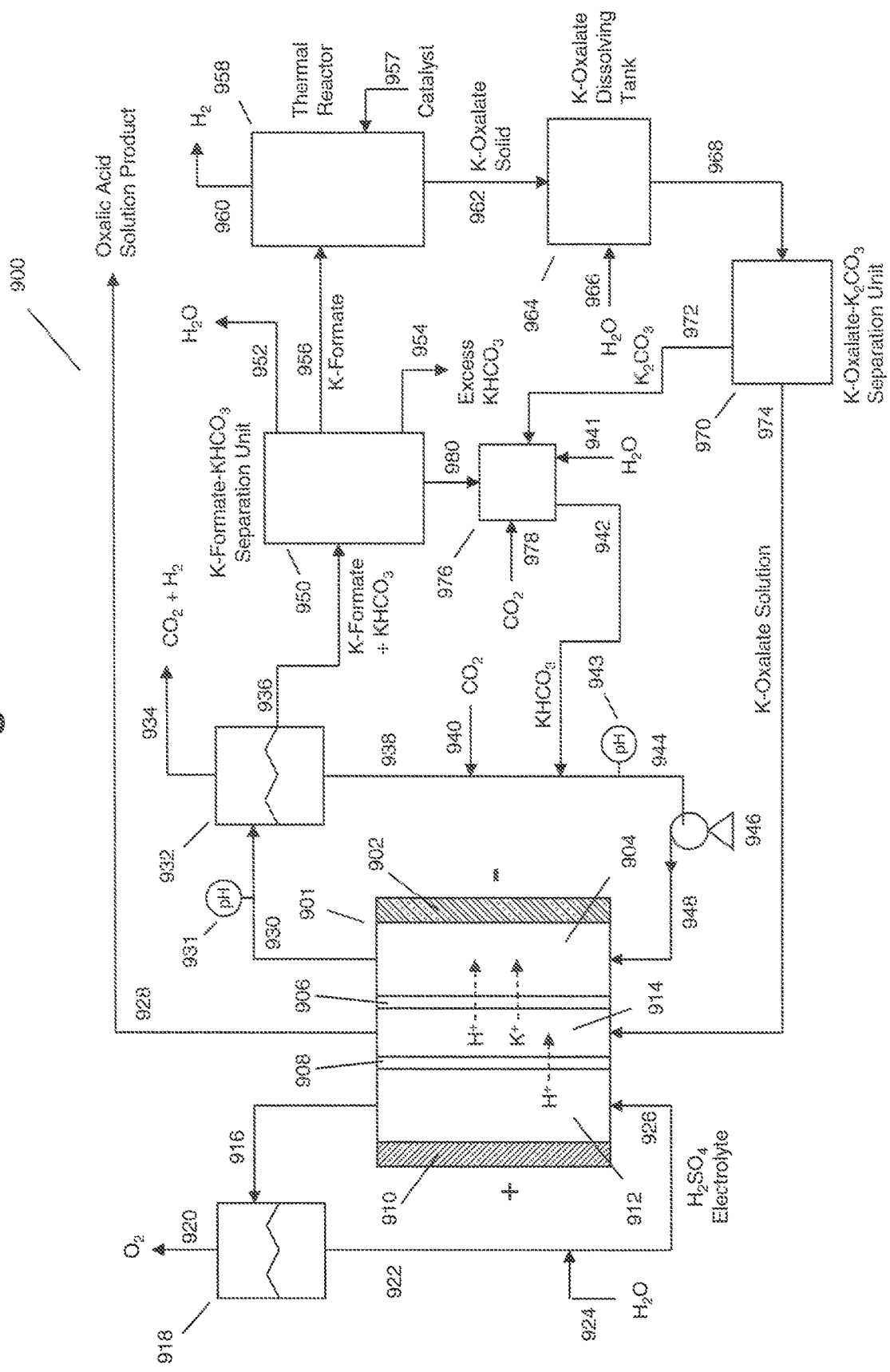
FIG. 9 shows a system for the production of an oxalic acid solution product and an oxygen co-product using carbon dioxide, a thermal reactor to convert formate to oxalate, and a three compartment electrochemical cell configuration in accordance with an embodiment of the present disclosure.

Referring to FIG. 9, in another embodiment, a system 900 for the production of an oxalic acid solution product and an oxygen co-product using carbon dioxide, a thermal reactor to convert formate to oxalate, and a three compartment electrochemical cell 901 configuration in accordance with an embodiment of the present disclosure is shown. System 900 may utilize a three compartment electrochemical cell 901 including an anode compartment, a central ion exchange compartment, and a catholyte compartment.

Electrochemical cell 901 may include catholyte region or cathode compartment 904 and anolyte region or anode compartment 912, and two ion permeable separators 906 and 908, preferably being cation ion exchange type membranes, forming central ion exchange compartment 914. An anolyte feed stream 926 including a sulfuric acid electrolyte may be introduced into anolyte compartment 912 of electrochemical cell 901, where water may be oxidized to oxygen and H+ ions at anode 910 in anode compartment 912. Anolyte product stream 916 exits anolyte compartment 912 and enters anolyte disengager 918, where oxygen gas 920 may exit as an electrochemical cell anolyte co-product. Gas separated solution stream 922 may exit disengager 918, and water stream 924 may be added to solution stream 922 to maintain water levels in the anolyte system loop. Water loss in the anolyte system loop may be due to water consumed from the anode oxidation reaction and the loss of bound water associated with the H+ ions that may transport into ion exchange compartment 914 through cation ion exchange membrane 908 by an electrochemical transport process called electro-osmotic drag. Anode 910 may include any suitable stable electrode material suitable for water oxidation in a sulfuric acid electrolyte that may be stable with a long operating life. The anode may include a metal or non-metal having an electrocatalyst coating for the efficient oxidation of water. The anode may also optionally include a gas diffusion electrode (GDE), which may operate in another electrochemical anode reaction where it is not producing oxygen, but may be forming water and H+ ions, such as from the introduction of excess hydrogen to an anode GDE, and which may contain suitable catalysts for conducting the hydrogen oxidation reaction at the anode. The GDE anode reaction with water operates at a much lower anode potential, which may be on the order of about 0.100 volts, much lower than the half cell potential for water oxidation, which is 1.23 volts, and resulting in a much lower overall total cell operating potential, corresponding to much lower operating costs for the electrochemical cell 901. Anolyte circulation loop 926 may include a pump (not shown) and a heat exchanger (not shown) for cooling stream 926 before entering anolyte compartment 912 to control the temperature of the electrolyte in anolyte compartment 912.

Electrochemical cell 901 may have catholyte region or compartment 904 having a mounted cathode 902, which may be a metal or non-metal electrode with an active carbon dioxide electrocatalyst layer on the front side facing membrane 706. Cathode 702 may include a high surface area cathode structure as shown and described in FIG. 3 such that it may be efficient in the electrochemical reduction of carbon dioxide to formate. Electrolyte flow stream 948 containing a pH controlled electrolyte at a suitable flowrate including, for example, potassium bicarbonate and dissolved $CO_2$ and optionally $CO_2$ micro-bubbles may enter catholyte compartment 904, where the electrochemical reduction reaction at suitable potentials may efficiently produce formate at cathode 902. $H^+$ ions entering into catholyte compartment 904 through adjoining cation ion exchange membrane 906 may acidify the bicarbonate electrolyte, modifying the pH of the catholyte stream in catholyte compartment 904, in addition to producing $CO_2$ and water as given in reaction 17. Any other electrode competing reactions at the cathode, such as the formation of hydrogen from water reduction reaction 4, may be formed and may be present in the catholyte electrolyte. The co-transport of K+ ions, as shown in FIG. 7, leaving ion exchange compartment 914 through cation ion exchange membrane 906, may supply potassium cations in the catholyte reactions. The ratio of H+ and K+ ions may determine the pH of the electrolyte solution flowing through catholyte compartment 904. Controlling the $H^+/K^+$ ratio may be done by controlling the rate of flow of the sodium oxalate solution 974 into ion exchange compartment 914.

Catholyte compartment stream 930 may then pass by pH monitoring sensor 931 (and temperature sensor—not shown), which may be used to monitor and control the catholyte stream pH value, and then enter catholyte disengager 932, where the various gases may be separated from the solution stream as stream 934, including mainly excess $CO_2$ and hydrogen, in addition to any other cathode reduction side reaction gas products, such as ethylene, CO, methane, and the like. These gases may be separated, collected, and recycled to the process as needed.

Catholyte disengager stream 938 may then be recycled back to catholyte compartment 904. Introduced into recycle stream 938 is $CO_2$ as stream 940 in addition to a metered $KHCO_3$ solution stream 942, with the resulting stream then passing by pH monitoring sensor 943, which measures and controls the pH of the stream mixture 944. Stream 944 then enters the input of circulation pump 946 and exits as solution flow stream 948 entering catholyte compartment 904. The injected $CO_2$ stream flow is such that it provides sufficient and preferably excess $CO_2$ for the cathode 902 reduction reaction in catholyte compartment 904. The $CO_2$ may be injected so as to form $CO_2$ micro-bubbles in the electrolyte solution stream entering catholyte compartment 904 as well as dissolved $CO_2$ in the electrolyte. $KHCO_3$ metered stream 942 introduced into the catholyte stream 938 is supplied in a sufficient rate or flow into flow stream 938 to help maintain solution stream 944 in a desired pH range before entering catholyte compartment 904 as stream 948. The pH range may range from 2 to 12, more preferably in a range of about 3 to 11, and even more preferably in a range of about 4 to 10. The operating pH range may depend on the electrochemistry of the chosen cathode electrocatalyst materials and the electrolyte composition used in the catholyte stream. In addition, a heat exchanger (not shown) may be used after circulation pump 946 to cool the catholyte solution to a operating range of about −5° C. to 80° C., more preferably a range of about 0° C. to 70° C., and more preferably in a range of about 5° C. to 60° C. Catholyte 904 temperature and composition may affect the solubility of the $CO_2$ in the catholyte electrolyte solution. The $CO_2$ solubility may be increased by reducing electrolyte concentrations, operating at lower temperatures, and operating electrochemical cell 901 at higher pressures. Alternatively, formate cell 901 system may employ a cathode 902 using a GDE based electrode which may operate at higher current densities since the GDE electrode operates at high partial pressures of $CO_2$ within the electrode structure and may not be as limited as the solubility of $CO_2$ in the solution electrolyte, which may be on the order of about 33 mM as $CO_2$.

Catholyte disengager 932 may have a potassium formate product stream 936 including potassium formate (K-Formate) with a potassium bicarbonate ($KHCO_3$) residual that may be passed to a K-Formate-Bicarbonate Separation Unit 950, which may be used to separate $KHCO_3$ as a solid product from the potassium formate solution. The separation unit may be an evaporator-crystallizer, falling film evaporator, or any suitable commercial equipment using steam or other energy heating source as well as vacuum that may evaporate the water from the potassium formate solution to efficiently conduct the $KHCO_3$ separation from the potassium formate using the relative solubilities of the chemical components in an aqueous solution.

Separation unit 950 may have an exit $KHCO_3$ solution product stream 980 that may include $KHCO_3$ solid/crystals having some residual potassium formate. The amount of residual potassium formate in the separated $KHCO_3$ solid may range from about 0.1% to 10 wt % or less, more preferably about 0.1% to 5 wt % or less, and most preferably 0.1 wt % to 2 wt % or less as potassium formate. The solid/liquid separation methods employed, such as centrifuges, vacuum filter filtration, and the like with methods for washing/rinsing the potassium formate from the $KHCO_3$ crystals may determine the wt % amount of potassium formate exiting with the $KHCO_3$. Separation Unit 950 may have a water vapor output stream 952 from the evaporation and optionally an excess $KHCO_3$ stream 954, if needed, may be used for water or potassium compound balance in the system that can be added to the system as needed.

$KHCO_3$ solid/crystal product stream 980 may then be sent into carbonation reaction/dilution vessel 976, where $KHCO_3$ solid 980 is dissolved with the addition of water 941. Additionally, $K_2CO_3$ stream 972 from K-Oxalate-$K_2CO_3$ unit 970 is also entering vessel 976. $CO_2$ gas 978 may be injected into vessel 976 to fully convert any potassium carbonate to potassium bicarbonate according to reaction (14b).

Stream 942 may leave vessel 976 and may be metered into catholyte recycle solution steam 938 for controlling pH in the catholyte loop of electrochemical cell 901. The solution stream 942 concentration may range from about 5 wt % to 60 wt % as $KHCO_3$, or more preferably in a range of 10 wt % to 55 wt % as $KHCO_3$ in order to control the total water input into catholyte electrolyte recycle stream 948.

Separation unit 950 may have a K-Formate product stream 956 which includes a potassium formate solution that may contain levels of $KHCO_3$ in the range of about 0.1 wt % to 10 wt % or less, and preferably in a range of about 0.1 wt % to 5 wt % or less, and more preferably in a range of about 0.1 wt % to 1 wt %. The K-Formate product stream may preferably have a concentration of about 90 wt % to 99.9 wt % as potassium formate, and more preferably in a range of 98 wt % to 99.9 wt % as potassium formate with the remaining balance as water. Most preferably, potassium formate stream 956 from separation unit 950 may include as little water as possible, and would basically be a melt of potassium formate, which has a melting point of about 167° C.

Preferably, the K-Formate product stream 956 may be sent as a potassium formate melt to thermal reactor 958, where it may be converted to potassium oxalate at a high conversion at specified temperature, atmospheric gas, and reaction time conditions. Thermal reactor 958 may operate in a range of about 100 to 550° C., and more preferably at about 200-500° C. The operating temperatures may depend on the decomposition temperatures of the alkali metal formate salt and the optimum temperature to get the highest yields of the alkali metal oxalate product. A residence time of the reaction at optimum reaction temperatures may range from 5 seconds to hours, and the equipment chosen to conduct the reaction may be designed to provide the rate of heating and cooling to obtain optimal conversion yields. This may include the use of cold rotating metal that may rapidly chill the hot thermal product after the thermal reaction period may be completed.

Catalysts that may enhance the conversion efficiency and temperatures may be used. Catalyst stream 957 may be added to the potassium formate melt 956 in thermal reactor 958. A suitable catalyst 957, for a potassium-based cation system may include KOH, potassium hydride, potassium borohydride, potassium ethoxide, potassium methoxide, potassium tert-butoxide and the like may be added into the potassium formate before it enters thermal reactor 958. The introduction of catalyst 957 may help to reduce the calcination temperature and improve the conversion yield of alkali metal formate to alkali metal oxalate to a range of 50% to 99% or more, and preferably 70% to 99% or more. The reaction may also provide suitable yields without the need for the addition of catalyst 957. Hydrogen 960 may be a major byproduct reaction from thermal reactor 958 and may be recovered for use in the process. Thermal reactor 958 may be operated in different configurations, such as under a partial vacuum, under an inert atmosphere such as nitrogen, or with the use of any suitable gas that may improve the efficiency of the chemical conversion of the formate to oxalate. The addition of other chemicals to thermal reactor 958 may also be useful, so as to obtain a clean flowing purified product. Thermal reactor 958 may be any suitable type equipment that can heat the alkali metal formate to suitable temperatures and control the thermal or calcination atmosphere. Thermal reactor 958 may include tunnel furnaces, rotary kilns, high temperature spray dryers, high temperature rotating drum/flaker units, fluid bed reactors, and other commercial calcination equipment and designs that may be commercially available.

K-Oxalate product stream 962 leaving thermal reactor 958 may be cooled, and passed onto K-Oxalate Dissolving Tank 964, where K-Oxalate 962 solids may be dissolved in water, and may be filtered by various available methods to remove any insoluble materials and obtain a clear, filtered product solution, free of suspended solids. Deionized water stream 966 may be added to unit 964 as required. The alkali metal oxalate product may contain potassium carbonate and/or potassium bicarbonate as byproduct(s) of the calcination. The solution may be concentrated sufficiently so that the potassium oxalate/alkali metal bicarbonate solution may not require a larger amount of energy or steam for water evaporation when it may be passed onto K-Formate-$K_2CO_3$ Separation Unit 970 via stream 968.

K-Formate-$K_2CO_3$ Separation Unit 970 may be an evaporator-crystallizer, removing water and may preferably use some of the physical aqueous solubility properties of potassium carbonate which may have a much higher water solubility than potassium oxalate and to precipitate and separate potassium oxalate crystals, which may be redissolved and exit separation unit 970 as K-Oxalate Solution stream 974. Stream 972 may be a solution of potassium carbonate obtained from separation unit 970 that may be passed onto carbonation reaction/dilution vessel 976, where the potassium carbonate may be converted with $CO_2$ stream 978 to potassium bicarbonate. The potassium bicarbonate stream 942 from carbonation reaction/dilution vessel 976 may then be metered into electrochemical cell 901 catholyte stream 938 for pH control.

K-Formate-$K_2CO_3$ Separation Unit 970 may employ any other suitable mechanism for separation of potassium oxalate from potassium carbonate, including nano-filtration, cooling crystallization, and the like.

K-Oxalate solution 974 obtained from separation unit 970 may then be passed onto and metered into ion exchange compartment 914 of electrochemical cell 901, were it may be converted to oxalic acid product stream 928. K-Oxalate solution stream 974 may have a concentration range of about 5 wt % to 60 wt % as potassium oxalate, and more preferably in a range of about 10 wt % to 50 wt %. The metered flow rate determines the conversion of the potassium oxalate to oxalic acid and affects the $H^+:K^+$ cation ion ratio transporting from ion exchange compartment 914 through the adjoining cation ion exchange membrane 906 into catholyte compartment 904, and may have an effect on the pH of the flowing catholyte electrolyte. The control of pH within catholyte compartment 904 may be dependent on balancing the combination of the metered flow of K-Oxalate solution 974 and metered flow of $KHCO_3$ solution 942. As one option, the flow of the K-Oxalate solution can be put at a set rate, and the metered flow of $KHCO_3$ solution 942 can be varied for pH control in electrochemical cell 901 catholyte flow loop, which may include streams 904, 930, 938, 944 and 948 and using pH sensors 931 and 943 for monitoring and control.

Oxalic product stream 928 may then be further purified and concentrated as needed, including the removal of residual potassium ions to low levels using ion exchange, implementation of a smaller electrochemical acidification system as described in FIG. 4, concentration increase with removal of water by evaporation, and any other suitable processing. The oxalic acid product may then be further converted, in one example, to esters such as dimethyl oxalate (DMO), diethyl oxalate (DEO), and dibutyl oxalate (DBO), which may then be converted with suitable catalyst in a hydrogenation reactor to monoethylene glycol.

Figure 10:
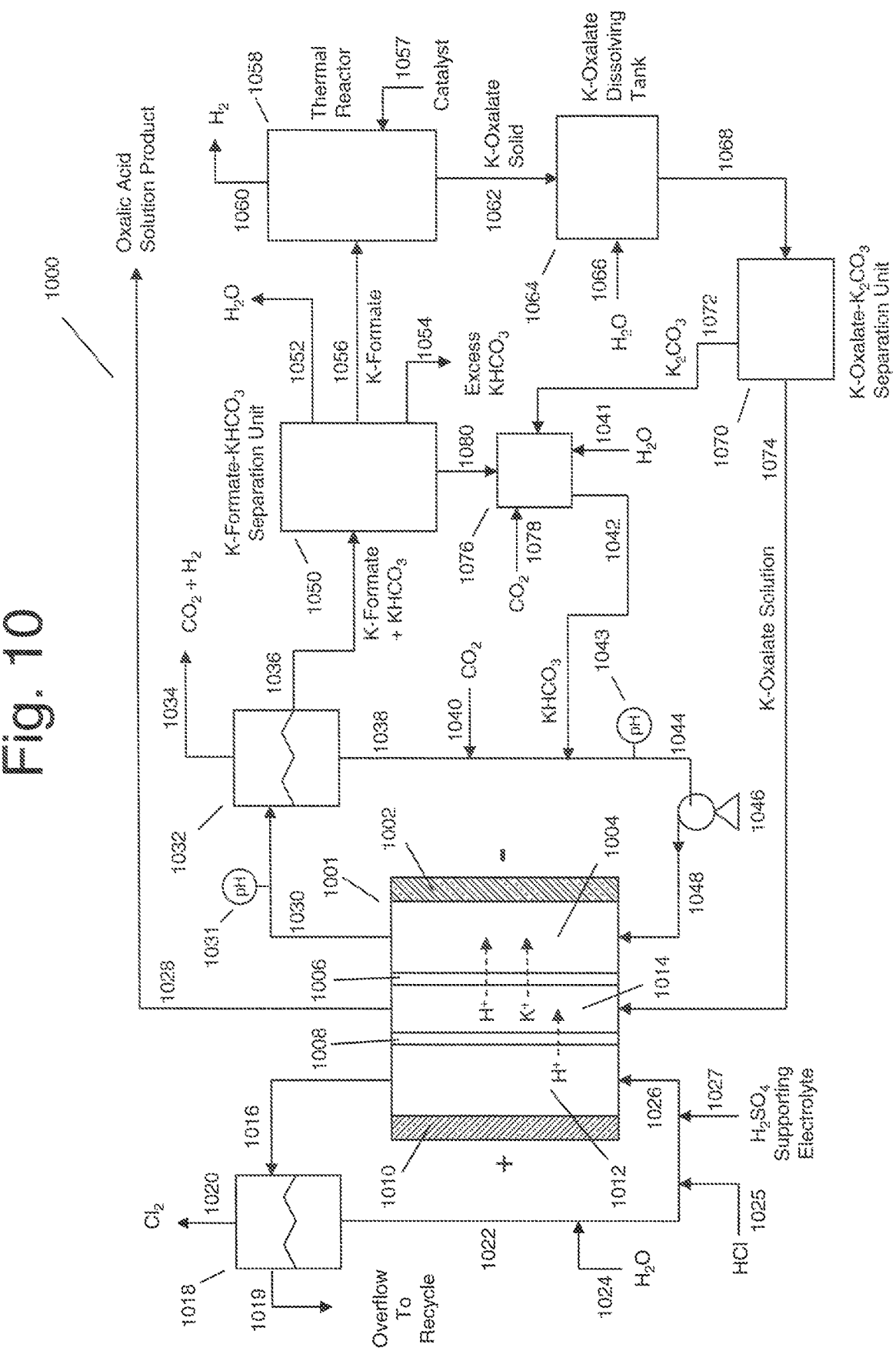
FIG. 10 shows a system for the production of an oxalic acid solution product and a chlorine co-product using carbon dioxide, a thermal reactor to convert formate to oxalate, and a three compartment electrochemical cell configuration in accordance with an embodiment of the present disclosure.

FIG. 10 shows a further additional embodiment applied to the system shown in FIG. 9, where the anolyte compartment may produce a halogen, such as chlorine, when utilizing a hydrogen halide feed, such as HCL, as an anolyte feed. In system 1000, anolyte feed stream 1026 contains HCL, which may be fed into anolyte compartment 1012, which includes anode 1010 which may suitable for oxidizing the HCl into chlorine. Anolyte compartment exit stream 1016 may then enter anolyte disengager 1018, where chlorine is separated from the anolyte solution stream. Overflow stream 1019 may be used, if needed, if the anolyte water volume is not balanced and may be later recycled to the system. Recycle flow stream 1022 from anolyte disengager 1018 may have an input deionized water stream 1024 added to supply deionized water to the anolyte stream as needed and a metered HCl feed stream 1025 to supply the chloride ions to be oxidized to chlorine in the anolyte compartment at anode 1010. The combined feed stream 1026 may then enter anolyte compartment 1012.

Anolyte feed stream 1026 may also contain a portion of the electrolyte as sulfuric acid, added as stream 1027, which may act as a supporting electrolyte. The amount of sulfuric acid may range from about 0.5 wt % to 20 wt % in anolyte solution stream 1026. In addition to being a supporting electrolyte, the sulfuric acid may allow for variability in the production volume or rate of chlorine from anolyte compartment 1012, with the production of both chlorine and oxygen proportional to the HCl metered into anolyte compartment 1012. Thus, the mass or molar ratio of chlorine to formic acid from system 1000 may be varied as needed to meet the requirements of the process employed. The molar ratio of formic acid product to chlorine co-product may be varied from about 100:1 to 1:1, or more preferably in a range of 90:1 to 1:0.9.

HCl feed 1025 may be aqueous, and may range from about 5 wt % to 36 wt %, and more preferably in a range of about 5 wt % to 30 wt %, and most preferably in a range of about 10 wt % to 20 wt %. The operating temperature of the anolyte may be in the range of 5° C. to 80° C., and more preferably in the 10° C. to 60° C. range. The optimum operating temperature may be chosen according to the material construction of anode 1010, where the use of some metals as substrates, such as titanium grades containing Pd, such as ASTM Grades 7, 11, and 17, have a good resistance to HCL, but may have an upper operating temperature limit due to corrosion by HCl.

In another embodiment, if bromine may be required as a co-product from electrochemical formate system 1000, then HBr would be metered into anolyte stream 1026 entering anolyte compartment 1012. The supporting sulfuric acid electrolyte may be used to ensure that bromine is generated efficiently with low concentrations of tribromide in the anolyte solution. The molar ratio of formic acid product to bromine co-product may be varied from about 100:1 to 1:1, or more preferably in a range of 90:1 to 1:0.9.

Referring to FIG. 11, a system 1100 utilizing a formic acid produced in the electrochemical system for use in an off peak power energy storage system in accordance with an embodiment of the present disclosure is shown. Carbon dioxide may be electrochemically reduced to a formic acid product and employed in an energy storage system to supply electrical power to the electrical grid in uses such as peak power generation, power load leveling, and the like. Energy storage system 1100 may employ electrochemical system 1101, the electrochemical formic acid system as described in FIG. 7 of this disclosure as system 700, preferably using a renewable energy source 1102 as electrical power, which may be solar, wind, and/or other alternative energy sources, and $CO_2$ source 1104 in addition to $CO_2$ recycle stream 1126. Formic acid product 1106 from system 1101 may be catalytically decomposed to hydrogen gas in Decomposition Reactor 1108, which may use a catalyst 1110, which may employ or one more and combinations of catalysts including, for example, platinum, silver, ruthenium, rhodium, gold, or palladium based catalysts as their metals, oxides, or alloys. In addition, other catalyst compositions that may be suitable may include transition metal, transition metal alloys, and transition metal oxide compositions. These transition metal catalysts may also include a small amount of platinum group metals and their oxides in their compositions. The catalysts may be physically placed on a fixed packed bed in decomposition reactor 1108 or may be suspended in the solution. Decomposition Reactor 1108 may be heated and circulated using pumps, and may be pressurized. Decomposition Reactor 1108 may also include a plug flow design with recirculation loop.

The reacted formic acid in Decomposition Reactor 1108 may be converted to $CO_2$ as stream 1114, which may be recycled back into $CO_2$ recycle stream 1126 to again produce formic acid from carbon dioxide. Depleted formic acid solution 1112 from Decomposition Reactor 1108 may be recycled to system 1100 to produce formic acid. Preferably, Decomposition Reactor 1108 may be operated under conditions not requiring extremely high pressures and temperatures with the chosen catalyst system.

Hydrogen product 1116 from Decomposition Reactor 1108 may be pressurized using a compressor (not shown) and may be sent to Fuel Cell System 1118, where the hydrogen may be converted to electrical power 1124 using an oxidant such as oxygen. Preferably, Fuel Cell System 1118 may utilize a high temperature solid oxide type, which may employ a natural gas 1120 feed to help maintain the performance of Fuel Cell System 1118 in maintaining load, increasing load, and to maintain temperatures and operating conditions in the system. Fuel Cell System 1118 may have a $CO_2$ effluent stream 1122 which may be proportional to the amount of natural gas utilized. $CO_2$ stream 1122 is recycled into $CO_2$ recycle stream 1126. $CO_2$ feed stream 1104 may be used to balance and provide the additional $CO_2$ needed for Energy Storage System 1100.

Electrochemical Cell Designs Utilizing Gas Diffusion Electrodes

Gas diffusion electrodes (GDE's) may be utilized in electrochemical cells in the reduction of carbon dioxide. In the anode compartment, the electrochemical cell anode reaction may be the oxidation of hydrogen gas introduced into the anode GDE to form hydrogen ions ($H^+$) or protons. These protons may then preferably pass through the adjoining cation ion exchange compartment as shown in FIGS. 3 and 4, or into an adjacent ion exchange compartment as shown in FIGS. 7 and 9.

Figure 12:
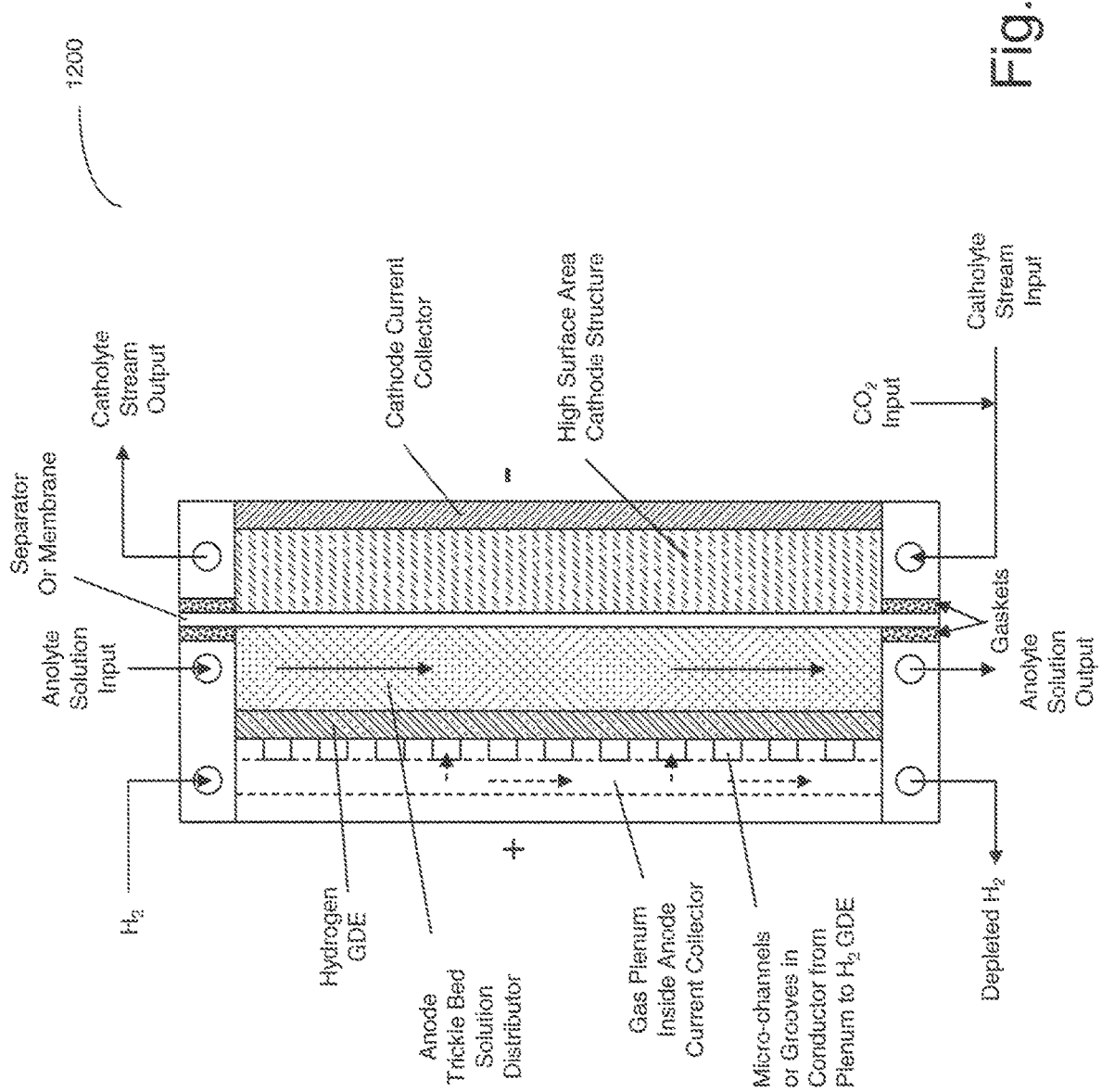
FIG. 12 is a schematic illustrating an electrochemical cell utilizing a hydrogen GDE for the anode reaction in producing oxalic acid from the reduction of carbon dioxide in accordance with an embodiment of the present disclosure.

Referring to FIG. 12, a schematic illustrating an electrochemical cell utilizing a hydrogen GDE for the anode reaction in producing oxalic acid from the reduction of carbon dioxide in accordance with an embodiment of the present disclosure is shown. FIG. 12 shows one of the hydrogen anode GDE configurations as an electrochemical cell 1200 in a cross section view, not showing some of the internal gas passages within the anode current collector. Electrochemical cell 1200 may include an anode current collector containing an internal gas plenum with a multitude of micro-channels or grooves that connect to the hydrogen GDE, so that hydrogen gas may be evenly distributed and contact the GDE. The micro-channels may run horizontally or vertically. The gas plenum may also include a current collector utilizing a metal mesh or screen based structure. The hydrogen gas may preferably be introduced into the anode compartment from an upper entry port in the anode compartment and flow downwardly into the plenum as shown, and the depleted hydrogen may then exit at the bottom of the anode compartment. The hydrogen may be humidified with solvent vapor used in the anolyte compartment as needed. The anode current collector may be a carbon or graphite material or include metals if they are resistant to the anolyte electrolyte reactions and acidity that may be formed in the anolyte solution. The hydrogen may also be operated in a co-current or countercurrent flow configuration.

Adjacent to the right of the anode GDE may be an anode trickle bed solution distributor or percolator, where an anolyte solution may be introduced at a port at the top of the anode compartment such that the solution may be evenly distributed and the solution is distributed evenly down the length of the trickle bed distributor and exits the bottom of the anode compartment. The solution may be fed a specific flow rate, in the range of 0.001 to 10 liters per minute or more depending on the electrochemical cell dimensions, such that the anode GDE may not be completely flooded with the anolyte solution due to excessive pressure, and so as to maintain good ionic contact with the anode GDE for the transfer of protons into the anolyte solution. The flow and pressure of the anolyte flow should be such that minimal amounts of anolyte solution may pass through the GDE into the hydrogen gas plenum inside the anode current collector, and the hydrogen gas oxidation within the GDE may be sufficient, so as to obtain a reasonable anode current density, in the range of 10 ma/cm$^2$ to 1000 ma/cm$^2$, or more preferably in a range of about 50 ma/cm$^2$ to 500 ma/cm$^2$. It is contemplated that electrochemical cell 1200 may include an energy source (not shown) which may be operably coupled with the anode and the cathode, the energy source configured to provide power to the anode and the cathode to reduce carbon dioxide at the cathode. The anode trickle bed may include a thin construction, between about 0.1 cm to 10 cm in thickness, and preferably as thin as possible in the range of 0.2 to 5 cm in thickness to reduce any IR voltage drop to a minimum. The anode trickle bed may be made from non-conductive corrosion resistant polymer plastics, such as PTFE, polypropylene, PVDF and the like, in the form of screen-like or convoluted forms so to distribute the solution evenly as it passes down the anode GDE structure. The entry and exit ports of the anolyte compartment are designed such that the flow distribution of anolyte liquid is uniform along the cross section of the trickle bed at the top and bottom. Alternatively, the trickle bed material may be included of conductive carbon and graphite, and may contain some of the hydrogen GDE catalyst on its surfaces. The GDE may be partially bonded to the separator or membrane for improved electrical conduction or contact.

The separator located between the anode and cathode compartments may be a membrane type, such as a cation membrane that may ionically conduct cations, such as H$^+$ ions, through the membrane to the cathode compartment and may prevent or reduce the amount of back migration of anions from the catholyte compartment back into the anolyte compartment. Correspondingly, if the electrochemical cell design may employ an intervening ion exchange compartment, such as in FIG. 7, the cation membrane may prevent the same back migration of anions from the adjoining cation membrane of the ion exchange compartment into the anolyte compartment. The selected cation membranes may preferably be stable to the solvent and salts in the electrochemical cell, such as the perfluorinated sulfonic acid membranes under the trade name of Nafion. The separator may also be, as discussed previously, a microporous separator, with fine pores in the 0.001 to 1 micron pore size range, such that it limits or controls solution or solvent bulk flow from the catholyte to the anolyte. The bulk flow may be controlled by the flow pressure of the catholyte solution flowing in the catholyte compartment.

The catholyte flow stream preferably enters the bottom of the catholyte compartment and exits from the top of the catholyte compartment in order to facilitate the removal of gases in the catholyte compartment. The catholyte flow rate may range from 0.01 to 10 liters/minute or more depending on the electrochemical cell dimensions and operating current density. The catholyte compartment utilizes a high surface area cathode structure for electrochemically reducing carbon dioxide in the catholyte to formate. The cathode materials that may be suitable are as described in this application. The operating pressure of the catholyte compartment may be in the range of 0.1 to 5 psig, or in the range of 1 to 30 psig or greater. The operating pressure may be a function of the catholyte flow rate and the flow resistance of the high surface area cathode structure employed.

The preferred solvent for the anolyte solution is an aqueous solution containing an electrolyte such as sulfuric acid or non-oxidizable acid to be a supporting electrolyte as needed. Organic solvents added to the anolyte in quantities of 50 wt % or less may be employed, such as methanol or ethanol, but may not be as preferred if they may interfere with the hydrogen oxidation at the anode. Salts that may be added to the anolyte electrolyte that may interfere with the GDE hydrogen oxidation are not preferred.

As an alternative embodiment, the electrochemical cell configuration may employ anode and cathode GDE structures that are bonded to or in direct contact with a cation membrane separator.

In a further embodiment, ionically conductive materials, such as ion exchange materials such as resins or ionomers that are insoluble to the solvents may be used or placed between the anolyte and catholyte GDE's so as to provide a conductive ionic path for the ions to migrate. Alternatively, gel-type membranes that may include ion exchange structures that may hold ionic groups such as phosphoric acid in its structure and the like may be used. Membranes of these types that may be used are those used or proposed for use in phosphoric acid fuels and the like.

Figure 13:
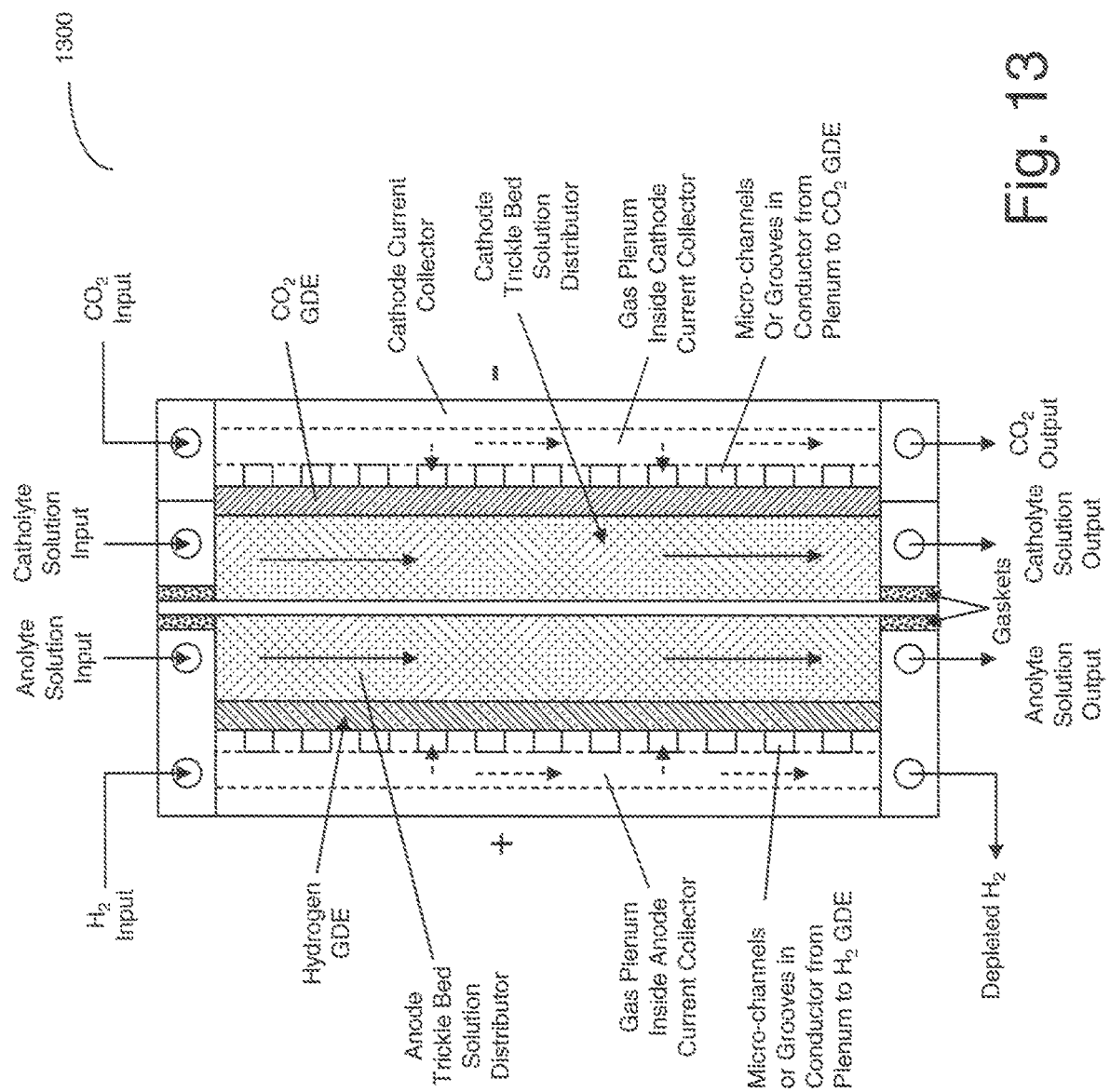
FIG. 13 is a schematic illustrating an electrochemical cell utilizing a hydrogen GDE for the anode reaction and a carbon dioxide GDE for the cathode reaction in producing alkali metal formate from the reduction of carbon dioxide in accordance with an embodiment of the present disclosure.

Referring to FIG. 13, a schematic illustrating an electrochemical cell 1300 utilizing a hydrogen GDE for the anode reaction and a carbon dioxide GDE for the cathode reaction in producing alkali metal formate from the reduction of carbon dioxide in accordance with an embodiment of the present disclosure is shown. Electrochemical cell 1300 may employ the same hydrogen GDE anode as in the electrochemical cell 1200 in FIG. 12, but also employs a carbon dioxide reduction GDE cathode structure in the catholyte compartment. The anolyte GDE may operate in the same manner as described in the description of the electrochemical cell 1200 of FIG. 12.

The cathode GDE operates in the same manner, except that carbon dioxide may be reduced at the cathode GDE to form formate. The cathode may have a carbon dioxide internal gas plenum to distribute the carbon dioxide evenly into the cathode GDE.

Adjacent to the right of the cathode GDE is a cathode trickle bed solution distributor, where the catholyte solution may be introduced at the top of the cell catholyte compartment and the solution is distributed evenly down the cell and exits the bottom of the cathode compartment. Alternatively, the flow may be reversed, so that the flow is in the vertical direction. The solution may be fed a specific rates, in the range of 0.001 to 10 liters per minute or more depending on the electrochemical cell dimensions, so that the cathode GDE may not be flooded with the catholyte solution due to excessive pressure, and so as to maintain good ionic contact with the cathode GDE for the transfer of electrons into the solution in the reduction of carbon dioxide. The flow and pressure of the catholyte flow should be such that minimal amounts of catholyte solution pass through the GDE into the carbon dioxide gas plenum inside the cathode current collector, and that the carbon dioxide gas reduction within the GDE is sufficient, so as to obtain a reasonable cathode current density, in the range of 10 ma/cm$^2$ to 1000 ma/cm$^2$, or more preferably in a range of about 50 ma/cm$^2$ to 500 ma/cm$^2$. It is contemplated that electrochemical cell 1300 may include an energy source (not shown) which may be operably coupled with the anode and the cathode, the energy source configured to provide power to the anode and the cathode to reduce carbon dioxide at the cathode. The cathode trickle bed may include a thin construction, between about 0.1 cm to 10 cm in thickness, preferably as thin as possible in the range of 0.2 to 5 cm in thickness, made from non-conductive corrosion resistant polymer plastics, such as PTFE, polypropylene, PVDF and the like, in the form of screen-like or convoluted forms so to distribute the solution evenly as it passes down the cathode structure. The entry and exit ports of the catholyte compartment are designed such that the flow distribution of liquid is uniform along the cross section of the trickle bed at the top and bottom. Alternatively, the GDE cathode may be able to be operated in a partially flooded or possibly fully flooded condition, and the flow conditions and electrolyte may be adjusted to operate the cathode in this mode.

Alternatively, the trickle bed material may be included of conductive carbon and graphite, or potentially of metal, may contain some of the cathode GDE catalyst on the surfaces. As alternatively, the electrochemical cell system 1300 in FIG. 13 may be operated with an oxygen generating anode system, and not a hydrogen GDE, as the anode configuration as shown in FIGS. 3, 5, 7, and 9.

Figure 14:
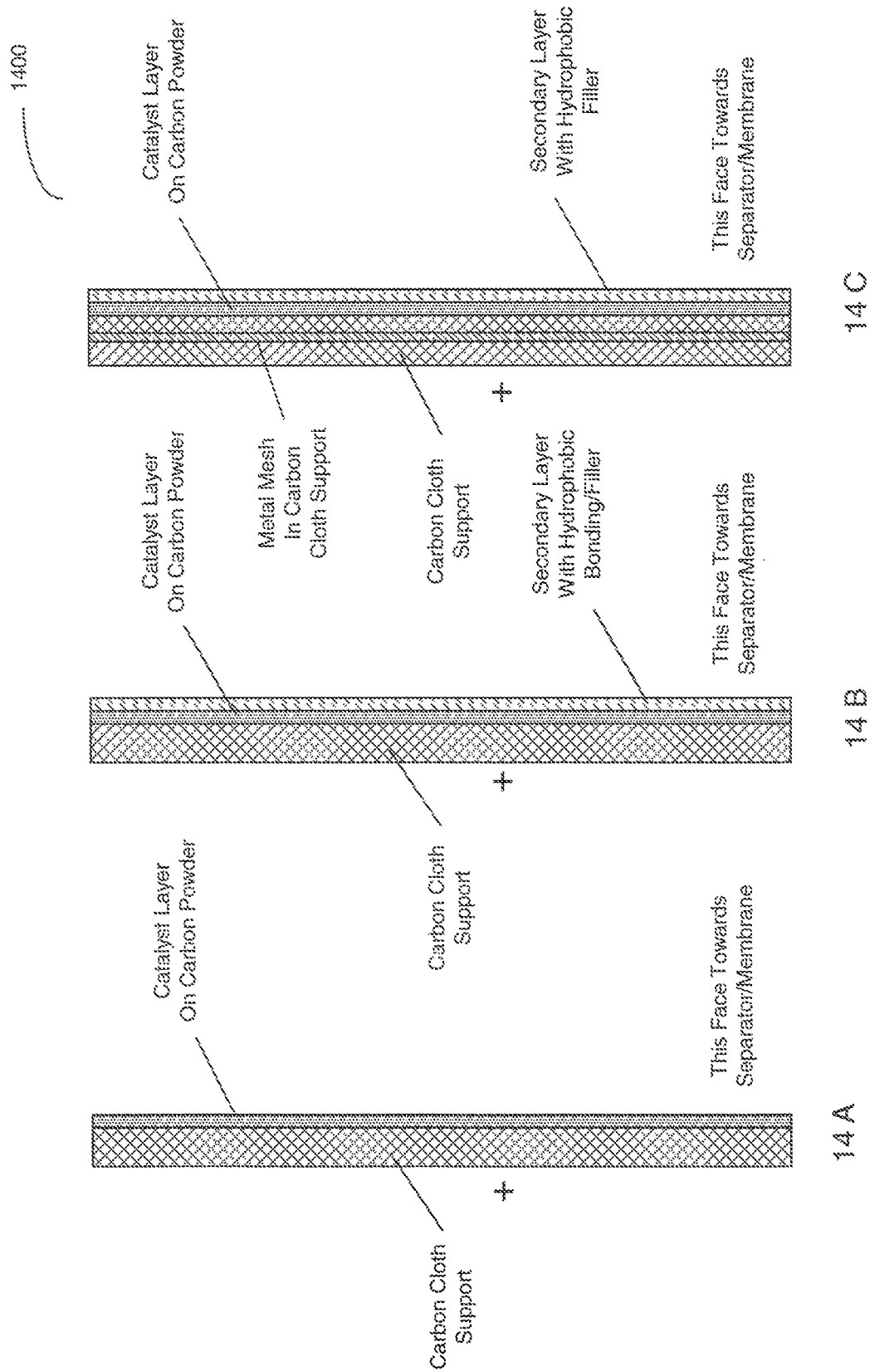
FIG. 14 is a schematic illustrating three different anode GDE constructions used in an electrochemical cell in producing alkali metal formate from the reduction of carbon dioxide in accordance with an embodiment of the present disclosure.

Referring to FIG. 14, a schematic illustrating three different anode GDE constructions used in an electrochemical cell in producing alkali metal formate from the reduction of carbon dioxide in accordance with an embodiment of the present disclosure are shown. FIG. 14A shows a carbon cloth support structure including a thin layer containing a catalyst that may be deposited onto a carbon powder base by various methods such as spraying or precipitation and the like with suitable methods known to the art. The GDE assembly may then be further processed utilizing a spray application of a PTFE or PVDF emulsion or dipping the structure into a PTFE or PVDF emulsion, which may be then be dried to remove the emulsion solvent. The assembly may then be compressed (under pressure) and heated, to a temperature at or near the melting point of the PTFE or PVDF so that the PTFE or PVDF flows and bonds the various components in the GDE structure to form a 3-phase structure that is hydrophobic in portions of the microstructure to liquids and yet allows hydrogen to pass into the pores for the oxidation of hydrogen to occur at the catalyst surfaces. Any potential hydrophobic agents may be used so long as they are not soluble in the solvents employed in the electrochemical cell anolyte and catholyte. These hydrophobic compounds or agents may be different for the anolyte GDE versus the catholyte GDE. Other potential hydrophobic agents, such a polyethylene and polypropylene waxes, super-hydrophobic agents, and other materials such as inorganic oxides, silica based materials, nitrides, borides, and others may be employed that may have hydrophobic properties to the solvents used in the electrochemical cell anolyte. The hydrophobic material content in the anode GDE structure may range from 1% to 80%, and preferably from about 5% to 50% by weight or by volume in the GDE structure to obtain the non-wetting and anode GDE performance properties required.

The hydrogen oxidation catalysts used in the anolyte GDE may include precious metal and precious metal oxides and their mixtures, including platinum, palladium, gold, ruthenium, iridium, and silver and their alloys and mixtures. The concentration of the GDE catalyst, such as platinum, is such that it is economical, such as 0.5 mg/cm$^2$ for platinum on the carbon powder support. Catalyst concentrations may range from about 0.01 to 20 mg/cm$^2$, and more preferably in the range of 0.1 to 5 mg/cm$^2$ for a number of these precious metal catalysts. More catalyst may be employed in the composition if lower cost catalyst materials are available. The support for the catalyst may be a high surface area carbon or may be an alternative conductive material, such as graphene, conductive nitrides, carbon nanotubes, conductive titanium suboxides such as $Ti_4O_7$ and $Ti_2O$ and the like. The catalyst may be applied by various methods, such as electroplating, chemical reduction, chemical precipitation and chemical vapor deposition and the like. A number of GDE's have been described in the literature and are available commercially, and these may be employed as an anode GDE if they may have suitable hydrophobic properties and catalytic activity as required for this process.

FIG. 14B shows the same configuration as FIG. 14A except for an additional secondary layer containing a carbon powder with the hydrophobic bonding/filler in its make-up.

FIG. 14C shows the GDE construction of FIG. 14B except for an additional thin metal mesh within the carbon cloth support that may supply mechanical stability to the structure, as well as provide a better electrical conductive structure so that the GDE may be operated at high current densities. The metal may be nickel, silver, or other metal or alloy that is corrosion resistant to the anode operating conditions.

In an alternative embodiment, a separator or membrane may be bonded to the anode GDE structure on one face or both faces of the anode and/or cathode GDE, if additional solvent flow rejection is required. In another embodiment, a Nafion (perfluorinated sulfonic acid) based solution may be also used in the GDE structures for additional bonding and to provide an ionically conducting media within the GDE structure. Other ionic monomers similar to Nafion may be employed, including for example, ion exchange resin materials and non-halogenated ionomers such as sulfonated polystyrene, sulfonated divinyl benzene and the like. In addition, the anode GDE's may also be post treated using sprays to add additional hydrophobic material or compounds to the inside and outside surfaces of the GDE's such as the various super-hydrophobic materials available commercially.

Figure 15:
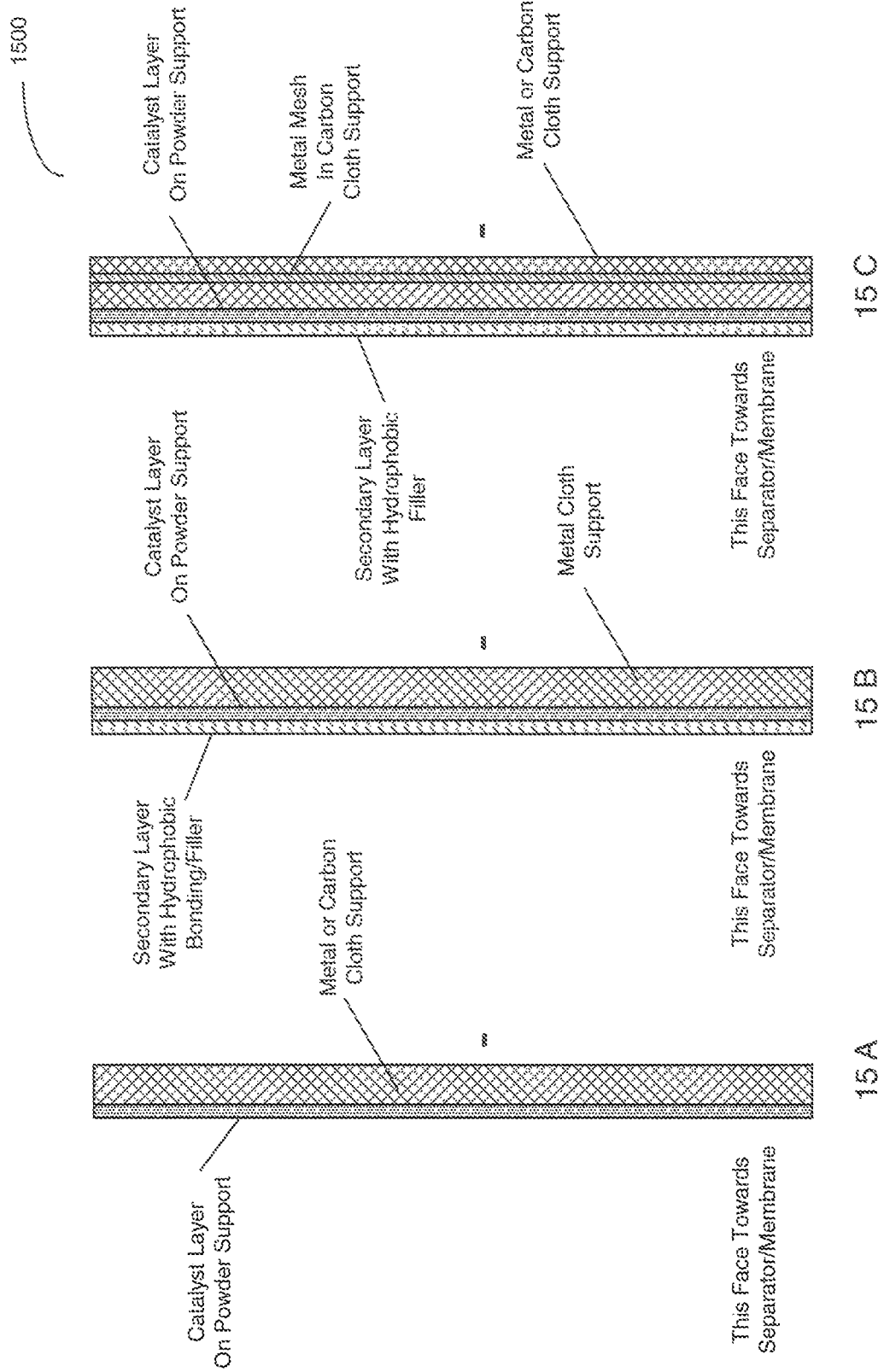
FIG. 15 is a schematic illustrating three different cathode GDE constructions used in an electrochemical cell in producing alkali metal formate from the reduction of carbon dioxide in accordance with an embodiment of the present disclosure.

Referring to FIG. 15, a schematic illustrating three different cathode GDE constructions 1500 used in an electrochemical cell in producing alkali metal formate from the reduction of carbon dioxide in accordance with an embodiment of the present disclosure is shown. FIGS. 15A, 15B, and 15C have the same relative corresponding configurations as FIGS. 14A, 14B, and 14C except that the catalyst for the reduction of carbon dioxide may include, for example, high hydrogen over potential metals, such as indium, tin, bismuth and the like, that are suitable electrocatalysts for the reduction of carbon dioxide to formate. The preferred metal catalysts may include, for example, indium, tin, bismuth, lead, silver, gold, zinc, and cadmium including their binary and ternary alloys, intermetallics, and combinations as single and multiple composition coatings deposited on various metals, carbon, or other conductive supports. Other suitable catalysts may further include other transition metals, such as copper, cobalt, manganese, vanadium, and nickel that may be combined and alloyed with the preferred metal catalysts already mentioned such as indium, tin, and silver. The preferred carbon dioxide reduction product, such as CO or formate, may determine the catalyst selected for use in the GDE. For example, a silver based catalyst may be preferred for efficiently converting carbon dioxide to CO, while an indium-tin alloy may be most suitable for reducing carbon dioxide to formate. Most importantly, the stability of the catalyst to the cathode reaction is the key to providing a long term life cathode for the electrochemical process.

The catalyst layer may be a high surface area powder including metal deposited onto a carbon or conductive ceramic substrate or may include a composition utilizing a high surface area metal powder that may have a metal composition that may range from 5 wt % to 90 wt % as the metal(s). The hydrophobic PTFE or other described hydrophobic and ionically conducting polymer materials may be used to help provide the bonding in forming the three dimensional cathode $CO_2$ reduction GDE structure. The carbon cloth may be substituted with a high surface area metal mesh or cloth structure, or metalized carbon or polymer material, which may be non-woven or sintered. In addition, a small percentage of monomers may be added to the GDE composition that may be polymerized to form a rubber or elastomer type structure that does not significantly reduce the electrical and ionic conductivity of the GDE structure.

Figure 16:
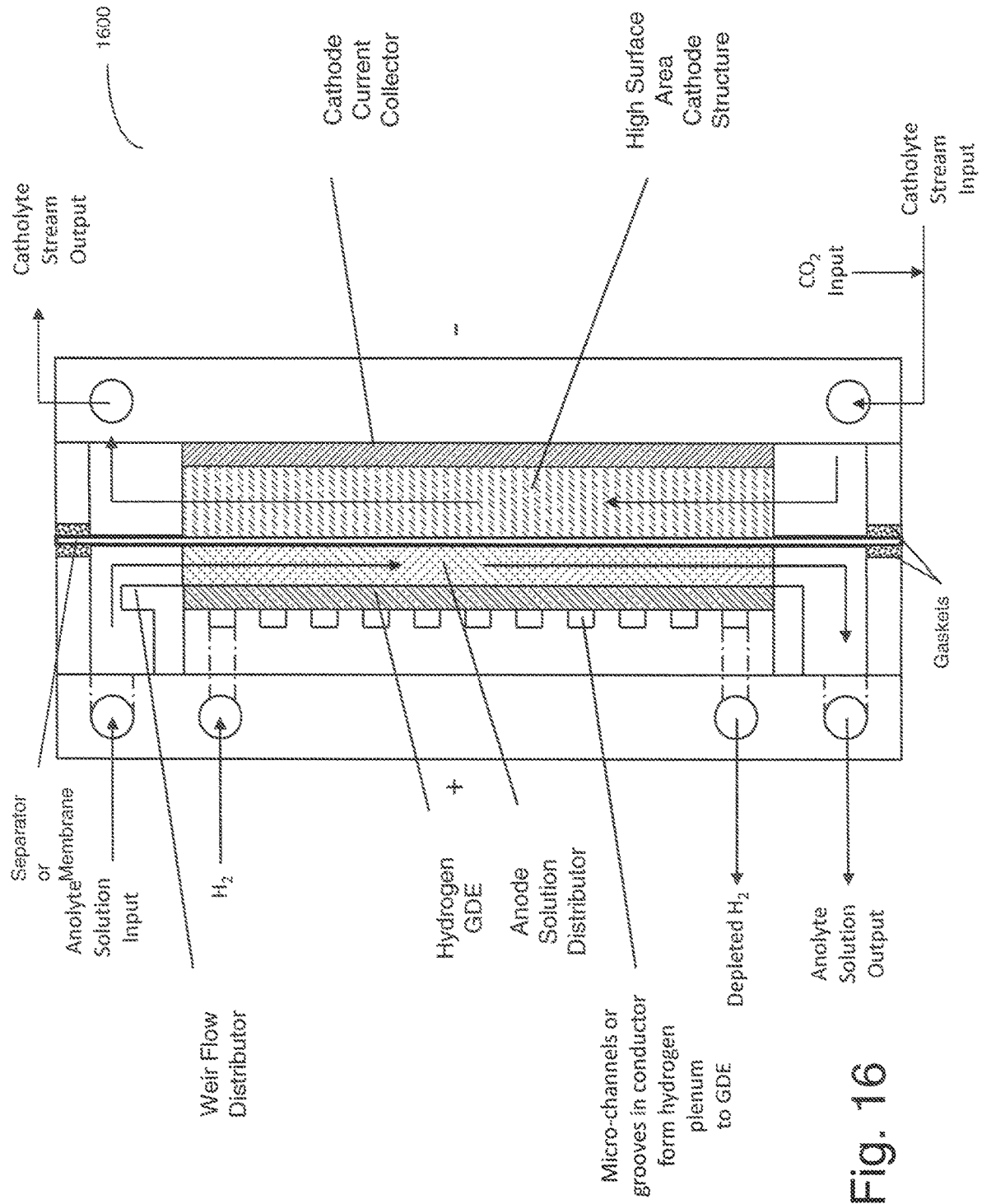
FIG. 16 is a schematic illustrating an electrochemical cell utilizing a hydrogen GDE and a weir solution distribution system for the anode reaction in producing alkali metal formate from the reduction of carbon dioxide in accordance with an embodiment of the present disclosure.

Referring to FIG. 16, a schematic illustrating an electrochemical cell 1600 utilizing a hydrogen GDE and a weir solution distribution system for the anode reaction in producing alkali metal formate from the reduction of carbon dioxide in accordance with an embodiment of the present disclosure is shown. Electrochemical cell 1600 may include a different placement of the anolyte solution inlet and anolyte solution outlet ports in comparison to electrochemical cell 1200. The hydrogen may also be operated in a co-current or countercurrent flow configuration. It is contemplated that electrochemical cell 1600 may include an energy source (not shown) which may be operably coupled with the anode and the cathode, the energy source configured to provide power to the anode and the cathode to reduce carbon dioxide at the cathode.

Figure 17:
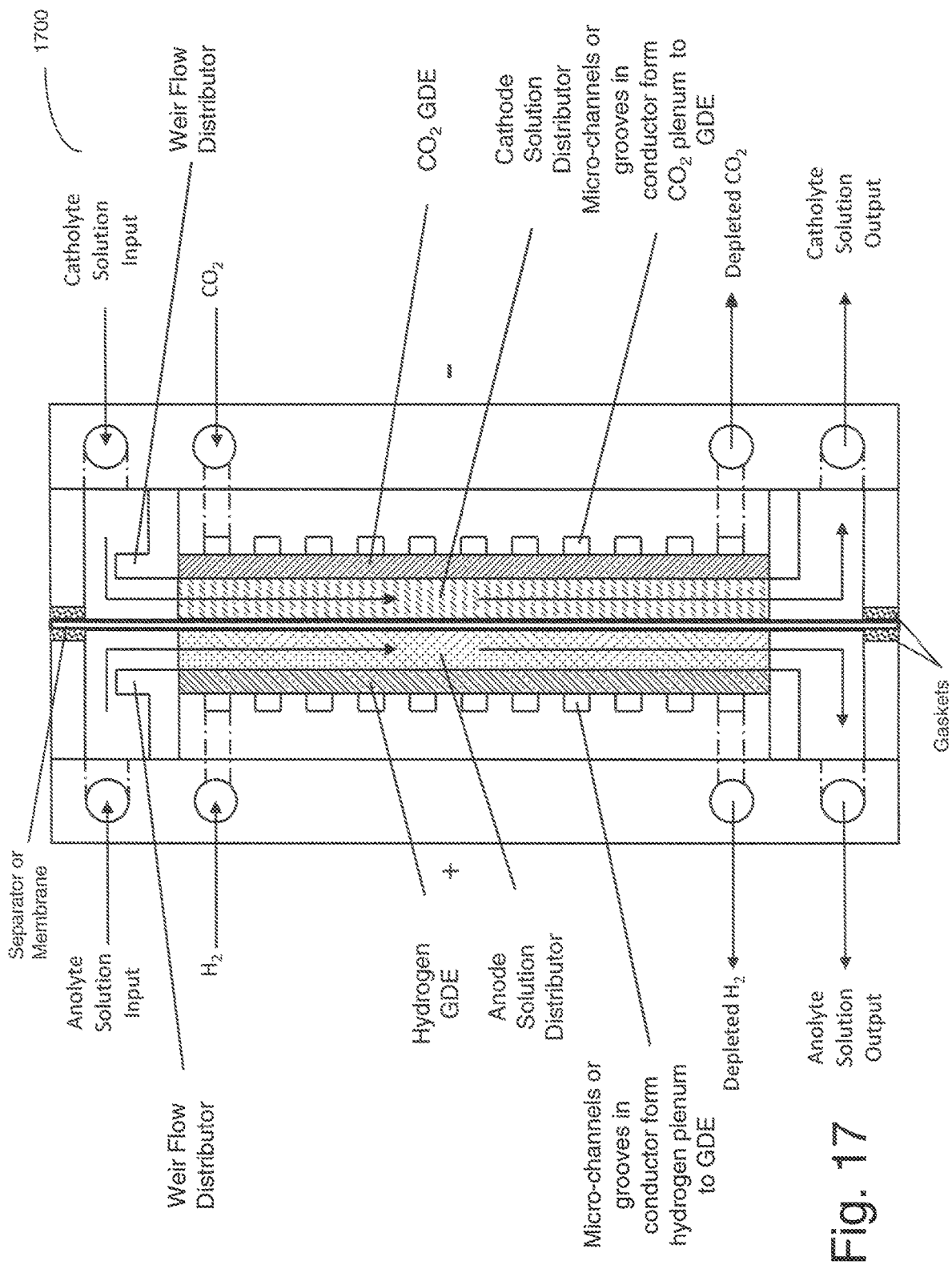
FIG. 17 is a schematic illustrating an electrochemical cell utilizing a hydrogen GDE for the anode reaction and a carbon dioxide GDE for the cathode reaction and showing a weir solution distribution system in producing alkali metal formate from the reduction of carbon dioxide in accordance with an embodiment of the present disclosure.

Referring to FIG. 17, a schematic illustrating an electrochemical cell 1700 utilizing a hydrogen GDE for the anode reaction and a carbon dioxide GDE for the cathode reaction and showing a weir solution distribution system in producing alkali metal formate from the reduction of carbon dioxide in accordance with an embodiment of the present disclosure is shown. Electrochemical cell 1700 includes weir flow anolyte and catholyte solution distributors that evenly distribute the anolyte and catholyte solutions into the anolyte and catholyte trickle bed distributors respectively. Electrochemical cell 1700 also shows a different placement of the solution inlet and outlet flow ports for the anolyte and catholyte in comparison to electrochemical cell 1300. It is contemplated that electrochemical cell 1700 may include an energy source (not shown) which may be operably coupled with the anode and the cathode, the energy source configured to provide power to the anode and the cathode to reduce carbon dioxide at the cathode.

In an alternative embodiment, the cathode carbon dioxide GDE structure may include a high surface area metallic powder catalyst base that has been mixed with a hydrophobic bonding agent that may be compressed and heat bonded into a thin porous sheet, and then further bonded to the GDE support structures as shown in FIGS. 12-17, which may be metal or carbon based materials or their combination. The percentage of the hydrophobic agent in the metallic powder catalyst may range from 2% to 95% by weight, and more preferably 5% to 80% by weight. The metal powder catalyst may include metals and their alloys suitable for the reduction of carbon dioxide to formate, for example indium and tin and their alloys. The metal particles may include multiple electrocatalyst coatings, such as one metal and/or metal oxide plated or coated onto another metal or metal oxide. Examples of this may be electrocatalyst materials and structures constructed with a multitude of layers that may perform the electrochemical reduction of carbon dioxide that may have synergistic co-catalytic effects and provide a stable, long term life performance. Examples of these may be tin particles including an applied surface coating of indium or an indium alloy with lead or zinc, copper or nickel substrate particles with an applied coating of tin with an overlayer of co-electrocatalyst of indium and the like.

In addition, the metal powder catalyst may include metal oxides as well as small amounts of precious metal and precious metal oxides, as mixtures or coatings on the electrocatalyst particles. The percentages of these added components, such as the precious metals, may range from 0.001% to 80% or more in the catalyst composition by weight.

Formate $CO_2$ Reduction Chemistry

The postulated chemistry of the reduction of $CO_2$ at the cathode may proceed as follows.

Hydrogen atoms may be adsorbed at the electrode from the reduction of water as shown in equation (1).

$$H^+ + e^- \rightarrow H_{ad} \tag{1}$$

Carbon dioxide may be reduced at the cathode surface with an adsorbed hydrogen atom to form formate, which may be adsorbed on the surface as shown in equation (2) as follows:

$$CO_2 + H_{ad} \rightarrow HCOO_{ad} \tag{2}$$

The formate adsorbed on the surface then reacts with another adsorbed hydrogen atom to form formic acid that may be released into the solution as shown in equation (3):

$$HCOO_{ad} + H_{ad} \rightarrow HCOOH \tag{3}$$

A competing reaction at the cathode may be the reduction of water where hydrogen gas may be formed as well as hydroxide ions as shown in equation (4):

$$2H_2O + 2e^- \rightarrow H_2 + 2OH^- \tag{4}$$

Operating the electrochemical cell at higher pressures (above atmospheric), may increase the carbon dioxide to formate current efficiency and allow operation of the cells at higher current densities.

Anode Reactions

The anode reaction may be the oxidation of water into oxygen and hydrogen ions as shown in equation (5) as follows:

$$2H_2O \rightarrow 4H^+ + 4e^- + O_2 \tag{5}$$

Below may be the various preferred and alternative embodiments for the process, arranged in different categories.

Formate Formation From CO

The thermal intermolecular reaction of alkali metal formate CO with KOH may be as shown in equation (6) follows:

$$CO + KOH \rightarrow HCOOK \tag{6}$$

The KOH may be consumed in the reaction. Under the right conditions, both formate and oxalate may both be produced, and which may decrease the number of process steps. The production of both would require the separation of these carboxylic acids from each other.

Carbon monoxide may also be selectively absorbed in a alkali metal carbonate and bicarbonate aqueous solutions to produce formate, where M may be an alkali metal which may be shown as in equations (7) and (8) as follows:

$$CO + MHCO3 \rightarrow MOOCH + CO_2 \tag{7}$$

$$2CO + M_2CO_3 + H_2O \rightarrow 2MCOCH + CO_2 \tag{8}$$

These reactions may not require MOH, such as NaOH or KOH, in the reaction for the formation of M-formate as catalysts.

Oxalate From Formate

The thermal intermolecular reaction of alkali metal formate with KOH may be as shown in equation (9) as follows:

$$2HCOOK + KOH \rightarrow K_2C_2O_4 + H_2 \tag{9}$$

Optionally, sodium or potassium carbonate may also be used for converting formate to oxalate, but the conversion yields have been shown to be significantly lower. Under the right operating conditions and temperatures, the yields may be significantly improved.

Anode Oxidation Reactions

The anode reaction when utilizing sulfuric acid in the anolyte, is the oxidation of water generating hydrogen ions and oxygen as shown in equation (10) as follows:

$$2H_2O \rightarrow O_2 + 4H^+ + 4e^- \tag{10}$$

If hydrobromic acid, HBr, is used in the anolyte, the reaction is the oxidation of the bromide to bromine as follows:

$$2HBr \rightarrow Br_2 + 2H^+ + 2e^- \tag{11}$$

If sodium chloride, NaCl, may be used in the anolyte, the anode reaction, such as in the formate cell in FIG. 5, is the oxidation of the chloride ion as shown in equation (12) as follows:

$$2NaCl \rightarrow Cl_2 + 2Na^+ + 2e^- \tag{12}$$

Sodium ions may pass through the ion permeable separator from the anolyte compartment to the catholyte compartment and combine with any formate from the reduction of carbon dioxide to form sodium formate and any by-product hydroxide ions formed from the reduction of water at the cathode may form NaOH.

If hydrochloric acid, HCL, may be used in the anolyte, the reaction may be the oxidation of the chloride to chlorine with the co-production of hydrogen ions as shown in equation (13) as follows:

$$2HCl \rightarrow Cl_2 + 2H^+ + 2e^- \tag{13}$$

Carbonate and Bicarbonate Reactions

Sodium carbonate, $Na_2CO_3$, dissolved in solution may be converted to sodium bicarbonate, $Na_2HCO_3$, with reaction with $CO_2$ as shown in equation (14a) as follows:

$$Na_2CO_3 + CO_2 + H_2O \rightarrow 2NaHCO_3 \tag{14a}$$

Similarly, potassium carbonate, $K_2CO_3$, dissolved in solution may be converted to potassium bicarbonate with reaction with $CO_2$ as shown in reaction (14b) as follows:

$$K_2CO_3 + CO_2 + H_2O \rightarrow 2KHCO_3 \tag{14b}$$

Sodium hydroxide, NaOH, reaction with $CO_2$ in solution may be converted to sodium carbonate, $Na_2CO_3$, as shown in equation (15) as follows:

$$2NaOH + CO_2 + H_2O \rightarrow 2Na_2CO_3 + H_2O \tag{15}$$

Chlorine Reaction with NaOH

Sodium hydroxide, NaOH, may be reacted with chlorine to produce sodium hypochlorite, NaOCL, as shown in equation (16) as follows:

$$2NaOH + Cl_2 \rightarrow NaOCL + NaCl + H_2O \tag{16}$$

Bicarbonate Reaction with $H^+$ Ions

Potassium bicarbonate, $KHCO_3$, may react with $H^+$ ions generated in the electrochemical cell to produce $CO_2$ and water, such as in the cathode cell compartment using a potassium bicarbonate electrolyte as shown in equation (17) as follows:

$$2KHCO_3 + 2H^+ \rightarrow 2CO_2 + 2H_2O + 2K^+ \tag{17}$$

Electrolyzer Configurations

The following present various exemplary combinations of cell configurations, electrode structures, and anolyte/catholyte compositions that may be used in the electrochemical CO and/or formate, and electrochemical acidification (EA) electrolyzers in the above described processes.

The cathode of the electrochemical cell 110 and electrochemical acidification electrolyzer 140 may be a high surface area electrode. The void volume for the cathode may be from about 30% to 98%. The surface area of the cathode may be from 2 $cm^2/cm^3$ to 500 $cm^2/cm^3$ or higher. The surface areas may be further defined as a total area in comparison to the current distributor/conductor back plate area with a preferred range of from 2 to 1000 times the current distributor/conductor back plate area.

The cathode of the electrochemical cell 110 may be electrolessly plated indium or tin on a copper woven mesh, screen or fiber structure. Indium-copper intermetallics may be formed on the copper woven mesh, screen or fiber structure. The intermetallics may be harder than the soft indium metal, and allow better mechanical properties in addition to usable catalytic properties.

In the electrochemical reduction of carbon dioxide, metals including Pb, Sn, Ag, Au, Hg, Tl, In, Bi, and Cd among others may produce formic acid (or formate) as a major $C_1$ product in aqueous solutions. Utilizing alloy combinations of these metals such as Hg—Cu, Sn—Cd, Pb—Bi, Sn—Zn, Cu—Sn, In—Sn and the like may have improved Faradaic performance efficiencies in addition to improved catalyst life stability. Some of these individual metal non-alloyed catalysts by themselves, such as Sn and Cu, may have surface changes that deactivates or shows a decline in the Faradaic conversion activity in producing formate or CO. The metal catalyst surface may then may have to be reactivated by a reverse current or polarity. In the potential cathodic production of $C_{2+}$ chemicals from $CO_2$ or the electrochemical reduction of oxalic acid, to products such as glyoxalic and glycolic acid, metals such as Ti, Nb, Cr, Mo, Ag, Cd, Hg, Tl, As, and Pb as well as Cr—Ni—Mo steel alloys among many others may have the beneficial result in the formation of these higher $C_{2+}$ products at high Faradaic efficiencies.

In another embodiment, the cathode surfaces may be renewed by the periodic addition of indium salts or a mix of indium/tin salts in situ during the electrochemical cell operation. Electrochemical cell 110 may be operated at full rate during operation, or temporarily operated at a lower current density with or without any carbon dioxide addition during the injection of the metal salts.

In another exemplary embodiment, in preparing cathode materials for the production of $C_{2+}$ chemicals, the addition of metal salts that may reduce on the surfaces of the cathode structure may be also used, such as the addition of Ag, Au, Mo, Cd, Sn, etc. to provide a catalytic surface that may be difficult to prepare directly during cathode fabrication or for renewal of the catalytic surfaces.

In another embodiment, the cathode structure may include a gas diffusion electrode (GDE), which may be in direct contact with a $CO_2$ gas stream in a different cell construction using an additional compartment with a gas plenum, and allowing for an increase in current density and Faradaic efficiency for formate production. In one embodiment for the GDE construction, the GDE electrode may include a mixture of indium particles or indium coated tin metal particles that may be processed into a paste matrix with a PTFE binder and a small percentage of some non-conductive ceramics, utilizing a central metal screen made from indium plated tin, which is compressed and heated to form a GDE structure that is gas permeable, but resistant to liquid flooding. The structure may also include the addition of other commercial chemical agents used for making materials non-wettable, such as super-hydrophobic materials from UltraEvershield from Ultratech, International and NeverWet from NeverWet International as examples. Other binders such as graphite and graphene may also be used, but may not be as preferred.

Cathode 412 for the electrochemical acidification electrolyzer 140 may include stainless steels and nickel electrodes. Cathode 412 may include coatings on the cathode to reduce the hydrogen overpotential.

An alkali metal hydroxide range for the electrochemical acidification electrolyzer 140 may be 5% to 50% by weight, and more preferably 10% to 45% by weight. The alkali metal hydroxide examples may be NaOH, KOH, CsOH and the like.

Cathode materials for the cathode of electrochemical cell 110 for carbon monoxide production from $CO_2$ may include precious and noble metals as well as Cu, Ag, Au, and their oxides, and specifically the oxides of copper. Ag and Ag oxides in combination and alloys with the other metals may provide better and longer term electrocatalyst performance. Other d-block metals, such as Zn and Ni, may be selective for CO reduction in aqueous media. Regardless of specificity for CO as a $CO_2$ reduction product, a cathode for electrochemical cell 110 for an aqueous system for $CO_2$ reduction to CO may have a high hydrogen overpotential to prevent competing $H_2$ formation.

In another embodiment, the proposed carbon dioxide GDE cathode structures including metal particle electrocatalysts and multi-coating layer electrocatalysts may also be used for the conversion of carbon dioxide to carbon monoxide, CO. Suitable electrocatalysts for this reaction may be silver and silver alloys, in combination and alloys with other metals such as copper, zinc, gold, and other metals such as transition metals. Other gases may be co-generated such as useful mixtures of CO and hydrogen in ratios suitable for use in Fischer Tropsch reactions producing fuels and organics.

Anions used for CO production at the cathode may be any species stable at working potentials such as sulfate, chloride or bicarbonate. $CO_2$ reduction to CO may favor high pH due to limited competing $H_2$ formation; however there may be a practical pH maximum at around 8.5 for a saturated $CO_2$ solution due to the formation of carbonic acid on dissolution. There may be no strict lower limit that may have been observed. Depending on the chemistry of the system, the pH of the catholyte region of electrochemical cell 110 may range from 3 to 12. The pH may be a function of the catalysts used, such that there may be no corrosion at the electrochemical cell 110 and catholyte operating conditions.

Electrolytes for the electrochemical cell 110 for forming CO and formates may include alkali metal bicarbonates, carbonates, sulfates, and phosphates, borates, ammonium, hydroxides, chlorides, bromides, and other organic and inorganic salts. The electrolytes may also include non-aqueous electrolytes, such as propylene carbonate, methanesulfonic acid, methanol, and other ionic conducting liquids, which may be in an aqueous mixture, or as a non-aqueous mixture in the catholyte. The introduction of micro bubbles of carbon dioxide into the catholyte stream may improve carbon dioxide transfer to the cathode surfaces.

Electrolytes for the anolyte region of the electrochemical cell 110 may include: alkali metal hydroxides, (e.g. as KOH, NaOH, LiOH) in addition to ammonium hydroxide; inorganic acids such as sulfuric, phosphoric, and the like; organic acids such as methanesulfonic acid in both non-aqueous and aqueous solutions; and alkali halide salts, such as the chlorides, bromides, and iodine salts such as NaF, NaCl, NaBr, LiBr, KF, KCl, KBr, KI, and NaI, as well as their acid halide forms, such as HCl, and HBr. The alkali halide salts may produce, for example, fluorine, chlorine, bromine, or iodine as halide gas or dissolved aqueous products from the anolyte region. Methanol or other hydrocarbon non-aqueous liquids may also be used, and they would form some oxidized organic products from the anolyte. Selection of the anolyte would be determined by the process chemistry product and requirements for lowering the overall operating cell voltage. For example, using HBr as the anolyte, with the formation of bromine at the anode, which require a significantly lower anode voltage potential than chlorine formation. Hydriodic acid, HI, may form iodine at anode potential voltages even lower than that of bromine.

Catholyte cross sectional area flow rates may range from 2 to 3,000 gpm/ft$^2$ or more (0.0076-11.36 m$^3$/m$^2$). Flow velocities may range from 0.002 to 20 ft/sec (0.0006 to 6.1 m/sec).

Catholyte region of the electrochemical cell 110 may include at least one catalyst. The catalyst may be a homogenous heterocyclic catalyst which may be utilized in the catholyte region to improve the Faradaic yield to formate. Homogenous heterocyclic catalysts may include, for example, one or more of pyridine, tin 2-picoline, 4-hydroxy pyridine, adenine, a heterocyclic amine containing sulfur, a heterocyclic amine containing oxygen, an azole, a benzimidazole, a bipyridine, a furan, an imidazole, an imidazole related species with at least one five-member ring, an indole, a lutidine, methylimidazole, an oxazole, a phenanthroline, a pterin, a pteridine, pyridine, a pyridine related species with at least one six-member ring, a pyrrole, a quinoline, or a thiazole, and mixtures thereof.

Operating electrochemical cell 110 at a higher operating pressure in the catholyte region may allow more dissolved $CO_2$ to dissolve in the aqueous electrolyte. Typically, electrochemical cells may operate at pressures up to about 20 to 30 psig in multi-cell stack designs, although with modifications, they could operate at up to 100 psig. The electrochemical cell 110 anolyte may also be operated in the same pressure range to minimize the pressure differential on the membrane separating the two electrode regions. Special electrochemical designs may be required to operate electrochemical units at higher operating pressures up to about 60 to 100 atmospheres or greater, which may be in the liquid $CO_2$ and supercritical $CO_2$ operating range.

In another embodiment, a portion of the catholyte recycle stream may be separately pressurized using a flow restriction with back pressure or using a pump 390 with $CO_2$ injection such that the pressurized stream may be then injected into the catholyte region of the electrochemical cell 110, and potentially increasing the amount of dissolved $CO_2$ in the aqueous solution to improve the conversion yield.

Catholyte region and anolyte region of electrochemical cell 110 may have operating temperatures that may range from −10 to 95° C., more preferably 5-60° C. The lower temperature may be limited by the electrolytes used and their freezing points. In general, the lower the temperature, the higher the solubility of $CO_2$ in the aqueous solution phase of the electrolyte which may result in obtaining higher conversion and current efficiencies. However, operating electrochemical cell voltages may be higher, such that an optimization may be required to produce the chemicals at the lowest operating cost. In addition, the operating temperatures of the anolyte and catholyte may be different, whereby the anolyte is operated at a higher temperature and the catholyte is operated at a lower temperature.

The electrochemical cell 110 and the electrochemical acidification electrolyzer 140 may be zero gap, flow-through electrolyzers with a recirculating catholyte electrolyte with various high surface area cathode materials. For example, flooded co-current packed and trickle bed designs with various high surface area cathode materials may be employed. The stack cell design may be bipolar and/or monopolar.

The anode of the electrochemical cell 110 and the electrochemical acidification electrolyzer 140 may include one or more anode coatings. For example, for acid anolytes and oxidizing water under acid conditions, electrocatalytic coatings may include: precious metal and precious metal oxides such as ruthenium and iridium oxides, as well as platinum and gold and their combinations as metals and oxides on valve metal conductive substrates such as titanium, tantalum, or niobium as typically used in the chlor alkali industry or other electrochemical processes where they may be stable as anodes. For other anolytes such as alkaline or hydroxide electrolytes, the electrocatalytic coatings may include carbon, graphite, cobalt oxides, nickel, stainless steels, and their alloys and combinations which may be stable as anodes under these alkaline conditions.

Membrane 330, 406a, 406b may be cation ion exchange type membranes such as those having a high rejection efficiency to anions. For example perfluorinated sulfonic acid based ion exchange membranes such as DuPont Nafion® brand unreinforced types N117 and N120 series, more preferred PTFE fiber reinforced N324 and N424 types, and similar related membranes manufactured by Japanese companies under the supplier trade names such as Flemion®. Other multi-layer perfluorinated ion exchange membranes used in the chlor alkali industry and having a bilayer construction of a sulfonic acid based membrane layer bonded to a carboxylic acid based membrane layer may be employed to efficiently operate with an anolyte and catholyte above a pH of about 2 or higher. These membranes may have a higher anion rejection efficiency. These may be sold by DuPont under their Nafion® trademark as the N900 series, such as the N90209, N966, N982, and the 2000 series, such as the N2010, N2020, and N2030 and all of their types and subtypes. Hydrocarbon based membranes, which may be made from of various cation ion exchange materials may also be used if the anion rejection may be not as critical, such as those sold by Sybron under their trade name Ionac®, AGC Engineering (Asahi Glass) under their Selemion® trade name, and Tokuyama Soda among others.

Thermal Conversion of Alkali Metal Formate to Oxalate Experiments

Experiments were conducted to determine some process conditions in the thermal conversion of alkali metal formate. Temperature, calcination time, and the addition of various catalysts that may improve the yields to oxalate were evaluated. Carbonate was determined by a standard method by titration using HCl and pH indicators.

Example 1

Table 1 shows the results of a set of experiments that were conducted in a thermal furnace using a nitrogen atmosphere. Experiments were conducted to evaluate the conditions and yields in the thermal conversion of alkali metal formate. Temperature was varied as well as calcination time, and the use of various catalysts were evaluated. These samples were prepared using reagent grade potassium formate crystal and the addition of reagent grade potassium hydroxide pellets. The chemical reagents were mixed together, and placed in a 100 mL nickel crucible. The crucible was calcined at the times and temperatures as given in Table 1. At 420° C., for time periods of 0.5 to 1.0 hrs, the percent yield of the potassium formate to potassium oxalate using the potassium hydroxide catalyst ranged from 73.71% to 78.53%. The oxalate content was analyzed by both permanganate titration and by Ion chromatography. At 440° C., the conversion yield to oxalate was about 77%.

TABLE 1

| Temperature ° C. | Calcination Time (hr) | Mass of Potassium Formate (gm) | Mass of Potassium Hydroxide Catalyst (gm) | Mass Percent of KOH (%) | Mass Loss (grams) | Percent Yield Potassium Oxalate (%) |
|---|---|---|---|---|---|---|
| 420 | 0.5 | 4.0888 | 0 | 0.0000 | 0.1838 | 7.62 |
| 420 | 0.5 | 4.1784 | 0.2244 | 5.3705 | 0.2115 | 76.11 |
| 420 | 0.5 | 4.0156 | 0.3348 | 8.3375 | 0.1742 | 73.95 |
| 420 | 0.75 | 4.0267 | 0.3246 | 8.0612 | 0.2397 | 73.71 |
| 420 | 1.0 | 4.1087 | 0.2268 | 5.5200 | 0.2121 | 78.53 |
| 440 | 0.5 | 4.2935 | 0.3323 | 7.7396 | 0.2482 | 77.17 |
| 440 | 1.0 | 4.0391 | 0.2008 | 4.9714 | 0.2329 | 77.55 |

Example 2

Table 2 shows the results of the same procedure as in Example 1, except that potassium bicarbonate was added to potassium formate as co-product or potential catalyst. The calcination temperature was 420° C. for 30 minutes in a nitrogen atmosphere in the thermal oven.

TABLE 2

| Sample | Catalyst Wt % | % Oxalate |
|---|---|---|
| 1 | 10% KHCO$_3$ | 11.38 |
| 1 | 5% KHCO$_3$ | 14.44 |

Example 3

Table 3 shows the results of the same procedure as in Example 1, KOH was added to potassium formate as a catalyst. The calcination temperature was 440° C. for 30 minutes in a nitrogen atmosphere in the thermal oven. Table 4 shows the results using no KOH catalyst.

TABLE 3

| Sample # | Wt % KOH Catalyst | Potassium Oxalate Wt % | Potassium Carbonate Wt % |
|---|---|---|---|
| 1 | 2.0 | 80.4 | 13.0 |
| 2 | 2.0 | 72.8 | 22.6 |
| 3 | 2.0 | 71.7 | 20.7 |

TABLE 4

| Sample # | Wt % KOH Catalyst | Potassium Oxalate Wt % | Potassium Carbonate Wt % |
|---|---|---|---|
| 1 | 0 | 14.3 | 23.8 |
| 2 | 0 | 43.9 | 51.0 |

Example 4

Table 5 shows the results of the same procedure as in Example 1, KOH was added to potassium formate as a catalyst. The calcination temperature was 480° C. for 30 minutes in a nitrogen atmosphere in the thermal oven. Table 6 shows the results using no KOH catalyst.

TABLE 5

| Sample # | Wt % KOH Catalyst | Potassium Oxalate Wt % | Potassium Carbonate Wt % |
|---|---|---|---|
| 1 | 2.0 | 75.9 | 21.6 |
| 2 | 2.0 | 75.7 | 21.7 |
| 3 | 2.0 | 74.6 | 21.5 |

TABLE 6

| Sample # | Wt % KOH Catalyst | Potassium Oxalate Wt % | Potassium Carbonate Wt % |
|---|---|---|---|
| 1 | 2.0 | 73.3 | 23.6 |
| 2 | 2.0 | 72.7 | 24.1 |
| 3 | 2.0 | 71.2 | 24.3 |

Example 5

Table 7 shows the results of the same procedure as in Example 1, magnesium oxide powder was added to potassium formate as a catalyst. The calcination temperature was 420° C. in a nitrogen atmosphere in the thermal oven.

TABLE 7

| Sample # | MgO Catalyst (gm) | Potassium Formate (gm) | MgO wt % | Calcination Time in Hrs | Potassium Oxalate Wt % |
|---|---|---|---|---|---|
| 1 | 0.7567 | 4.2279 | 17.9 | 0.75 | 19.9 |
| 2 | 0.3603 | 3.7827 | 9.5 | 1.0 | 54.3 |
| 3 | 0.5644 | 3.9544 | 14.3 | 1.5 | 48.3 |

Example 6

Table 8 shows the results of the same procedure as in Example 1, sodium borohydride (NaBH$_4$) powder was added to potassium formate as a catalyst. The calcination temperature was 440° C. in a nitrogen atmosphere in the thermal oven. Table 9 shows the results using NaBH$_4$ and KOH as co-catalysts at the same temperature.

TABLE 8

| Sample # | NaBH$_4$ Catalyst wt % | Calcination Time in min | Potassium Oxalate Wt % | Potassium Carbonate Wt % |
|---|---|---|---|---|
| 1 | 2.47 | 3.5 | 66.2 | 11.0 |
| 2 | 2.77 | 2.66 | 75.6 | 11.2 |

TABLE 9

| Sample # | Calcination Time | NaBH$_4$ wt % | KOH wt % | Potassium Oxalate wt % | Potassium Carbonate wt % |
|---|---|---|---|---|---|
| 1 | 5 min 25 sec | 2 | 2 | 74.2 | 8.5 |
| 2 | 3 min | 2.5 | 2.5 | 66.5 | 10.2 |
| 3 | 2 min 30 sec | 2.5 | 2.5 | 81.3 | 10.7 |
| 4 | 3 min 10 sec | 2.5 | 2.5 | 76.8 | 9.5 |
| 5 | 3 min | 2.77 | 0 | 75.6 | 11.2 |
| 6 | 2 min 30 sec | 2.5 | 3.0 | 81.3 | 11.1 |
| 7 | 2 min 30 sec | 2.5 | 2.5 | 80.5 | 11.8 |

Example 7

Table 10 shows the results of the same procedure as in Example 1, except that sodium hydride (NaH) powder was added to sodium formate as a catalyst. The calcination temperature was 440° C. in a nitrogen atmosphere in the thermal oven.

Table 11 shows the results using NaH added as a catalyst to potassium formate at various time and temperatures.

TABLE 10

| Sample # | Calcination Time (min) | NaH wt % | Calcination Temp ° C. | Sodium Oxalate wt % | Sodium Carbonate wt % |
|---|---|---|---|---|---|
| 1 | 3.75 | 2.86 | 440 | 85.49 | 7.36 |
| 2 | 3.75 | 2.86 | 440 | 84.48 | 7.14 |
| 3 | 3.75 | 2.59 | 440 | 89.12 | 5.32 |
| 4 | 4.25 | 2.96 | 430 | 86.99 | 7.15 |
| 5 | 3.25 | 2.19 | 430 | 89.46 | 5.14 |

TABLE 11

| Sample # | Calcination Time | Calcination Temp ° C. | NaH wt % | Potassium Oxalate wt % | Potassium Carbonate wt % |
|---|---|---|---|---|---|
| 1 | 19.66 min | 440 | 2.0 | 55.18 | 15.69 |
| 2 | 30 min | 400 | 2.5 | 47.68 | 22.96 |

Conversion of Oxalic Acid to Glyoxylic Acid

Figure 18:
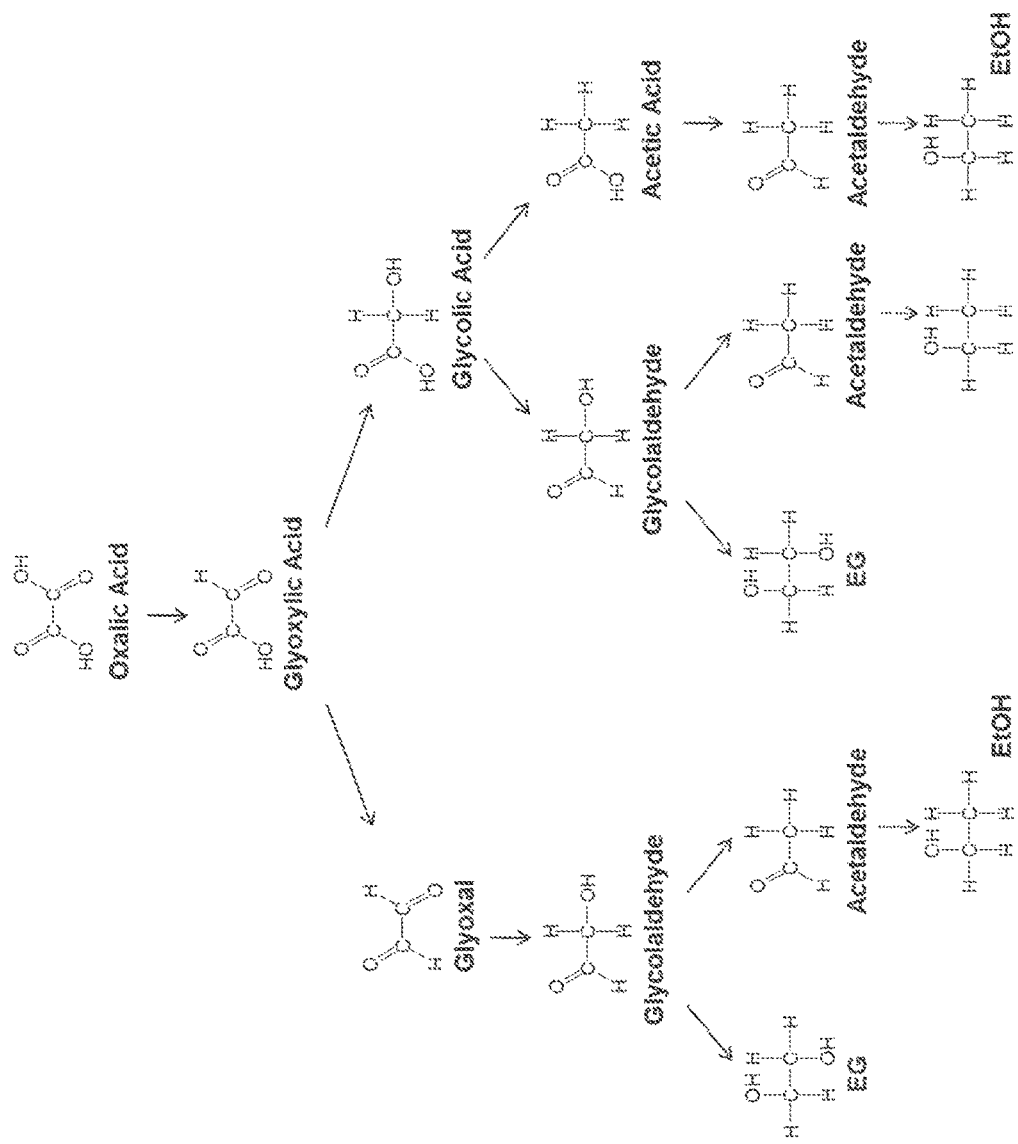
FIG. 18 shows potential chemical derivatives starting with oxalic acid as an initial chemical feedstock in accordance with an embodiment of the present disclosure.

Referring to FIG. 18, potential chemical derivatives starting with oxalic acid as an initial chemical feedstock in accordance with an embodiment of the present disclosure are shown. Glycine (aminoacetic acid) is an industrial chemical having a number of applications. It has extensive use as an additive for human and animal food products, as well as an intermediate in the synthesis of numerous chemicals. At the present time, glycine is manufactured commercially from the reaction of chloroacetic acid with ammonia. Since carbon dioxide is one of the least expensive potential chemical feedstocks, economic routes for producing chemicals from carbon dioxide such as glycine may have an advantage over current conventional routes. Another important chemical is ethylene glycol, which may be produced using oxalic acid as a raw material. Ethylene glycol is used in billions of pounds per year in antifreeze and in making bottles made from polyethylene terephthalate, which is used in bottled consumer drinks.

Figure 19:
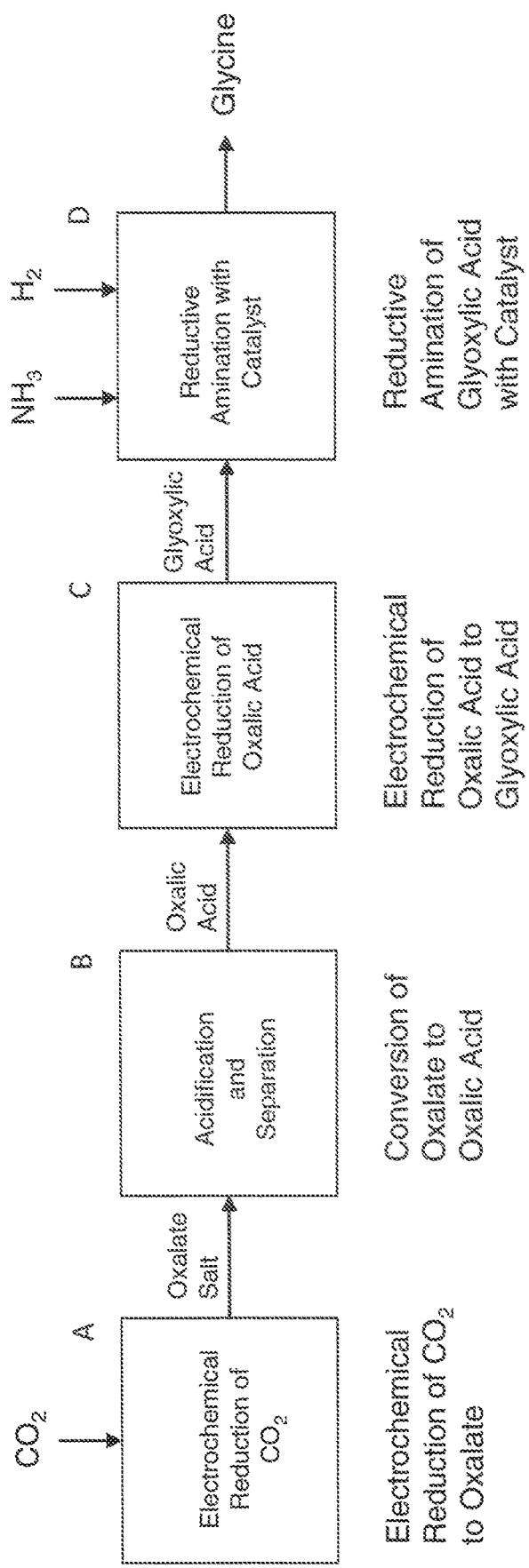
FIG. 19 shows a system for electrochemically converting carbon dioxide to oxalic acid which is then converted to glyoxylic acid electrochemically and the glyoxylic acid is converted to glycine by reductive amination in accordance with an embodiment of the present disclosure in accordance with an embodiment of the present disclosure.

Referring to FIG. 19, a schematic illustrating a system in a block diagram format for the conversion of carbon dioxide to glycine is shown. The system may include Unit A which includes an electrochemical cell for the conversion of a carbon dioxide feed to an oxalate salt which then passes onto Unit B, converting the oxalate salt to oxalic acid, and then passing the oxalic acid to Unit C, where the oxalic acid is electrochemically reduced to glyoxylic acid, and passing the glyoxylic acid to a reductive amination unit, with the addition of ammonia and hydrogen, which is converted to glycine as a product. The solvent and intermediates passed between the various units as well any purification steps in FIG. 19 are not shown.

Figure 20:
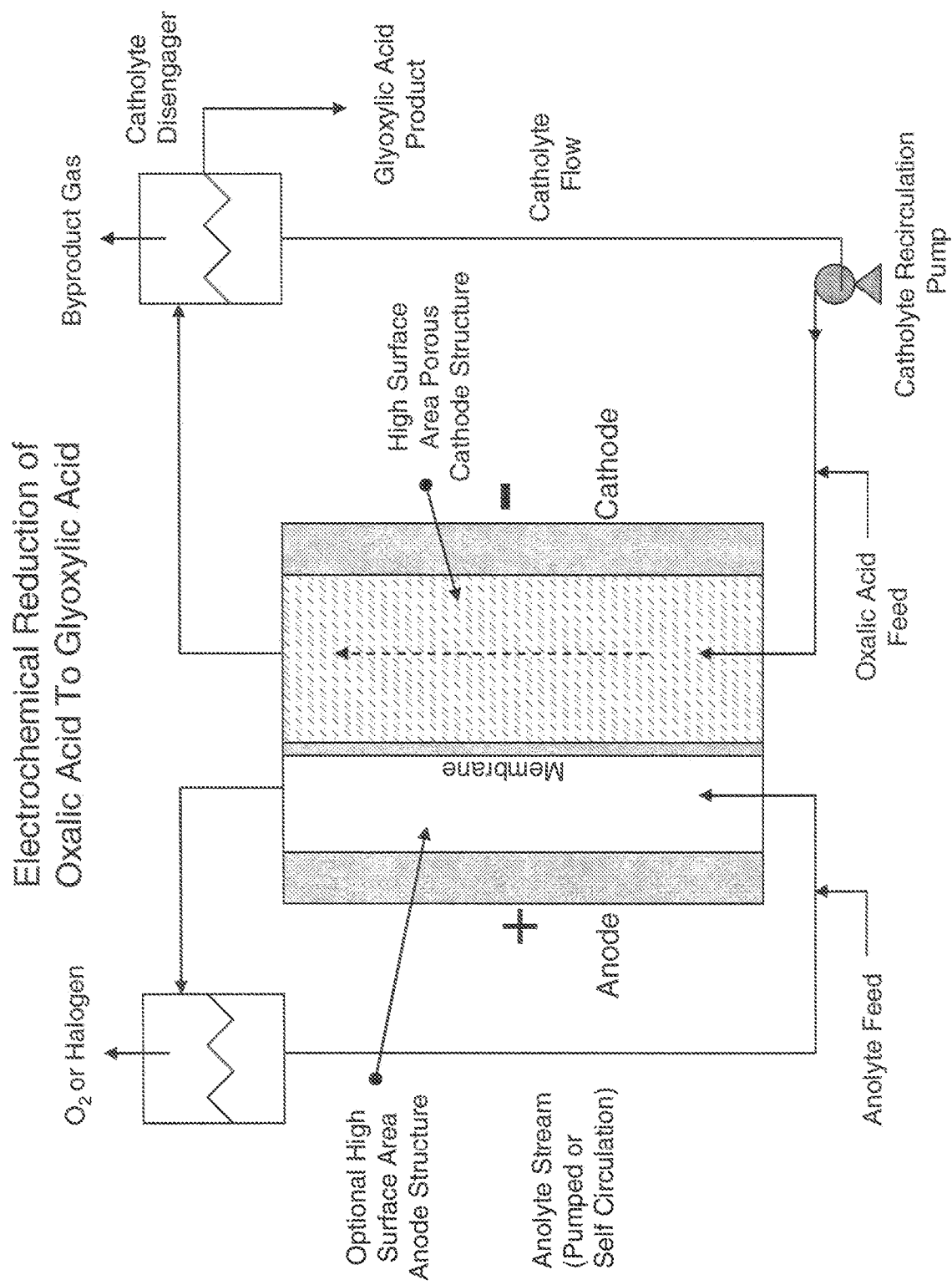
FIG. 20 shows an electrochemical cell for reducing oxalic acid to produce a glyoxylic acid product in accordance with an embodiment of the present disclosure.

Referring to FIG. 20, a schematic illustrating an electrochemical cell for reducing oxalic acid to produce a glyoxylic acid product is shown. The electrochemical cell includes of an anolyte compartment containing an anode, a catholyte compartment containing a cathode, and a membrane or separator separating the two compartments. An oxalic acid feed is fed into the catholyte compartment of the electrochemical cell and is reduced at the cathode to glyoxylic acid. The glyoxylic product is separated from the recirculating catholyte stream in the catholyte disengager, which also separates any gaseous byproduct gases from the reduction reaction. The catholyte solution is recirculated back to the catholyte compartment using a catholyte recirculation pump. The catholyte solution may include various selected acids, which may be inorganic or organic acids in an aqueous or nonaqueous based solution.

The catholyte compartment includes of a cathode structure including of a cathode current collector or distributor, and a high surface area cathode made from metals, alloys, and electrocatalyst coatings on metals that are suitable for the efficient reduction of glyoxylic acid to glycine. These include, but are not limited to metals such as Cd, Pb, Hg, Bi, Sb, PbSb, and their alloys and oxides.

The anolyte compartment includes of an anode and an optional high surface area structure. The anode reaction may generate oxygen when using mineral acids such as sulfuric, phosphoric, and nitric acid as examples, or may use organic acids that are stable to the anode reaction in producing oxygen such as methanesulfonic acid. The anode materials suitable for these acid anolytes are coatings of precious metal oxides such as ruthenium and iridium oxides, as well as platinum and gold and their combinations as metals and oxides on valve metal substrates such as titanium, tantalum, or niobium.

The anode materials for this electrochemical cell are similar to those employed in the electrochemical cells producing oxalate as disclosed in this application, such as the electrochemical cell shown in FIGS. 1-3, which include carbon materials such as carbon and graphite, which may be in the form of felts, needled felts, or woven forms. These carbon based materials may have catalysts impregnated into and onto the surfaces of the high surface area carbon structure includes platinum group metals and their oxides, mixtures, and alloys, such as gold, platinum, ruthenium dioxide, iridium oxide, and the like that preferably may be chemically resistant to the anode bromine formation chemistry and may help to promote or catalyze the oxidation of bromide to bromine. Other suitable anode materials may be valve metals, such as titanium, niobium, and tantalum having an electrocatalyst surface coating of the various precious metal group metals and their oxides, mixtures, and their alloys. These anode materials are used when producing halogens in the anolyte compartment when employing solutions containing acid halides such as HCl and HBr, thus generating chlorine or bromine respectively as the product from the anode compartment.

The separators and membrane materials used for the glyoxylic acid reduction cell are also the same types as used in the oxalate generating cells as disclosed in this application.

Figure 21:
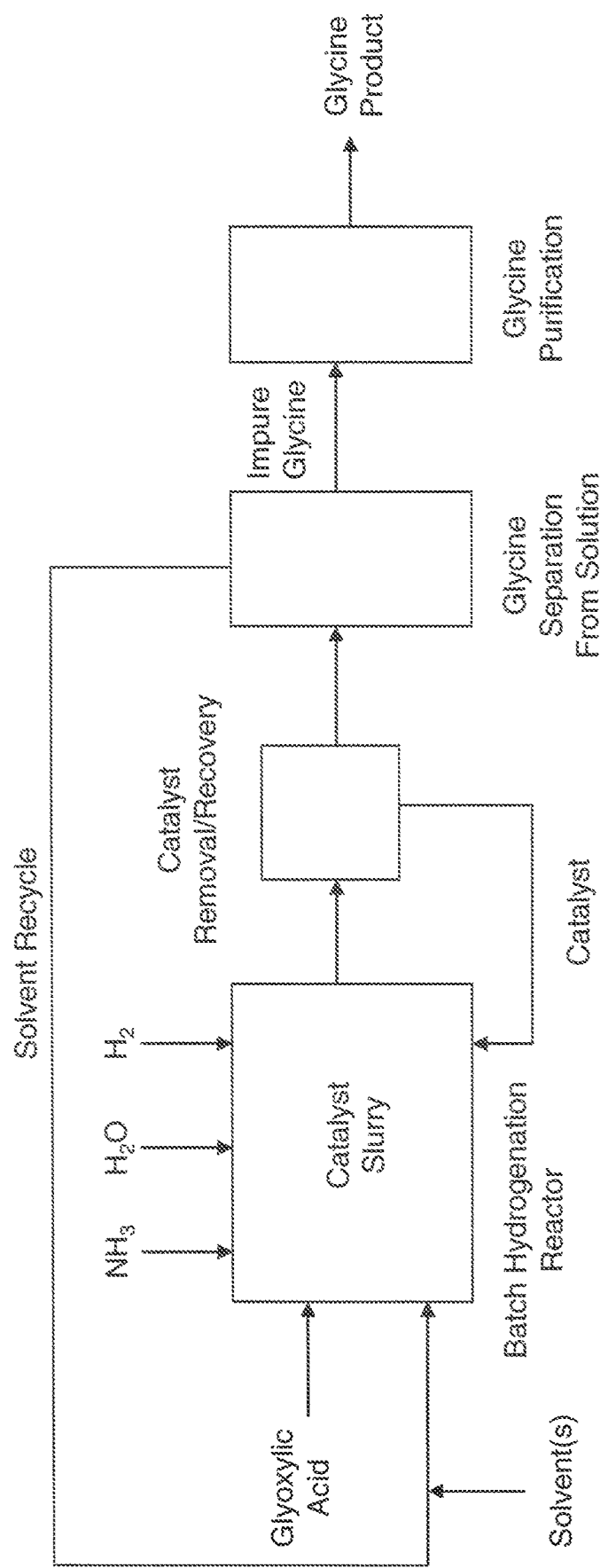
FIG. 21 shows a batch reactor system for the conversion of glyoxylic acid to glycine in accordance with an embodiment of the present disclosure.

Referring to FIG. 21, a schematic illustrating a reductive amination batch reactor system for the conversion of glyoxylic acid to glycine is shown, including a batch reactor system giving the feed inputs, the recycle streams, and purification of the final glycine product. The glycine separation from the solvent may be done by various processes, such as distillation or by extractive distillation.

In one embodiment, the reductive amination of oxalic acid to glycine is preferably conducted in a reactor. The proposed chemical reaction for the reductive amination is as follows:

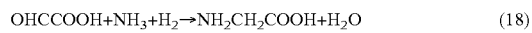

$$\text{OHCCOOH} + \text{NH}_3 + \text{H}_2 \rightarrow \text{NH}_2\text{CH}_2\text{COOH} + \text{H}_2\text{O} \qquad (18)$$

The glyoxylic acid product generated utilizing the electrochemical cell as shown in FIG. 20 is fed to a reactor containing a water soluble organic solvent, water, and a selected hydrogenation catalyst. Ammonia and hydrogen are then metered into the reactor in specific molar ratios, and the reaction proceeds with hydrogen pressure being kept constant, by the addition of more hydrogen, during the reaction while it is being consumed.

The ammonia may be employed either as aqueous ammonia or as liquid ammonia. The ammonia may be used in a molar excess of that theoretical required (reaction 18), in the molar ratio range of 1.2 to 20 as $NH_3$:glyoxylic acid, or more preferably in a range of 1.5 to 10, and more preferably in a range of 2 to 5.

A number of water-soluble organic solvents may be used in the reactor to keep the reactants and products in the reactor in solution. These solvents should preferably be nonreactive toward the glyoxylic acid and the glycine product and easily recoverable from the glycine product in the post separation and purification steps.

Suitable solvents include alcohols, including methanol, ethanol, Isopropanol, and tertiary butanols, as well as other water miscible solvents such as 1,4-dioxane, tetrahydrofuran, piperidine, and their mixtures. Methanol and ethanol may be preferred solvents.

The ratio of water-soluble organic solvent to water is calculated to keep the reactants and reaction products in solution and promote the conversion of the glyoxylic acid to glycine. When methanol is used as the organic solvent, a solvent mixture including about 60% methanol and 40% water may be used. The amount of methanol may range from about 20 to about 70% by weight methanol in the methanol water solvent mixture.

The reductive amination reaction reactor also employs a suitable hydrogenation catalyst. Suitable catalysts are the platinum group metals and several transition metals, including ruthenium, rhodium, nickel, palladium, platinum, osmium, and their alloys and mixtures. Rhodium has been found as an effective catalyst in producing high yields of glycine. The catalyst may be in the form of particles of the elemental material deposited on a carrier substrate such as carbon, silica, and alumina. The catalyst may be in the form of a slurry suspension, as may be used in a batch reactor, or in the form of a fixed catalyst bed, as used in a continuous reactor, which would be preferred.

The amination reactor may be a batch or continuous type where the reactants are placed in a pressure vessel equipped or associated with means for vigorous stirring and agitation as well as for the introduction of hydrogen gas under the desired pressure within the reactor. The reaction pressures may range from 20 psig to 3,000 psig depending on the catalyst and temperature conditions employed.

The reduction amination reaction temperatures may range from 0° C. to 100° C., and preferably in the range of 10° C. to 60° C., and more preferably from about 15° C. to 40° C. by changing the reaction temperatures, catalyst selection, or the solvents used in the reaction. The preferred conversion yield is 80% or greater, and more preferably 90% or greater.

Experimental Results

Below is a summary of results in determining the products of the electrochemical reduction of oxalic acid using various cathode materials.

In this group of tests, the electrochemical reduction of oxalic acid in batch reactors with various cathode materials was studied. Best Faradaic yields (FY) for the production of glycolic and glyoxylic acids were 60% and 75%, respectively, for the direct reduction of oxalic acid. A FY of 95% was also achieved for the reduction of glyoxylic acid to glycolic acid. Mono-ethylene Glycol (MEG) was observed with Cd cathode in trace amounts. The most influential factors to the Faradaic yields of glycolic and glyoxylic include cathode material, potential, and temperature while any electrolyte influence was found to be negligible. No factors affecting ethylene glycol yields have been discovered as no systems producing meaningful quantities of MEG are yet known.

Preparation of the Cathodes

To obtain the reproducible surface, the cathode materials were cleaned by a standard procedure. In a typical experiment, ~2 cm$^2$ metal pieces was cut from the bulk metal and polished by alumina powder (0.3 μm), rinsed with deionized water and degreased by acetone. Hence cleaned electrode was sonicated for 2 minutes in deionized water. Prior to use, the electrode was dried by pressing in between clean Kimwipes.

Bulk Electrolysis

Electrolysis was performed using an Arbin MSTAT 167563 Potentiostat (Arbin Instruments) at constant potentials. Unless otherwise noted, all electrolysis was carried out in a three chambered glass cell with separated cathode and anode chambers. For the electrolysis, that involved mercury cathode, a two chambered electrochemical set up was used, with a glass frit separated cathode chamber. An insulated copper wire was used to establish the connection between the liquid mercury on the cathode and the potentiostat. Various forms of carbon were tested for the anode compatibility.

Analysis of the Products

Glycolic and glyoxylic quantitation was performed by Ion Chromatography (IC). Other analytes were quantified by NMR. Analytical samples for NMR were prepared as such: 800 uL of sample, 100 uL of D$_2$O, and 100 uL of 1000 ppm acetone in H$_2$O. They were run for H1 using solvent suppression. Quantitation was based on relative peak areas using response factors calculated from prepared standard mixes. In the tables below, Ox refers to oxalic acid.

TABLE 12

Experimental results with system producing glyoxylate as major product

| Expt. | Cathode | Electrolyte | Reactant | Voltage Vs, (SCE) | Temperature (° C.) | Glyoxylate FY % | Glycolate FY % |
|---|---|---|---|---|---|---|---|
| GL106 | Cd | 0.5MHBr | 10% Ox | −0.8 | RT | 75.36 | 45.82 |
| GL121 | Pb | 0.5MHCl | 7.5% Ox | −1.2 | 40 | 41.06 | 5.75 |
| GL127 | Pb | 0.5M HBr | 7.5% Ox | −1.2 | 60 | 69.16 | 17.30 |
| GL134 | Cd | 0.5M HBr | 7.5% Ox | −1.2 | 40 | 63.26 | 9.15 |
| GL143 | Hg | 0.5M HBr | 7.5% Ox | −1.2 | RT | 54.68 | 23.17 |

TABLE 13

Experimental results with system producing Glycolate as major product

| Expt. | Cathode | Electrolyte | Reactant | Voltage Vs, (SCE) | Temperature (° C.) | Glycolic FY (%) | Glyoxylic FY (%) |
|---|---|---|---|---|---|---|---|
| GL116 | Bi*[a] | 0.5MHBr | 7.5% GlyOx | −0.9 | RT | 95.63 | N/A |
| GL120 | Bi | 0.5MHBr | 7.5% Ox | −1 | 40 | 43.42 | 41.52 |
| GL122 | Cd | 0.5MHCl | 7.5% Ox | −1 | 40 | 59.84 | 20.85 |
| GL123 | Cd*[b] | 0.5M H$_2$SO$_4$ | 7.5% Ox | −1.2 | 40 | 48.12 | 12.71 |
| GL126 | Cd*[c] | 0.5M H$_2$SO$_4$ | 7.5% Ox | −1.4 | 60 | 59.01 | 17.69 |
| GL128 | Cd | 0.5M HBr | 7.5% Ox | −1.2 | 60 | 38.33 | 18.35 |
| GL131 | Bi | 0.5M HCl | 7.5% Ox | −1.2 | 60 | 49.22 | 23.61 |

TABLE 13-continued

Experimental results with system producing Glycolate as major product

| Expt. | Cathode | Electrolyte | Reactant | Voltage Vs, (SCE) | Temperature (° C.) | Glycolic FY (%) | Glyoxylic FY (%) |
|---|---|---|---|---|---|---|---|
| GL132 | Cd | 0.5M HCl | 7.5% Ox | −1.2 | 40 | 57.11 | 24.47 |
| GL148 | Cd*[d] | 0.25M NaBr | 2% Ox | −1.4 | RT | 24.25 | #VALUE! |

*Cathodes that made more reduced products
[a] 0.065% EG,
[b] 0.17% EG,
[c] 0.19% EG; 4.98% glycolaldehyde,
[d] 0.23% EG

TABLE 14

Experimental results obtained from the EC reduction of Oxalic or glycolic acid which lead to highly reduced products

| Expt. | Cathode | Electrolyte | Reactant | Voltage Vs, (SCE) | Temperature (° C.) | Other FY (%) | Compound |
|---|---|---|---|---|---|---|---|
| GL149 | Cd | 0.5M $H_2SO_4$ | 7.5% Ox | −1.2 | 40 | 0.04 | MEG |
| GL150 | Cd | 0.5M $H_2SO_4$ | 7.5% Ox | −1.4 | 60 | 0.04 | MEG |
| GL167 | Graphite rod | 0.5M HBr | 7.5% glycolic | −1 | RT | 3.27 | Acetic |
| GL176 | Ru | 0.5M HBr | 7.5% glycolic | −1.2 | 60 | 12.53 | Acetic |
| GL177 | Co | 0.5M HBr | 7.5% glycolic | −1.2 | 60 | 15.09 | glycoaldehyde |
| GL171 | Glassy Carbon | 0.5M HBr | 7.5% glycolic | −1.0 | 60 | 1.02 | Acetic |

TABLE 15

Experimental results obtained by the electrochemical reduction of oxalic acid on metal alloys cathodes

| Expt. | Cathode | Electrolyte | Reactant | Voltage Vs, (SCE) | Temperature (° C.) | Glyoxylate FY % | Glycolate FY % |
|---|---|---|---|---|---|---|---|
| GL108 | AgSn | 0.5M HBr | 7.5% Ox | −0.9 | RT | 2.1 | 1.7 |
| GL109 | AgSn | 0.5M HBr | 7.5% Ox | −1.0 | RT | 5.6 | 0.6 |
| GL146 | PbSn | 0.5M HBr | 7.5% Ox | −1.2 | RT | 25.1 | 7.8 |
| GL147 | PbSn | 0.5M HBr | 7.5% Ox | −1.2 | RT | — | 6.7 |
| GL118 | PbSb | 0.5M HBr | 7.5% Ox | −1.3 | RT | 56.4 | 2.0 |
| GL140 | Galinstan | 0.5M HBr | 7.5% Ox | −1.6 | RT | 33.5 | 21.5 |

TABLE 16

Electrochemical systems with not any products observed

| EXP | Cathode | Electrolyte | Reactant | Voltage vs. SCE, | Temperature |
|---|---|---|---|---|---|
| GL152 | Cu | 0.5M HBr | 7.5% glycolic | −1 | 23 |
| GL154 | Pb | 0.5M HBr | 7.5% glycolic | −1.2 | 23 |
| GL155 | Pd | 0.5M HBr | 7.5% glycolic | −1.2 | 60 |
| GL158 | Pd | 0.5M HBr | 7.5% glycolic | −1 | 23 |
| GL160 | Cu | 0.5M HBr | 7.5% glycolic | −1.2 | 60 |
| GL161 | Cd | 0.5M HBr | 7.5% glycolic | −1 | 60 |
| GL162 | Pt | 0.5M HBr | 7.5% glycolic | −1 | 60 |
| GL163 | Sn | 0.5M HBr | 7.5% glycolic | −1 | 60 |
| GL174 | Pb | 0.5M HBr | 7.5% glycolic | −1 | 60 |
| GL175 | Graphite rod | 0.5M HBr | 7.5% glycolic | −1.2 | 60 |
| GL179 | Bi | 0.5M HBr | 7.5% glycolic | −1.2 | 80 |

TABLE 16-continued

Electrochemical systems with not any products observed

| EXP | Cathode | Electrolyte | Reactant | Voltage vs. SCE, | Temperature |
|---|---|---|---|---|---|
| GL180 | Cd | 0.5M HBr | 7.5% glycolic | −1.2 | 80 |
| GL181 | Ru | 0.5M HBr | 7.5% glycolic | −1 | 23 |
| GL182 | Mo | 0.5M HBr | 7.5% glycolic | −1.2 | 23 |
| GL183 | Mo | 0.5M HBr | 7.5% glycolic | −1 | 60 |
| GL184 | Bi | 0.5M HBr | 7.5% glycolic | −1.2 | 60 |
| GL185 | Cd | 0.5M HBr | 7.5% glycolic | −1.2 | 60 |

Alternative anolyte solutions may be employed to generate chemical products such as bromine at the anode region of electrochemical cell 110, which may be used to brominate organics as intermediates in making ethanol, ethylene, and other chemicals based on bromine chemistry. The oxidation of sulfur compounds in the anolyte region, such as sodium sulfide or $SO_2$ or the direct or indirect oxidation of organics, and conducting the partial oxidation of organics, such as methanol to formaldehyde, are also contemplated.

Various alkali metal hydroxides may be employed at the electrochemical cell 110 and/or a thermal reactor 120, 130. For example, hydroxides of lithium, sodium, potassium, and rubidium, and cesium may be used. Further, alkaline earth metal hydroxides may also be used.

Thermal reactors 120, 130 may perform thermal intermolecular condensation reactions using alkali metal hydroxides. Such condensation reactions may include chemical reactions in which two molecules or moieties (functional groups) combine to form one single molecule, together with the loss of a small molecule. When two separate molecules may be reacted, the condensation may be termed intermolecular. Since the reaction occurs at elevated temperatures, the reactions may be characterized as a "thermal intermolecular condensation step". If water may be lost, the reactions may be characterized as "thermal intermolecular dehydration step". These reactions may occur in an aqueous solution phase, such as with the reaction of CO with the alkali metal hydroxide, or as a melt of the alkali metal carboxylic acid and the alkali metal hydroxide in the thermal reaction.

Thermal reactors 120, 130 may operate at about 40 to 500° C., and more preferably at about 50-450° C. The operating temperatures may depend on the decomposition temperatures of the carboxylic acid and the optimum temperature to get the highest yields of the carboxylic product. A residence time of the reaction at optimum reaction temperatures may range from 5 seconds to hours, and the equipment chosen to conduct the reaction may be designed to provide the rate of heating and cooling required to obtain optimal conversion yields. This may include the use of cold rotating metal that may rapidly chill the hot thermal product after the thermal reaction period may be completed.

Thermal reactors 120, 130 may operate in air or an enriched oxygen atmospheres, as well as inert gas atmospheres, such as nitrogen, argon, and helium. Carbon dioxide and hydrogen atmospheres may also be employed to obtain the highest yield in the reaction, as well as partial CO atmospheres. Thermal reactors 120, 130 may be operated under a full or partial vacuum.

The use of CO from other sources, such as from the production of syngas from methane or natural gas reforming may be employed. CO may also come from other sources, such as process waste streams, where may be it separated from carbon dioxide.

Alkali metal hydroxide concentration ranges may be 2% to 99%, more preferably 5 to 98% by weight. The alkali hydroxide may run in molar excess of the alkali metal carboxylic acid being thermally processed in the initial reaction mix or in a continuous process where they may be mixed together. The anticipated molar ratios of the alkali metal carboxylic acid to alkali metal hydroxide may range from 0.005 to 100, and more preferably 0.01 to 50. It may be preferable to use the least amount of alkali metal hydroxide as possible for the reaction to reduce the consumption of the hydroxide in the process.

The process operating equipment that may be employed for thermal reactors 120, 130 may include various commercially available types. For the CO reaction with alkali metal hydroxide, the equipment that may be used may be batch operation equipment, where gas may be injected into a solution mix of the alkali hydroxide. This may also be done in a continuous manner where there may be a feed input of fresh alkali metal hydroxide into a continuous stirred tank reactor (CSTR) with a CO feed into the solution through a gas diffuser into the solution. Alternatively, counter-current packed towers may be used where CO may be injected into the tower counter-current to the flow of alkali metal hydroxide.

For an alkali metal oxalate operation, thermal reactors 120, 130 may include equipment such as rotary kilns, and single pass plug flow reactors that may be used if the process required the thermal processing of a mixture of alkali metal formate and alkali hydroxide as a solid or hot melt mix. Preferably, the equipment would be operated in a continuous fashion, providing the required residence time for the reaction to go to completion at the selected temperatures, which may be followed by a cooling section.

A thermal intermolecular condensation process may also be conducted to produce higher carbon content carboxylic acids as well as converting the carboxylic acids into esters, amides, acid chlorides, and alcohols. In addition, the carboxylic acid products may be converted to the corresponding halide compounds using bromine, chlorine, and iodine.

Catalysts for the thermal conversion of the alkali metal formate may include various bases, including alkali metal hydroxide as well as other compounds that are bases. In addition, alkali metal and other hydrides may be used, since they also act as bases. Any other suitable catalysts that may be compatible with the formates in the calcination and provide high conversion yields are suitable for the process.

It is contemplated that the structure and operation of the electrochemical cells described in the present disclosure, such as electrochemical cell 110, may be adjusted to provide desired results.

For example, the electrochemical cell may operate at higher pressures, such as pressure above atmospheric pressure which may increase current efficiency and allow operation of the electrochemical cell at higher current densities.

Additionally, the cathode and anode of the electrochemical cell may include a high surface area electrode structure with a void volume which may range from 30% to 98%. The electrode void volume percentage may refer to the percentage of empty space that the electrode is not occupying in the total volume space of the electrode. The advantage in using a high void volume electrode is that the structure has a lower pressure drop for liquid flow through the structure. The specific surface area of the electrode base structure may be from 2 cm$^2$/cm$^3$ to 500 cm$^2$/cm$^3$ or higher. The electrode specific surface area is a ratio of the base electrode structure surface area divided by the total physical volume of the entire electrode. It is contemplated that surface areas also may be defined as a total area of the electrode base substrate in comparison to the projected geometric area of the current distributor/conductor back plate, with a preferred range of 2× to 1000× or more. The actual total active surface area of the electrode structure is a function of the properties of the electrode catalyst deposited on the physical electrode structure which may be 2 to 1000 times higher in surface area than the physical electrode base structure.

Cathode may be selected from a number of high surface area materials to include copper, stainless steels, transition metals and their alloys, carbon, and silicon, which may be further coated with a layer of material which may be a conductive metal or semiconductor. The base structure of cathode may be in the form of fibrous, metal foams, reticulated, or sintered powder materials made from metals, carbon, or other conductive materials including polymers. The materials may be a very thin plastic screen incorporated against the cathode side of the membrane to prevent the membrane from directly touching the high surface area cathode structure. The high surface area cathode structure may be mechanically pressed against a cathode current distributor backplate, which may be composed of material that has the same surface composition as the high surface area cathode.

In addition, cathode may be a suitable conductive electrode, such as AL, Au, Ag, Bi, C, Cd, Co, Cr, Cu, Cu alloys (e.g., brass and bronze), Ga, Hg, In, Mo, Nb, Ni, NiCo$_2$O$_4$, Ni alloys (e.g., Ni 625, NiHX), Ni—Fe alloys, Pb, Pd alloys (e.g., PdAg), Pt, Pt alloys (e.g., PtRh), Rh, Sn, Sn alloys (e.g., SnAg, SnPb, SnSb), Ti, V, W, Zn, stainless steel (SS) (e.g., SS 2205, SS 304, SS 316, SS 321), austenitic steel, ferritic steel, duplex steel, martensitic steel, Nichrome (e.g., NiCr 60:16 (with Fe)), elgiloy (e.g., Co—Ni—Cr), degenerately doped n-Si, degenerately doped n-Si:As, degenerately doped n-Si:B, degenerately doped n-Si, degenerately doped n-Si:As, and degenerately doped n-Si:B. Other conductive electrodes may be implemented to meet the criteria of a particular application. For photoelectrochemical reductions, cathode 122 may be a p-type semiconductor electrode, such as p-GaAs, p-GaP, p-InN, p-InP, p-CdTe, p-GaInP$_2$ and p-Si, or an n-type semiconductor, such as n-GaAs, n-GaP, n-InN, n-InP, n-CdTe, n-GaInP$_2$ and n-Si. Other semiconductor electrodes may be implemented to meet the criteria of a particular application including, but not limited to, CoS, MoS$_2$, TiB, WS$_2$, SnS, Ag$_2$S, CoP$_2$, Fe$_3$P, Mn$_3$P$_2$, MoP, Ni$_2$Si, MoSi$_2$, WSi$_2$, CoSi$_2$, Ti$_4$O$_7$, SnO$_2$, GaAs, GaSb, Ge, and CdSe.

The catholyte may include a pH range from 1 to 12, preferably from pH 4 to pH 10. The selected operating pH may be a function of any catalysts utilized in operation of the electrochemical cell. Preferably, catholyte and catalysts may be selected to prevent corrosion at the electrochemical cell. The catholyte may include homogeneous catalysts. Homogeneous catalysts are defined as aromatic heterocyclic amines and may include, but are not limited to, unsubstituted and substituted pyridines and imidazoles. Substituted pyridines and imidazoles may include, but are not limited to mono and disubstituted pyridines and imidazoles. For example, suitable catalysts may include straight chain or branched chain lower alkyl (e.g., C1-C10) mono and disubstituted compounds such as 2-methylpyridine, 4-tertbutyl pyridine, 2,6 dimethylpyridine (2,6-lutidine); bipyridines, such as 4,4'-bipyridine; amino-substituted pyridines, such as 4-dimethylamino pyridine; and hydroxyl-substituted pyridines (e.g., 4-hydroxy-pyridine) and substituted or unsubstituted quinoline or isoquinolines. The catalysts may also suitably include substituted or unsubstituted dinitrogen heterocyclic amines, such as pyrazine, pyridazine and pyrimidine. Other catalysts generally include azoles, imidazoles, indoles, oxazoles, thiazoles, substituted species and complex multi-ring amines such as adenine, pterin, pteridine, benzimidazole, phenonthroline and the like.

The catholyte may include an electrolyte. Catholyte electrolytes may include alkali metal bicarbonates, carbonates, sulfates, phosphates, borates, and hydroxides. Non-aqueous electrolytes, such as propylene carbonate, methanesulfonic acid, methanol, and other ionic conducting liquids may be used rather than water and using salt addition electrolytes such as alkali metal salts. The electrolyte may include one or more of Na$_2$SO$_4$, KCl, NaNO$_3$, NaCl, NaF, NaClO$_4$, KClO$_4$, K$_2$SiO$_3$, CaCl$_2$, a guanidinium cation, a H cation, an alkali metal cation, an ammonium cation, an alkylammonium cation, a tetraalkyl ammonium cation, a halide anion, an alkyl amine, a borate, a carbonate, a guanidinium derivative, a nitrite, a nitrate, a phosphate, a polyphosphate, a perchlorate, a silicate, a sulfate, and a hydroxide.

The catholyte may further include an aqueous or non-aqueous solvent. An aqueous solvent may include greater than 5% water. A non-aqueous solvent may include as much as 5% water. A solvent may contain one or more of water, a protic solvent, or an aprotic polar solvent. Representative solvents include methanol, ethanol, acetonitrile, propylene carbonate, ethylene carbonate, dimethyl carbonate, diethyl carbonate, dimethylsulfoxide, dimethylformamide, acetonitrile, acetone, tetrahydrofuran, N,N-dimethylacetaminde, dimethoxyethane, diethylene glycol dimethyl ester, butyrolnitrile, 1,2-difluorobenzene, γ-butyrolactone, N-methyl-2-pyrrolidone, sulfolane, 1,4-dioxane, nitrobenzene, nitromethane, acetic anhydride, ionic liquids, and mixtures thereof.

In one embodiment, a catholyte/anolyte flowrate may include a catholyte/anolyte cross sectional area flow rate range such as 2-3,000 gpm/ft$^2$ or more (0.0076-11.36 m$^3$/m$^2$). A flow velocity range may be 0.002 to 20 ft/sec (0.0006 to 6.1 m/sec). Operation of the electrochemical cell catholyte at a higher operating pressure allows more dissolved carbon dioxide to dissolve in the aqueous solution. Typically, electrochemical cells can operate at pressures up to about 20 to 30 psig in multi-cell stack designs, although with modifications, the electrochemical cells may operate at up to 100 psig. The electrochemical cell may operate the anolyte and the catholyte at the same pressure range to minimize the pressure differential on a separator 120 or membrane separating the two regions. Special electrochemical designs may be employed to operate electrochemical units at higher operating pressures up to about 60 to 100 atmospheres or greater, which is in the liquid CO$_2$ and supercritical CO$_2$ operating range.

In another embodiment, a portion of a catholyte recycle stream may be separately pressurized using a flow restriction with backpressure or using a pump, with CO$_2$ injection, such that the pressurized stream is then injected into the catholyte region of the electrochemical cell which may increase the amount of dissolved CO$_2$ in the aqueous solution to improve the conversion yield. In addition, microbubble generation of carbon dioxide can be conducted by various means in the catholyte recycle stream to maximize carbon dioxide solubility in the solution.

Catholyte may be operated at a temperature range of −10 to 95° C., more preferably 5-60° C. The lower temperature will be limited by the catholytes used and their freezing points. In general, the lower the temperature, the higher the solubility of $CO_2$ in an aqueous solution phase of the catholyte, which would help in obtaining higher conversion and current efficiencies. The drawback is that the operating electrochemical cell voltages may be higher, so there is an optimization that would be done to produce the chemicals at the lowest operating cost. In addition, the catholyte may require cooling, so an external heat exchanger may be employed, flowing a portion, or all, of the catholyte through the heat exchanger and using cooling water to remove the heat and control the catholyte temperature.

Anolyte operating temperatures may be in the same ranges as the ranges for the catholyte, and may be in a range of 0° C. to 95° C. In addition, the anolyte may require cooling, so an external heat exchanger may be employed, flowing a portion, or all, of the anolyte through the heat exchanger and using cooling water to remove the heat and control the anolyte temperature.

Electrochemical cells may include various types of designs. These designs may include zero gap designs with a finite or zero gap between the electrodes and membrane, flow-by and flow-through designs with a recirculating catholyte electrolyte utilizing various high surface area cathode materials. The electrochemical cell may include flooded co-current and counter-current packed and trickle bed designs with the various high surface area cathode materials. Also, bipolar stack cell designs and high pressure cell designs may also be employed for the electrochemical cells.

Anode electrodes may be the same as cathode electrodes or different. For sulfur dioxide and hydrogen sulfide anode oxidation chemistry under acid conditions, the preferred electrocatalytic coatings may include precious metal oxides such as ruthenium and iridium oxides, as well as platinum and gold and their combinations as metals and oxides on valve metal substrates such as titanium, tantalum, zirconium, or niobium. Carbon and graphite may also be suitable for use as anodes in addition to boron-doped diamond films on metal or other electrically conductive substrates. For other sulfur based reactants in the anolyte such as sodium sulfide or hydrogen sulfide being oxidized under alkaline conditions, such as in a hydroxide containing electrolyte, selected anode materials may include carbon, transition metals, transitional metal oxides carbon steel, stainless steels, and their alloys and combinations which are stable as anodes. Anode may include electrocatalytic coatings applied to the surfaces of the base anode structure. Anolytes may be the same as catholytes or different. The anolyte electrolytes may be the same as catholyte electrolytes or different. The anolyte may include solvent. The anolyte solvent may be the same as catholyte solvent or different. For example, for acid anolytes containing $SO_2$ as the sulfur-based reactant, the preferred electrocatalytic coatings may include precious metal oxides such as ruthenium and iridium oxides, as well as platinum and gold and their combinations as metals and oxides on valve metal substrates such as titanium, tantalum, zirconium, or niobium. For other anolytes, including alkaline or hydroxide electrolytes, anodes may include carbon, cobalt oxides, stainless steels, transition metals, and their alloys, oxides, and combinations. High surface area anode structures that may be used which would help promote the reactions at the anode. The high surface area anode base material may be in a reticulated form composed of fibers, sintered powder, sintered screens, and the like, and may be sintered, welded, or mechanically connected to a current distributor back plate that is commonly used in bipolar cell assemblies. In addition, the high surface area reticulated anode structure may also contain areas where additional applied catalysts on and near the electrocatalytic active surfaces of the anode surface structure to enhance and promote reactions that may occur in the bulk solution away from the anode surface such as the introduction of $SO_2$ into the anolyte. The anode structure may be gradated, so that the suitable of the may vary in the vertical or horizontal direction to allow the easier escape of gases from the anode structure. In this gradation, there may be a distribution of particles of materials mixed in the anode structure that may contain catalysts, such as transition metal based oxides, such as those based on the transition metals such as Co, Ni, Mn, Zn, Cu and Fe as well as precious metals and their oxides based on platinum, gold, silver and palladium which may be deposited on inorganic supports within cathode compartment space or externally, such as in the second product extractor or a separate reactor.

A separator of the electrochemical cell, also referred to as a membrane, may be placed between an anode region and a cathode region of the electrochemical cell. Separator may include cation ion exchange type membranes. Cation ion exchange membranes which have a high rejection efficiency to anions may be preferred. Examples of such cation ion exchange membranes may include perfluorinated sulfonic acid based ion exchange membranes such as DuPont Nafion® brand unreinforced types N117 and N120 series, more preferred PTFE fiber reinforced N324 and N424 types, and similar related membranes manufactured by Japanese companies under the supplier trade names such as AGC Engineering (Asahi Glass) under their tradename Flemion®. Other multi-layer perfluorinated ion exchange membranes used in the chlor alkali industry may have a bilayer construction of a sulfonic acid based membrane layer bonded to a carboxylic acid based membrane layer, which efficiently operates with an anolyte and catholyte above a pH of about 2 or higher. These membranes may have a higher anion rejection efficiency. These are sold by DuPont under their Nafion® trademark as the N900 series, such as the N90209, N966, N982, and the 2000 series, such as the N2010, N2020, and N2030 and all of their types and subtypes. Hydrocarbon based membranes, which are made from of various cation ion exchange materials can also be used if a lower the anion rejection efficiency is not as important, such as those sold by Sybron under their trade name Ionac®, AGC Engineering (Asahi Glass) under their trade name under their Selemion® trade name, and Tokuyama Soda, among others on the market. Ceramic based membranes may also be employed, including those that are called under the general name of NASICON (for sodium super-ionic conductors) which are chemically stable over a wide pH range for various chemicals and selectively transports sodium ions, the composition is $Na_1+xZr_2Si_xP_3-xO_{12}$, and well as other ceramic based conductive membranes based on titanium oxides, zirconium oxides and yttrium oxides, and beta aluminum oxides. Alternative membranes that may be used are those with different structural backbones such as polyphosphazene and sulfonated polyphosphazene membranes in addition to crown ether based membranes. Preferably, the membrane or separator is chemically resistant to the anolyte and catholyte.

A rate of the generation of reactant formed in the anolyte compartment and the catholyte compartment may be proportional to the applied current to the electrochemical cell. The operation of an extractor and its selected separation method, for example fractional distillation or packed tower scrubbing, the actual products produced, and the selectivity of the wanted reaction would determine the optimum molar ratio of the reactant to the generated reactant.

The electrochemical cell may be easily operated at a current density of greater than 3 kA/m$^2$ (300 mA/cm$^2$), or in suitable range of 0.5 to 5 kA/m$^2$ or higher if needed. The anode preferably has a high surface area structure with a specific surface area of 50 cm$^2$/cm$^3$ or more that fills the gap between the cathode backplate and the membrane, thus having a zero gap anode configuration. Metal and/or metal oxide catalysts may be added to the anode in order to decrease anode potential and/or increase anode current density. Stainless steels or nickel may also be used as anode materials with for sodium sulfide oxidation under alkaline conditions.

It is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for reducing carbon dioxide, comprising:
   receiving an anolyte feed at an anolyte region of an electrochemical cell, the electrochemical cell including an anode, wherein the anolyte includes water and a hydrogen halide;
   receiving a feed of carbon dioxide gas at a catholyte region of the electrochemical cell including a cathode, the cathode including a gas diffusion electrode;
   wherein the cathode gas diffusion electrode comprises a catalyst for the reduction of carbon dioxide, deposited on a support, in a three-dimensional structure, the cathode gas diffusion electrode including a hydrophobic binder and/or filler between the structure and a membrane;
   receiving a catholyte feed including carbon dioxide and an alkali metal bicarbonate at the catholyte region of the electrochemical cell; and
   applying an electrical potential between the anode and the cathode of the electrochemical cell sufficient to reduce the carbon dioxide to an alkali metal formate and co-produce a halogen.

2. The method of claim 1, wherein the hydrogen halide includes at least one of hydrogen bromide or hydrogen chloride.

3. The method of claim 1, further comprising:
   converting the alkali metal formate to an alkali metal oxalate via a thermal reaction;
   receiving the alkali metal oxalate at an electrochemical acidification electrolyzer; and
   converting the alkali metal oxalate to oxalic acid and co-producing alkali metal hydroxide, hydrogen, and a halogen at the electrochemical acidification electrolyzer.

* * * * *